United States Patent
Messersmith et al.

(10) Patent No.: US 12,269,925 B1
(45) Date of Patent: Apr. 8, 2025

(54) FAST CURING, BIOCOMPATIBLE AND BIODEGRADABLE ADHESIVES AND SEALANTS

(71) Applicant: THE REGENTS OF THE UNIVERSITY OF CALIFORNIA, Oakland, CA (US)

(72) Inventors: Phillip B. Messersmith, Berkeley, CA (US); Subhajit Pal, Berkeley, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 6 days.

(21) Appl. No.: 18/803,077

(22) Filed: Aug. 13, 2024

(51) Int. Cl.
*C08G 75/14* (2006.01)
*C08K 5/45* (2006.01)
*C09J 181/04* (2006.01)

(52) U.S. Cl.
CPC ............... *C08G 75/14* (2013.01); *C08K 5/45* (2013.01); *C09J 181/04* (2013.01); *C08G 2170/00* (2013.01); *C08G 2230/00* (2013.01)

(58) Field of Classification Search
USPC ........................................................ 528/265
See application file for complete search history.

(56) References Cited

U.S. PATENT DOCUMENTS

| | | | |
|---|---|---|---|
| 6,013,663 A | 1/2000 | Fujita et al. | |
| 6,090,842 A | 7/2000 | Packer et al. | |
| 6,127,394 A | 10/2000 | Pershadsingh et al. | |
| 6,150,358 A | 11/2000 | Goldstein et al. | |
| 6,204,288 B1 | 3/2001 | Pershadsingh et al. | |
| 6,288,106 B1 | 9/2001 | Pearson et al. | |
| 6,369,098 B1 | 4/2002 | Pershadsingh et al. | |
| 6,387,945 B2 | 5/2002 | Packer et al. | |
| 6,605,637 B1 | 8/2003 | Harnett et al. | |
| 6,900,338 B1 | 5/2005 | Haj-Yehia | |
| 6,936,715 B2 | 8/2005 | Harnett et al. | |
| 8,211,956 B2 | 7/2012 | Bock et al. | |
| 8,318,795 B2 | 11/2012 | Yu et al. | |
| 8,318,954 B2 | 11/2012 | Singh et al. | |
| 8,349,355 B2 | 1/2013 | Soranzo et al. | |
| 8,535,647 B2 | 9/2013 | Lucet-Levannier et al. | |
| 8,759,482 B2 | 6/2014 | Ting et al. | |
| 8,921,445 B2 | 12/2014 | Turshani et al. | |
| 9,186,431 B2 | 11/2015 | Zimnitsky et al. | |
| 9,556,308 B1 * | 1/2017 | Waymouth | C07D 409/12 |
| 9,770,398 B2 | 9/2017 | Greaves et al. | |
| 9,907,815 B2 | 3/2018 | Puskas et al. | |
| 9,974,753 B2 | 5/2018 | Salman et al. | |
| 9,999,702 B2 | 6/2018 | Zimnitsky et al. | |
| 10,039,743 B2 | 8/2018 | Garner et al. | |
| 10,080,763 B2 | 9/2018 | Bhalani et al. | |
| 10,786,595 B2 | 9/2020 | Zimnitsky et al. | |
| 11,090,409 B2 | 8/2021 | Zimnitsky et al. | |
| 11,510,926 B2 | 11/2022 | Coderre et al. | |
| 11,684,618 B2 | 6/2023 | Brosso et al. | |
| 2022/0096467 A1 | 3/2022 | Kandula | |
| 2022/0184216 A1 | 6/2022 | Jayagopal et al. | |
| 2022/0354808 A1 | 7/2022 | Pan-Montojo | |
| 2023/0277520 A1 | 9/2023 | Brosso et al. | |

FOREIGN PATENT DOCUMENTS

| | | | |
|---|---|---|---|
| WO | WO-2010126920 A2 * | 11/2010 | ............ C07F 7/1804 |
| WO | WO2011/127188 | 10/2011 | |
| WO | PCT/US24/24635 | 4/2024 | |

OTHER PUBLICATIONS

U.S. Appl. No. 18/635,583, filed Apr. 13, 2023, Messersmith, et al.—owned by Applicant.
U.S. Appl. No. 18/814,146, filed Apr. 13, 2023, Messersmith, et al.—owned by Applicant.
U.S. Appl. No. 63/459,157, filed Apr. 13, 2023, Messersmith, et al.—owned by Applicant.
U.S. Appl. No. 63/502,429, filed May 16, 2023, Messersmith, et al.—owned by Applicant.
U.S. Appl. No. 63/626,358, filed Jan. 29, 2024, Messersmith, et al.—owned by Applicant.
Written opinion and search report for PCT/US24/24635, Apr. 15, 2024, Messersmith, et al.—owned by Applicant.

(Continued)

*Primary Examiner* — Terressa Boykin
(74) *Attorney, Agent, or Firm* — Brian S. Boyer; SYNDICATED LAW, PC

(57) ABSTRACT

Biocompatible and biodegradable polymers are provided herein as compositions, methods, and systems for making the compositions. These polymers can be adjustably stable and used in medical applications as adhesives and sealants, and in non-medical applications. Radical polymerization protocols, and two-step cationic and radical polymerization protocols, are provided for the creation of stable, polydisulfide polymers, which can be done in aqueous solution and at ambient and in vivo temperatures ranging, for example, from 0° C. to 37° C. The compositions are biocompatible and can be used as fast curing, biocompatible and biodegradable adhesives and sealants suitable for use in the consumer, industrial, military and medical arts, namely as a functional biomaterial, sustainable plastic, surgical superglue, bone adhesive, pressure-sensitive adhesive, structural adhesive, and other relevant sustainable materials with closed-loop recycling.

24 Claims, 13 Drawing Sheets

(56) References Cited

OTHER PUBLICATIONS

Adhesives and Sealants Industry (2016) https://www.adhesivesmag.com/articles/94543-construction-growth-driving-adhesive-and-sealant-demand.
Albanese, K.R., et al. Building Tunable Degradtion into High-Performance Poly(acrylate) Pressure-Sensitive Adhesives. ACS Macro Lett. 12, 787-793 (2023) https://doi.org/10.1021/acsmacrolett.3c00204.
Albanese, K.R., et al. Controlled-Radical Polymerization of α-Lipoic Acid: A General Route to Degradable Vinyl Copolymers. J. Am. Chem. Soc. 145, 22728-22734 (2023) doi: 10.1021/jacs.3c08248.
Alraddadi, M.A., et al. Renewable and recyclable covalent adaptable networks based on bio-derived lipoic acid. Polym. Chem. 12, 5796-5802 (2021) doi: 10.1039/D1PY00754H.
Angulo, A., et al. Comparative Effectiveness of Cyanoacrylate Bioadhesives and Monofilament Suture in Wound Healing: A Histopathological and Physicochemical Study in New Zealand White Rabbit. J. Cytol. Histol. 7(1): 1000395 (2016) doi:10.4172/2157-7099.1000395.
Annabi, N., et al. Engineering a highly elastic human protein-based sealant for surgical applications. Sci. Transl. Med. 9, eaai7466 (2017) doi: 10.1126/scitranslmed.aai7466.
Aoshima, S., et al. A Renaissance in Living Cationic Polymerization. Chem. Rev. 109, 5245-5287 (2009) doi: 10.1021/cr900225g.
Avilla-Royo, E., et al. Biomaterial-based treatments for the prevention of preterm birth after iatrogenic rupture of the fetal membranes, Biomater. Sci., 10, 3695-3715 (2022).
Awaja, F., et al. Adhesion of polymers. Prog. Polym. Sci. 34, 948-968 (2009) doi: 10.1016/j.progpolymsci.2009.04.007.
Bang, E.K., et al. Substrate-Initiated Synthesis of Cell-Penetrating Poly(disulfide)s. J. Am. Chem. Soc. 135, 2088-2091 (2013) doi: 10.1021/ja311961k.
Beharaj, A., et al. Sustainable polycarbonate adhesives for dry and aqueous conditions with thermoresponsive properties. Nat. Commun. 10, 5478 (2019) doi: 10.1038/s41467-019-13449-y.
Bhagat, V., et al. Degradable Adhesives for Surgery and Tissue Engineering. Biomacromolecules. 18, 3009-3039 (2017) doi: 10.1021/acs.biomac.7b00969.
Bhende, S., et al. In Vitro Assessment of Microbial Barrier Properties of Dermabond® Topical Skin Adhesive. Surg. Infect. (Larchmt). 3, 251-257 (2002) doi: 10.1089/109629602761624216.
Boerman, M.A., et al. Next Generation Hemostatic Materials Based on NHS-Ester Functionalized Poly(2-oxazoline)s. Biomacromolecules. 18, 2529-2538 (2017).
Bouten, P.J., et al. The chemistry of tissue adhesive materials. Prog. Polym. Sci. 39, 1375-1405 (2014) doi: 10.1016/j.progpolymsci.2014.02.001.
Carnaghan, H.K., et al. Presealing of the chorioamniotic membranes prior to fetoscopic surgery: Preliminary study with unfertilised chicken egg models. Eur. J. Obstet. Gynecol. Reprod. Biol. 144, S142-S145 (2009) doi: 10.1016/j.ejogrb.2009.02.026.
Chen, B., et al. Mechanism-Driven Metabolic Engineering for Bio-Based Production of Free R-Lipoic Acid in Saccharomyces cerevisiae Mitochondria. Front. Bioeng. Biotechnol. 8 (2020) doi:10.3389/fbioe.2020.00965.
Chen, C., et al. Tannic acid-thioctic acid hydrogel: a novel injectable supramolecular adhesive gel for wound healing. Green Chem. 23, 1794-1804 (2021) doi: 10.1039/D0GC02909B.
Chen, J., et al. Supramolecular medical antibacterial tissue adhesive prepared based on natural small molecules. Biomater. Sci. 8, 6235-6245 (2020) doi: 10.1039/D0BM01101K.
Chen, Y., et al. Bioinspired Multiscale Wet Adhesive Surfaces: Structures and Controlled Adhesion. Adv. Funct. Mater. 30, 1905287 (2020) doi: 10.1002/adfm.201905287.
Choi, C., et al. Light-Mediated Synthesis and Reprocessing of Dynamic Bottlebrush Elastomers under Ambient Conditions. J. Am. Chem. Soc. 143, 9866-9871 (2021).
Chuard, N., et al. Cell-penetrating poly(disulfide)s: the dependence of activity, depolymerization kinetics and intracellular localization on their length. Org. Biomol. Chem. 13, 64-67 (2015) doi: 10.1039/C4OB02060J.
Chung, W.J., et al. The use of elemental sulfur as an alternative feedstock for polymeric materials. Nat. Chem. 5, 518-524 (2013) doi: 10.1038/nchem.1624.
Cortes, R.A., et al. Pre-emptive placement of a presealant for amniotic access. Am. J. Obstet. Gynecol. 193, 1197-1203 (2005) doi: 10.1016/j.ajog.2005.05.062.
Cui, C., et al. Recent advances in wet adhesives: Adhesion mechanism, design principle and applications. Prog. Polym. Sci. 116, 101388 (2021) doi: 10.1016/j.progpolymsci.2021.101388.
Cui, C., et al. A self-stabilized and water-responsive deliverable coenzyme-based polymer binary elastomer adhesive patch for treating oral ulcer. Nat. Commun. 14, 7707 (2023) doi: 10.1038/s41467-023-43571-x.
Denes, F., et al. Thiyl Radicals in Organic Synthesis. Chem. Rev. 114, 2587-2693 (2014).
Deng, Y., et al. Toughening a Self-Healable Supramolecular Polymer by Ionic Cluster-Enhanced Iron-Carboxylate Complexes. Angew. Chem. Int. Ed. 132, 5316-5321 (2020) doi: 10.1002/ange.201913893.
Deprest, J.A., et al. Endoscopic cord ligation in selective feticide. The Lancet. 348, 890-891 (1996) doi: 10.1016/S0140-6736(05)64760-5.
Deprest, J.A., et al. The making of fetal surgery. Prenat. Diagn., 30: 653-667 (2010) https://doi.org/10.1002/pd.2571.
Devlieger, R., et al. Fetal membrane healing after spontaneous and iatrogenic membrane rupture: A review of current evidence. Am. J. Obstet. Gynecol. 195, 1512-1520 (2006) doi: 10.1016/j.ajog.2006.01.074.
Dikshit, K.V., et al. Pressure-Sensitive Supramolecular Adhesives Based on Lipoic Acid and Biofriendly Dynamic Cyclodextrin and Polyrotaxane Cross-Linkers. ACS Appl. Mater. Interfaces 15: 17256-17267 (2023).
Dillard, D.A., et al. Advances in Structural Adhesive Bonding, Woodhead Publishing. Chapter 7 p. 223-224 (2010).
Droesbeke, M.A., et al. Biosourced terpenoids for the development of sustainable acrylic pressure-sensitive adhesives via emulsion polymerisation. Green Chem. 22, 4561-4569 (2020) doi: 10.1039/D0GC01350A.
Endo, K., et al. Synthesis and characterization of poly(1,2-dithiane). Macromolecules. 37, 3143-3150 (2004).
Endo, K., et al. Thermal polymerization of 1, 2-dithiane. Polym. J. 37, 512-516 (2005) doi: 10.1295/polymj.37.512.
European Centre for Disease Prevention and Control. Healthcare-associated infections: surgical site infections. In: ECDC. Annual epidemiological report for 2018-2020. Stockholm: ECDC; 2023.
Gillman, N., et al. Surgical applications of intracorporal tissue adhesive agents: current evidence and future development. Expert Rev. Med. Devices. 17, 443-460 (2020) doi: 10.1080/17434440.2020.1743682.
Guo, J., et al. Glutathione-triggered biodegradable poly(disulfide)s: ring-opening copolymerization and potent antibacterial activity. Polym. Chem. 13, 6637-6649 (2022) doi: 10.1039/D2PY01084D.
Gupta, et al. Effect of nanoalumina in epoxy adhesive on lap shear strength and fracture toughness of aluminium joints. J. Adhes. 97, 117-139 (2021) doi: 10.1080/00218464.2019.1641088.
Hopewell, J., et al. Plastics recycling: challenges and opportunities. Philos. Trans. R. Soc. B Biol. Sci. 364, 2115-2126 (2009) doi: 10.1098/rstb.2008.0311.
Houk, J., et al. Structure-Reactivity Relations for Thiol-Disulfide Interchange. J. Am. Chem. Soc. 109, 6825-6836 (1987) doi: 10.1021/ja00256a040.
Hüttner, F.J., et al. 2-octyl cyanoacrylate sealing of the pancreatic remnant after distal pancreatectomy—A prospective pilot study. PLoS One. 13 (2018) doi:10.1371/journal.pone.0205748.
Hwang, D., et al. Metamaterial adhesives for programmable adhesion through reverse crack propagation. Nat. Mater. 22, 1030-1038 (2023) doi: 10.1038/s41563-023-01577-2.
Jojibabu, P., et al. Effect of different carbon nano-fillers on rheological properties and lap shear strength of epoxy adhesive joints. Compos. Part A Appl. Sci. Manuf. 82, 53-64 (2016) doi: 10.1016/j.compositesa.2015.12.003.

(56) References Cited

OTHER PUBLICATIONS

Ke, X., et al. An instant, repeatable and universal supramolecular adhesive based on natural small molecules for dry/wet environments. Chem. Eng. J. 442, 136206 (2022).

Ke, X., et al. Natural Small Biological Molecule Based Supramolecular Bioadhesives with Innate Photothermal Antibacterial Capability for Nonpressing Hemostasis and Effective Wound Healing. ACS Appl. Mater. Interfaces. 14, 53546-53557 (2022) doi: 10.1021/acsami.2c17415.

Kisanuki, A., et al. Ring-opening polymerization of lipoic acid and characterization of the polymer. J. Polym. Sci. Part A Polym. Chem. 48: 5247-5253 (2010) doi: 10.1002/pola.24325.

Law, K.L., et al. Reducing environmental plastic pollution by designing polymer materials for managed end-of-life. Nat. Rev. Mater. 7: 104-116 (2022) doi: 10.1038/s41578-021-00382-0.

Lee, J., et al. Persulfate-Based Advanced Oxidation: Critical Assessment of Opportunities and Roadblocks. Environ. Sci. Technol. 54, 3064-3081 (2020).

Lee, Y., et al. Visualization of the Degradation of a Disulfide Polymer, Linear Poly (ethylenimine sulfide), for Gene Delivery. Bioconjug. Chem. 18: 13-18 (2007) doi: 10.1021/bc060113t.

Lei, Y.F., et al. Fully Bio-Based Pressure-Sensitive Adhesives with High Adhesivity Derived from Epoxidized Soybean Oil and Rosin Acid. ACS Sustain. Chem. Eng. 8, 13261-13270 (2020) doi: 10.1021/acssuschemeng.0c03451.

Lennox-Hvenekilde, D., et al. Metabolic engineering of *Escherichia coli* for high-level production of free lipoic acid. Metab. Eng. 76, 39-49 (2023) doi: 10.1016/j.ymben.2023.01.004.

Leonard, F., et al. Synthesis and degradation of poly (alkyl α-cyanoacrylates). J. Appl. Polym. Sci. 10, 259-272 (1966).

Li, J., et al. Tough adhesives for diverse wet surfaces. Science 357, 378-381 (2017) doi: 10.1126/science.aah6362.

Li, J., et al. Supramolecular Pressure-Sensitive Adhesives with Rapid, Strong, Water-Resistant, and Underwater Adhesion. Adv. Mater. Interfaces. 10, 2202005 (2023) doi: 10.1002/admi.202202005.

Liu, C., et al. Biological Glue from Only Lipoic Acid for Scarless Wound Healing by Anti-inflammation and TGF-ß Regulation. Chem. Mater. 35, 2588-2599 (2023) doi: 10.1021/acs.chemmater.3c00049.

Liu, Y., et al. Architecture-Controlled Ring-Opening Polymerization for Dynamic Covalent Poly(disulfide)s. J. Am. Chem. Soc. 141, 17075-17080 (2019) doi: 10.1021/jacs.9b08957.

Lodge, J.K., et al. 9—Natural Sources of Lipoic Acid in Plant and Animal Tissues. Antioxidant Food Supplements in Human Health, Academic Press p. 121-134 (1999) https://doi.org/10.1016/B978-012543590-1/50010-X.

Machado, T.O., et al. A renewably sourced, circular photopolymer resin for additive manufacturing. Nature (2024).

Mansourian-Tabaei, et al. Lap shear strength and thermal stability of diglycidyl ether of bisphenol a/epoxy novolac adhesives with nanoreinforcing fillers. J. Appl. Polym. Sci. 131 (2014) doi: 10.1002/app.40017.

Moad, G. A Critical Survey of Dithiocarbamate Reversible Addition-Fragmentation Chain Transfer (RAFT) Agents in Radical Polymerization. J. Polym. Sci. Part A Polym. Chem. 57, 216-227 (2019).

Mogami, et al. Healing of Preterm Ruptured Fetal Membranes. Sci. Rep. 7, 13139 (2017) doi: 10.1038/s41598-017-13296-1.

Moriche, R., et al. Thermal conductivity and lap shear strength of GNP/epoxy nanocomposites adhesives. Int. J. Adhes. Adhes. 68, 407-410 (2016) doi: 10.1016/j.ijadhadh.2015.12.012.

Mulder, T., et al. Prevention of severe infectious complications after colorectal surgery using oral non-absorbable antimicrobial prophylaxis: results of a multicenter randomized placebo-controlled clinical trial. Antimicrob. Resist. Infect. Control. 9, 84 (2020) doi: 10.1186/s13756-020-00745-2.

Nam, S., et al. Polymeric Tissue Adhesives. Chem. Rev. 121, 11336-11384 (2021) doi: 10.1021/acs.chemrev.0c00798.

Narang, U., et al. In-Vitro Analysis for Microbial Barrier Properties of 2-Octyl Cyanoacrylate-Derived Wound Treatment Films. J. Cutan. Med. Surg. Inc. Med. Surg. Dermatology. 7, 13-19 (2003) doi: 10.1007/s10227-002-1155-5.

Nelson, B.R., et al. Photoinduced Dithiolane Crosslinking for Multiresponsive Dynamic Hydrogels. Adv. Mater. 2211209 (2023).

Nikitjuka, A., et al. Asparagusic Acid—A Unique Approach toward Effective Cellular Uptake of Therapeutics: Application, Biological Targets, and Chemical Properties. ChemMedChem. 18: e202300143 (2023).

Packham, D.E. "15—The environmental impact of adhesives" in, F. Pacheco-Torgal, L. F. Cabeza, J. Labrincha, A. B. T.-E. C. and B. M. de Magalhães, Eds. (Woodhead Publishing, 2014 https://www.sciencedirect.com/science/article/pii/B9780857097675500157), pp. 338-367.

Pal, S., et al. Recyclable Surgical, Consumer and Industrial Adhesives of Poly(a-lipoic acid) Science 385, 877-883 (2024).

Park, D.H., et al. In vitro degradation and cytotoxicity of alkyl 2-cyanoacrylate polymers for application to tissue adhesives. J. Appl. Polym. Sci. 89, 3272-3278 (2003) doi: 10.1002/app.12452.

Pelchat, M.L., et al. Excretion and Perception of a Characteristic Odor in Urine after Asparagus Ingestion: a Psychophysical and Genetic Study. Chem. Senses. 36: 9-17 (2011).

Peng, X., et al. Coacervate-Derived Hydrogel with Effective Water Repulsion and Robust Underwater Bioadhesion Promotes Wound Healing. Adv. Sci. 9, 2203890 (2022) doi: 10.1002/advs.202203890.

Petrie, E., et al. Cyanoacrylate Adhesives in Surgical Applications. Rev. Adhes. Adhes. 2, 253-310 (2014) doi: 10.7569/RAA.2014.097306.

Pieta, M., et al. Disulfide-containing monomers in chain-growth polymerization. Polym. Chem. 14, 7-31 (2023).

Pocius, A.V. Adhesion and Adhesives Technology: An Introduction; Carl Hanser Verlag: Munich, Germany. Chapter 6 p. 162-168 (2012).

Raeisi, M., et al. Radical ring-opening polymerization of lipoates: Kinetic and thermodynamic aspects. J. Polym. Sci. 59, 675-684 (2021).

Rosenthal-Kim, E.Q., et al. Visualization of the architecture of poly(α-lipoic acid) using atomic force microscopy. Eur. Polym. J. 65, 232-237 (2015) doi: 10.1016/j.eurpolymj.2015.02.020.

Sawamoto, M., et al. Modern cationic vinyl polymerization. Prog. Polym. Sci. 16, 111-172 (1991) doi: 10.1016/0079-6700(91)90008-9.

Shen, M., et al. Hydrolysis and Solvolysis as Benign Routes for the End-of-Life Management of Thermoset Polymer Waste. Annu. Rev. Chem. Biomol. Eng. 11, 183-201 (2020) doi: 10.1146/annurev-chembioeng-120919-012253.

Shen, M., et al. Degradation Behavior of Biobased Epoxy Resins in Mild Acidic Media. ACS Sustain. Chem. Eng. 9, 438-447 (2021) doi: 10.1021/acssuschemeng.0c07621.

Singer, A.J., et al. The cyanoacrylate topical skin adhesives. Am. J. Emerg. Med. 26, 490-496 (2008) doi: 10.1016/j.ajem.2007.05.015.

Smith, R.L., et al. Wound Infection After Elective Colorectal Resection. Ann. Surg. 239 (2004) doi: 10.1097/01.sla.0000124292.21605.99.

Stockmayer, W.H., et al. Copolymerization of Vinyl Acetate with a Cyclic Disulfide. J. Am. Chem. Soc. 75, 1756-1757 (1953).

Suzuki, T., et al. Radical copolymerization of lipoamide with vinyl monomers. Macromolecules. 23, 1579-1582 (1990).

Taboada, G.M., et al. Overcoming the translational barriers of tissue adhesives. Nat. Rev. Mater. 5, 310-329 (2020) doi: 10.1038/s41578-019-0171-7.

Tang, H., et al. Lipoates as building blocks of sulfur-containing branched macromolecules. Polym. Chem. 6, 6936-6945 (2015).

TCI Chemicals. Articles/Brochures: Polymerization Initiators. (downloaded Jul. 31, 2024) https://www.tcichemicals.com/assets/brochure-pdfs/Brochure_F2037_E.pdf.

Teuber, L., et al. Naturally Occurring 1,2-Dithiolanes and 1,2,3-Trithianes. Chemical and Biological Properties. Sulfur reports. 9: 257-333 (1990).

Thomas, R.C., et al. Disulfide Polymers of DL-α-Lipoic Acid. J. Am. Chem. Soc. 78, 6148-6149 (1956) doi: 10.1021/ja01604a053.

(56) References Cited

OTHER PUBLICATIONS

Tiu, B.D.B., et al. Enhanced Adhesion and Cohesion of Bioinspired Dry/Wet Pressure-Sensitive Adhesives. ACS Appl. Mater. Interfaces. 11, 28296-28306 (2019) doi: 10.1021/acsami.9b08429.

Tobolsky, A.V., et al. The Reaction between Styrene and Ring Disulfides: Copolymerization Effected by the Chain Transfer Reaction. J. Am. Chem. Soc. 75, 1757 (1953).

Wang, B.S., et al. Acid-catalyzed Disulfide-mediated Reversible Polymerization for Recyclable Dynamic Covalent Materials. Angew. Chemie Int. Ed. (2023) doi:10.1002/anie.202215329.

Wang, Z., et al. Bioinspired chemical design to control interfacial wet adhesion. Chem. 9, 771-783 (2023) doi: 10.1016/j.chempr.2023.02.012.

Westerman, C.R., et al. Sustainably sourced components to generate high-strength adhesives. Nature. 621, 306-311 (2023) doi: 10.1038/s41586-023-06335-7.

Winkler, S.M., et al. Biomaterials in fetal surgery. Biomater. Sci. 7, 3092-3109 (2019) doi: 10.1039/C9BM00177H.

Wu, S.J., et al. Bioadhesive Technology Platforms. Chem. Rev. 123, 14084-14118 (2023) doi: 10.1021/acs.chemrev.3c00380.

Yuk, H., et al. Dry double-sided tape for adhesion of wet tissues and devices. Nature. 575, 169-174 (2019).

Zhang, Q., et al. Exploring a naturally tailored small molecule for stretchable, self-healing, and adhesive supramolecular polymers. Sci. Adv. 4, eaat8192 (2018) doi: 10.1126/sciadv.aat8192.

Zhang, Q., et al. Assembling a Natural Small Molecule into a Supramolecular Network with High Structural Order and Dynamic Functions. J. Am. Chem. Soc. 141, 12804-12814 (2019) doi: 10.1021/jacs.9b05740.

Zhang, Q., et al. Dual closed-loop chemical recycling of synthetic polymers by intrinsically reconfigurable poly (disulfides). Matter. 4, 1352-1364 (2021) doi: 10.1016/j.matt.2021.01.014.

Zhang, X., et al. 1, 2-Dithiolane-Derived Dynamic, Covalent Materials: Cooperative Self-Assembly and Reversible Cross-Linking. J. Am. Chem. Soc. 139, 3822-3833 (2017) doi: 10.1021/jacs.7b00039.

Zhao, Y., et al. Supramolecular Adhesive Hydrogels for Tissue Engineering Applications. Chem. Rev. 122, 5604-5640 (2022) doi: 10.1021/acs.chemrev.1c00815.

\* cited by examiner

FIG. 1A1
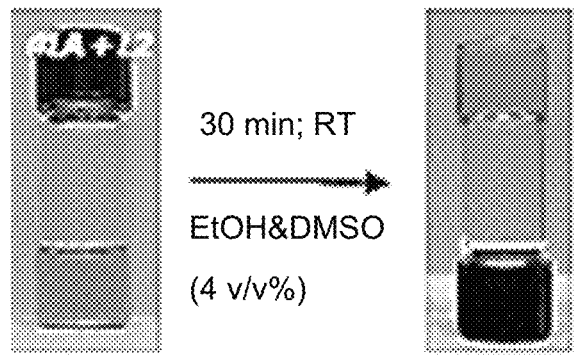
FIG. 1A2
FIG. 1B1
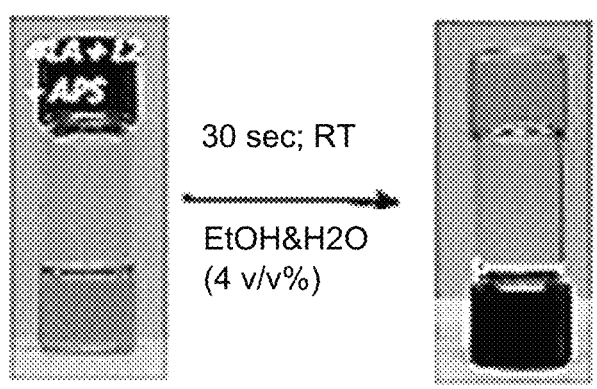
FIG. 1B2

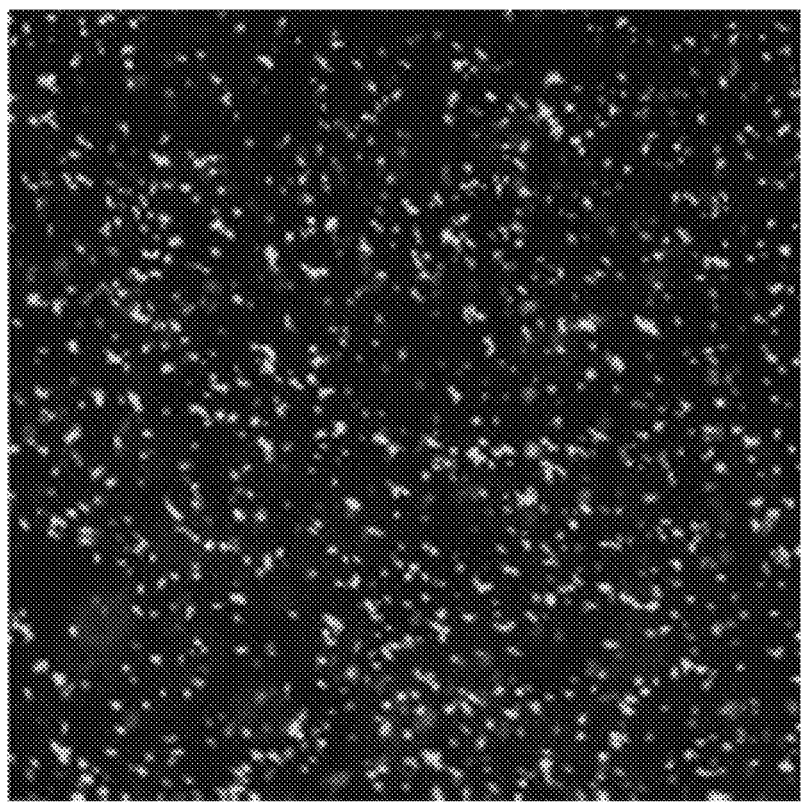
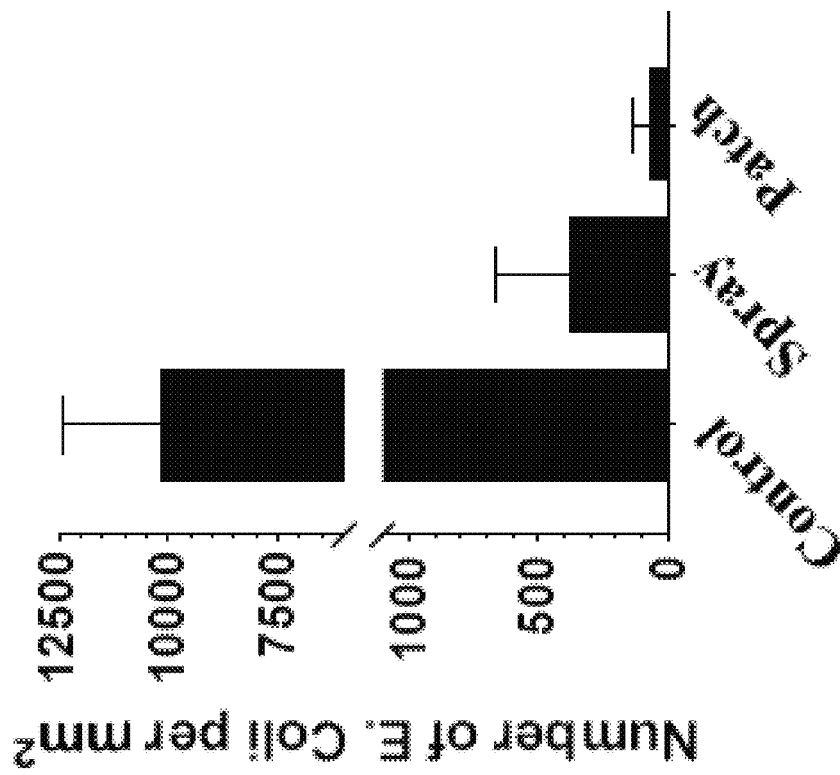
FIG. 4H
FIG. 4G

FAST CURING, BIOCOMPATIBLE AND BIODEGRADABLE ADHESIVES AND SEALANTS

CROSS-REFERENCE TO RELATED APPLICATIONS

No priority is claimed.

BACKGROUND

Field of the Invention

The systems and methods taught herein are generally directed to adhesive compositions, including fast curing, biocompatible and biodegradable adhesives and sealants suitable for use in the consumer, industrial, military and medical arts.

Description of the Art

Adhesives are an important part of everyday life, and they're found in both medical and non-medical sectors. Examples of non-medical applications are in the consumer, industrial, and military sectors. It should be appreciated that there is plenty of room for technical innovations in the development of adhesives, especially in adhesives that require particular functionalities for specialized uses. It should be appreciated that rapid curing and high mechanical strength are desired features of many adhesives. Interestingly, because many applications require adhering to a wet surface, the ability to adhere well to wet surfaces is also a highly desired feature of adhesives. Many desirable adhesives are manmade and, unfortunately, it is unusual for a manmade adhesive to adhere well to a wet surface. Moreover, another desired feature of adhesives is recyclability. The adhesives and sealants taught herein provide such desirable features and can be used, for example, in the consumer, industrial, military and medical sectors, including for use as a functional biomaterial, sustainable plastic, surgical superglue, bone adhesive, pressure-sensitive adhesive, structural adhesive, and for use with other relevant sustainable materials. And, moreover, the adhesives and sealants taught herein can be designed for ease of use with closed-loop recycling.

Non-medical adhesives are a large market. Pressure sensitive adhesives (PSAs), for example, constitute a large fraction of the overall global adhesives market, have many uses across market sectors, and are found in consumer adhesive tapes, sticky notes, and product labels, to name a few. PSAs are designed for low cost/high-volume use, are rarely effective for permanent adhesion, and require 'stickiness', which is a feature that may be found in polymers having a low glass transition temperature (Tg), usually well below 0° C. As such, low Tg viscoelastic polyacrylates have been as PSAs but, unfortunately, these adhesives are fossil-fuel-derived and not recyclable. Since sustainable, reusable, or recyclable adhesives are desired in adhesives, including PSAs, the lack of such adhesives is driving research and innovation in adhesives. Some sustainable and recyclable PSAs have been developed but, unfortunately, their high costs of production and recycling limit their uses. The polymeric compositions taught herein can be designed for any one, or any combination, of these characteristics that are desired in non-medical adhesives.

Medical adhesives, for example, are a specialized type of adhesive having a wide variety of performance requirements that vary by the particular use of the adhesive. Desirable features include biocompatibility, biodegradability, high mechanical strength, infection barrier properties that can include antimicrobial activity, and purity of toxic compounds, to name a few. Medical adhesives that are biodegradable would be appreciated, for example, in adhesives that are used internally in surgical procedures. Medical adhesives configured to have anti-inflammatory activity, antimicrobial activity, hemostat activity, and the like, would also be appreciated. Medical adhesives can also require a higher level of purity from toxic compounds, as toxic compounds can be potentially harmful to tissues and organs. The polymeric compositions taught herein can be designed for any one, or any combination, of these characteristics that are desired in medical adhesives.

Adhesives that work in both medical and non-medical markets are desired and quite scarce. A rare example of adhesives found in both medical and non-medical markets are the cyanoacrylates, which are commonly known as "superglues". The superglues can be used, for example, in external wound closures due to their rapid cure, high strength, and good infection barrier properties. Unfortunately, these cyanoacrylates have their downfalls. While the cyanoacrylates are approved and widely used for external wound closure, they're not approved by the Food and Drug Administration (FDA) for many internal uses because of their high cytotoxicity and inability to degrade for excretion by the body. Hydrogel-based adhesives, such as fibrin glue, albumin glue, and polyethylene glycol (PEG)-based glues, have been approved by the FDA for internal procedures but, unfortunately, the available hydrogel adhesives suffer from poor mechanical strength, often at least an order of magnitude weaker than the superglues.

Recently, poly($\alpha$-lipoic acid) has attracted significant attention due to its excellent mechanical and adhesion strength, along with cost-effective production and close-loop chemical recycling. $\alpha$-lipoic acid (LI), also known as thioctic acid, is a five-member cyclic disulfide with a carboxylic acid side chain. It is an essential cofactor for aerobic metabolism in animals. The (R)-form of $\alpha$-lipoic acid is found in nature, but a racemic mixture of $\alpha$-lipoic acid is also considered safe and has been widely used as a dietary supplement. $\alpha$-lipoic acid is mainly used as an antioxidant due to its exceptional ability to quench reactive oxygen species.

Besides having a favorable biological profile, $\alpha$-lipoic acid also shows exceptional potential for ring-opening polymerization due to the release of ring strain from the polymerization. In 1956, R. C. Thomas and L. J. Reed first observed that $\alpha$-lipoic acid undergoes polymerization thermally, when heated above its melting temperature. Unfortunately, the polymer had poor stability at ambient conditions due to spontaneous depolymerization. Since then, multiple attempts have been made to synthesize a stable form of poly($\alpha$-lipoic acid). It has been proposed that the thermal polymerization of lipoic acid proceeds via a radical mechanism, and the presence of the active terminal chain end radical is responsible for the depolymerization.

Although asparagusic acid is known to exist in nature, isolation of asparagusic acid on a larger scale in its pure monomeric form is challenging. The molecule can be synthesized in the laboratory or purchased as a monomeric and oligomeric mixture (<10% oligomer). Poly(asparagusic acid) does not exist in nature, and has not been produced in the art. As such, poly(asparagusic acid) is novel and inventive as a composition. Asparagusic acid (1,2-dithiolane-4-carboxylic acid) is unique to asparagus and is of great interest as a monomer due to research of pharmacological properties that include activity the treatment of urinary problems, fertility, breast milk production, and diseases that include kidney, bladder, rheumatic, liver disease, asthma and cancer.

The market for adhesives is highly segmented. For example, superglues are used primarily for external wound closure, and hydrogel adhesives are used primarily internal adhesion and sealing. No known adhesive can cross-over these market segments and serve as an adhesive and sealant for both external and internal medical uses, and this is a longfelt-but-unsolved need.

Fast polymerization is desired and, as the art has shown, methods for producing a stable poly($\alpha$-lipoic acid) are lacking, and methods of producing stable poly($\alpha$-lipoic acid) in an ultrafast polymerization are likewise unknown. The polymer industry uses solution radical polymerization for ultrafast production of polymers, and an example is the 3M pressure sensitive adhesive, which uses the monomers butyl acrylate and acrylic acid, each of which is considered toxic to humans. In the case of butyl acrylate and acrylic acid, however, there is the undesirable smell of the process that goes along with the toxicity of the process. As such, there is a purification step, and a precipitation step on the active monomer, to remove toxins and odors, and isolate the reaction product from any leftover toxic monomers. These processes also commonly use a non-green reaction solvent like dimethyl formamide (DMF) and require more costly reaction conditions, for example, application of significantly higher reaction temperatures.

A person of skill in adhesives will appreciate having adhesive compositions that perform well mechanically, are biocompatible and biodegradable, as well as adjustably stable. Such compositions can be configured for medical and non-medical uses, as well as for ease of recycling. An example is a poly($\alpha$-lipoic acid) that is sufficiently stable, easily produced, and has a high mechanical strength when adhered to a variety of substrates whether wet or dry. Stabilizer moieties can be used to stabilize the polymer from depolymerization, and the choice of stabilizer moieties further allows adjustability in the design the stability of the polymer. The stabilizer can be selected for its desired use by choosing a stabilizer moiety having a desired bond strength between the stabilizer and polymer in order to design the degradability of the polymer in its environment, which can be an in vivo environment in medical applications. In some embodiments, the polymer can be designed to degrade at a desired rate in a subject.

As such, the skilled artisan will appreciate having an adhesive that (i) can function in medical uses for external wound closure and internal adhesion and sealing; (ii) has the features of a superglue (rapid curing, high mechanical strength, barrier properties) combined with high biocompatibility and degradability; (iii) uses non-toxic monomers, or monomers with beneficial biological activity, and does not require extra steps to remove toxins, odors, and clean up the reaction product; (iv) can use a green reaction solvent; (v) can readily polymerize at lower cost temperatures ranging from 0° C. to 37° C., including ambient conditions; (vi) can be designed to be more easily recyclable due to the use of the same or similar monomers and stabilizers; (vii) works well in both medical and non-medical applications; and (viii) can be made in ultrafast radical polymerization processes. Such features are beneficial in any application of the stable polydisulfide polymers, including as an adhesive, whether the use is medical or non-medical. In medical uses, however, it will also be appreciated to have an adhesive that is biocompatible and biodegradable for medical applications, and can provide therapeutic activity through it's monomers upon biodegradation without an unacceptable level of toxicity. And, an adhesive that has barrier properties to block the spread of infections is also desirable. Moreover, a medical grade adhesive that can be used both external to the body and internal to the body would solve that longfelt-but-unsolved need. Accordingly, the technologies presented herein can offer many benefits, as well as bridge the gap between medical and non-medical market segments.

SUMMARY

An ultrafast, radical polymerization process for cyclic 1,2-dithiolane derivatives is provided. The process can be performed at ambient and physiological conditions, as well as in aqueous alcoholic solutions. In the presence of a radical initiator, cyclic 1,2-dithiolane derivatives can polymerize instantly. Stabilizers, including electrophilic and radical quenching stabilizers, can be selected to stabilize the polydisulfide polymers, and to adjust the rate of degradation in various environments. The stabilizers can also serve as radical inhibitors or terminators to quench any remaining radicals, although the polymerization conditions often do not require inhibitors or terminators due to the presence of oxygen remaining in the reaction mixture. The methods provide an ultrafast polymerization and curing, enabling many practical uses of the adhesive in both liquid and solid forms. And, in the nature of a "superglue", the stable polydisulfide polymers taught herein offer a high cohesion strength and a high adhesion strength with most any substrate, including biological tissue and other non-biological substrates, including biocompatible medical substrates used in vivo, and biomaterials that include synthetics and natural such as bone, wood, and cellulosics; metals and alloys; polymers, plastics, and rubbers; ceramics; composites; and, any combination of these materials. The stable polydisulfide polymers can take the form of a liquid, a solid powder, and a solid article, or they can be any combinations thereof. The form is chosen for the particular application, including non-medical and medical, such as soft to hard tissue repair. The polymerizations work well with a variety of monomers and macromolecular precursors, and the stable, polydisulfide polymer can be a heteropolymer or a homopolymer. And, the stable polydisulfide polymers can also adhere to substrates in any of a variety of environmental conditions that include ambient atmospheric conditions, wet conditions that include adhering materials underwater, and in a wide variety of temperatures and pressures, such as those temperatures and pressures found in medical environments, including in living tissue, as well as many residential, commercial, industrial, and manufacturing environments.

As such, methods of creating a stable polydisulfide homopolymer, or heteropolymer, from a radical polymerization reaction in an aqueous alcoholic solution are provided. The methods can include mixing a plurality of cyclic disulfide monomers with a plurality of stabilizer molecules in an aqueous alcoholic carrier to create a reaction solution at a reaction temperature ranging from 0° C. to 37° C., in some embodiments; wherein the plurality of cyclic disulfide monomers includes a plurality of substituted 1,2-dithiolane monomers, the substituted 1,2-dithiolane monomers functional to polymerize through a ring-opening reaction to form a polydisulfide homopolymer having
a first active radical sulfur end and a second active radical sulfur end; and, a plurality of repeating units having a substituted dithioalkyl structure from the ring opening reaction as follows

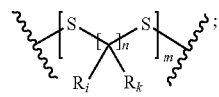

wherein, n is 3;

each $R_i$ and $R_k$ is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; wherein, i and k are integers, and at least one $R_i$ or $R_k$ in each repeating unit includes a carbonyl functionality;

and, m is an integer selected to match a desired molecular weight of the polymer;

initiating the radical polymerization reaction by adding a plurality of initiator molecules to the reaction solution at the reaction temperature ranging from 0° C. to 37° C.;

creating a polydisulfide homopolymer having sulfur radicals through the radical polymerization reaction;

stabilizing the polydisulfide homopolymer, the stabilizing including reacting the plurality of stabilizer molecules with the sulfur radicals;

terminating the polymerization reaction to create the stable polydisulfide homopolymer, the terminating including quenching the plurality of initiator molecules by reaction with the aqueous alcoholic solution, reacting the sulfur radicals with stabilizer, reacting the sulfur radicals with the aqueous alcoholic solution to convert the sulfur radicals to thiols, and/or reacting the thiols with the plurality of stabilizer molecules.

In some embodiments, the repeating unit is a substituted 1,3-dithiopropyl structure as follows

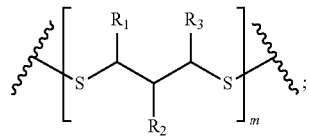

and wherein, m is an integer;

$R_i$ includes $R_1$, $R_2$, and $R_3$; and, each $R_k$ is H;

and, each stabilizer molecule includes the substituted 1,3-dithiopropyl structure.

In some embodiments, the repeating unit is a substituted 1,3-dithiopropyl structure as follows

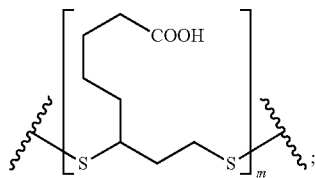

wherein, m is an integer;

$R_1$ is a pentanoic acid group, and $R_2$ and $R_3$ are each H; and, each stabilizer molecule includes the substituted 1,3-dithiopropyl structure, wherein $R_1$ is a pentanoic acid group, and $R_2$ and $R_3$ are each H.

In some embodiments, the repeating unit has a substituted 1,3-dithiopropyl structure

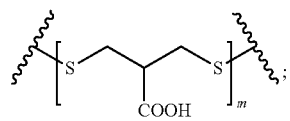

wherein, m is an integer;

$R_1$ and $R_3$ are H, and $R_2$ is a carboxylic acid group; and, each stabilizer molecule includes the substituted 1,3-dithiopropyl structure, wherein $R_1$ and $R_3$ are H and $R_2$ is a carboxylic acid group.

Depending on the embodiment, the plurality of stabilizer molecules can include an electrophilic stabilizer, a free radical stabilizer, or a combination thereof. In some embodiments, the plurality of stabilizer molecules includes an electrophilic stabilizer, a free radical stabilizer, or a combination thereof, and the monomers and the stabilizer molecules are the same, or substantially the same, chemical moieties following a depolymerization of the polymer.

Stabilizer can be used in most embodiments to stabilize the polymers from depolymerization. If you choose a cationic stabilizer, an electrophilic stabilizer, you can induce cationic polymerization. If you choose a radical stabilizer, such as any of the radical stabilizers taught herein, perhaps a maleimide, you can induce an exclusively radical reaction. In some embodiments, the stabilizer can function as both a cationic stabilizer and a radical stabilizer.

In some embodiments, the stabilizer is selected from the group consisting of maleimide, a maleimide derivative, a quinone, a quinone derivative, a quinone methide, TEMPO or a derivative thereof, TEMPOL or a derivative thereof, p-phenylenediamines, phenothiazine, hydroxylamines including N,N-bis (hydroxypropyl) hydroxylamine (HPHA) and diethylhydroxylamine (DEHA), nitrophenol compounds including dinitro-ortho-cresol and di-nitro-sec-butylphenol (DNBP), and any combination thereof.

In some embodiments, the stabilizer is selected from the group consisting NHS-derivatized lipoic acid (S1), Gly-OSu-NHS derivatized lipoic acid (S2), Sulfo-NHS-derivatized lipoic acid (S3), Gly-OSu-Sulfo-NHS derivatized lipoic acid (S4,S5), Ala-OSu-NHS derivatized lipoic acid (S6), 3-amino-propanoic acid-OSu-NHS derivatized lipoic acid (S7), Ala-OSu-NHS derivatized lipoic acid (S8), 1,4-benzoquinone (S9), N-ethylmaleimide (S10), a C1-C22 alkyl methacrylate (S11), 2-methylenepentanedioic acid (S12), and any combination thereof.

In some embodiments, the initiator is an azo compound selected from the group consisting of 2,2'-azobis(isobutyronitrile) (AIBN), 4,4'-azobis(4-cyano valeric acid), and 2,2'-azobis[2-(2-imidazolin-2-yl)propane]dihydrochloride, and any combination thereof.

In some embodiments, the initiator is 4,4'-azobis(4-cyano valeric acid).

In some embodiments, the initiator is a peroxide compound selected from the group consisting of benzoyl peroxide (BPO), cumene hydroperoxide, tert-butyl hydroperoxide (TBHP), di-tert-butyl peroxide (di-TBP), dicumyl peroxide, and any combination thereof.

In some embodiments, the initiator is selected from the group consisting of ammonium persulfate, potassium persulfate, sodium persulfate, dicyandiamide, cyclohexyl tosylate, (4-hydroxyphenyl)-dimethylsulfonium hexafluorophosphate, diphenyl(methyl)sulfonium tetrafluoroborate, benzyl(4-hydroxyphenyl)methylsulfonium hexafluoroantimonate, (4-hydroxyphenyl)methyl(2-methylbenzyl)sulfonium hexafluoroantimonate, triphenylsulfonium nonafluoro-1-butanesulfonate, and any combination thereof.

In some embodiments, the initiator is ammonium persulfate.

The radical polymerization process can sometimes lack in a desired cohesive strength, because the radical polymerization can be expected to be linear. As such, it may be desirable to start with a slower cationic polymerization for a first reaction duration to create a desired amount of branching in the polymer to obtain a desired amount of cohesive strength, and then switch to a radical polymerization to speed the completion of process. As such, in some embodiments, the polymerization methods can further include a step of creating a substantial amount of a first stable homopolymer through a cationic polymerization for a first reaction time before adding an initiator to the reaction solution. As described, this first step can create the desired amount of branching, and the adding of the initiator starts the radical polymerization to create a second stable homopolymer that includes the first stable homopolymer. The combination of the first stable homopolymer with the second stable homopolymer creates the stable polydisulfide homopolymer from the radical polymerization reaction in the aqueous alcoholic solution.

Any aqueous solvent can be used, in some embodiments, and so water can be combined with any water miscible solvent. However, green solvents can be preferred in some embodiments, and solvents that are considered "green" to those of skill can be used. In some embodiments, the aqueous alcohol carrier can be a combination of ethanol:water. In such embodiments, the ratio of ethanol:water can range, for example, from 10:90 to 90:10, and either a weight ratio or a mole ratio can be used as a basis to select a desired carrier. In some embodiments, the range of 10:90 to 90:10 ethanol:water is a weight ratio used to select the desired aqueous alcohol carrier.

The methods can be performed using a prepared kit of reactants which may, or may not, include an aqueous alcoholic carrier that is designed for use with that particular polymerization reaction. In some embodiments, a precursor kit for a radical polymerization in an aqueous alcoholic solution that results in a stable polydisulfide homopolymer is provided. The kit can include a plurality of cyclic disulfide monomers;
a plurality of stabilizer molecules;
an initiator; and,
an aqueous alcoholic carrier;
wherein the plurality of cyclic disulfide monomers includes a plurality of substituted 1,2-dithiolane monomers, the substituted 1,2-dithiolane monomers functional to polymerize through a ring-opening reaction to form a polydisulfide homopolymer having
a first active radical sulfur end and a second radical sulfur end; and,
a plurality of repeating units having a substituted dithioalkyl structure from the ring opening reaction as follows

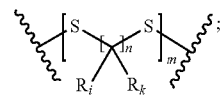

wherein,
n is 3;
each Ri and Rk is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; wherein, i and k are integers, and at least one Ri or Rk in each repeating unit includes a carbonyl functionality; and,
m is an integer selected to match a desired molecular weight of the polymer;
and,
the kit is used to create the stabilized polydisulfide homopolymer in the aqueous alcohol carrier to create a reaction solution at a reaction temperature ranging from 0° C. to 37° C.

Likewise, the methods can be performed using a system for a radical polymerization of a stabilized polydisulfide homopolymer in aqueous alcoholic solution. In some embodiments, the system can include
a plurality of cyclic disulfide monomers;
a plurality of stabilizer molecules;
an initiator;
an aqueous alcoholic carrier; and,
a reaction vessel for creating the stabilized polydisulfide homopolymer through the radical polymerization in the aqueous alcohol carrier at a reaction temperature ranging from 0° C. to 37° C.;
wherein the plurality of cyclic disulfide monomers includes a plurality of substituted 1,2-dithiolane monomers, the substituted 1,2-dithiolane monomers functional to polymerize through a ring-opening reaction to form a polydisulfide homopolymer having
a first active radical sulfur end and a second radical sulfur end; and,
a plurality of repeating units having a substituted dithioalkyl structure from the ring opening reaction as follows

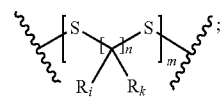

wherein n is 3;

each Ri and Rk is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; wherein, i and k are integers, and at least one Ri or Rk in each repeating unit includes a carbonyl functionality; and, m is an integer selected to match a desired molecular weight of the polymer.

The system can have several configurations, depending on the polymerization process desired. In some embodiments, the cyclic disulfide monomer and the stabilizer are in a first reactant vessel in the aqueous carrier;

the initiator is in a second reactant vessel;

an aqueous reaction solution is formed by adding the initiator to the cyclic disulfide monomer and the stabilizer in the reaction vessel; and, the reaction vessel contains the radical polymerization of the aqueous reaction solution at the temperature ranging from 0° C. to 37° C.

In some embodiments, the cyclic disulfide monomer and the stabilizer are in a first reactant vessel in the aqueous carrier, the first reactant vessel configured to release the cyclic disulfide monomer, the stabilizer, and the aqueous carrier into the reaction vessel at a first desired time to create a first aqueous reaction solution for a cationic polymerization in the first aqueous reaction solution to create a first stable polydisulfide polymer at the temperature ranging from 0° C. to 37° C.;

the initiator is in a second reactant vessel, the second reactant vessel configured to release the initiator into the reaction vessel at a second desired time to create a second aqueous reaction solution with the first stable polydisulfide polymer for the radical polymerization in the second aqueous reaction solution to create a second stable polydisulfide polymer from a combination of the cationic polymerization and the radical polymerization at the temperature ranging from 0° C. to 37° C.

In some embodiments, the cyclic disulfide monomer and the stabilizer are in a first reactant vessel in the aqueous carrier, the first reactant vessel configured to release the cyclic disulfide monomer, the stabilizer, and the aqueous carrier into the reaction vessel at a first desired time to create a first aqueous reaction solution for a cationic polymerization in the first aqueous reaction solution to create a first stable polydisulfide polymer at the temperature ranging from 0° C. to 37° C.;

the initiator is in a second reactant vessel, the second reactant vessel configured to release the initiator into the reaction vessel at a second desired time to create a second aqueous reaction solution with the first stable polydisulfide polymer for the radical polymerization in the second aqueous reaction solution to create a second stable polydisulfide polymer from a combination of the cationic polymerization and the radical polymerization at the temperature ranging from 0° C. to 37° C.;

wherein the system is configured for the cationic polymerization to occur for a first reaction duration to create a desired amount of branching in the first stable polydisulfide polymer before the initiator is released into the reaction vessel to start the radical polymerization to create the desired amount of branching in the second stable polydisulfide polymer which results from the combination of the cationic polymerization and the radical polymerization at the temperature ranging from 0° C. to 37° C.

The methods, kits, and systems can create a wide variety of stable polydisulfide polymers. In some embodiments, a stabilized and recyclable polydisulfide homopolymer is provided and can include:

a plurality of substituted 1,2-dithiolane monomers, the substituted 1,2-dithiolane monomers functional to polymerize through a ring-opening reaction to form a polydisulfide polymer having a first active sulfur radical and a second active sulfur radical; and, a plurality of repeating units having a substituted dithioalkyl structure from the ring opening reaction as follows

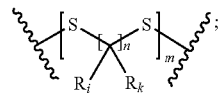

wherein, n is 3;

each $R_i$ and $R_k$ is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; wherein, i and k are integers, and at least one R or $R_k$ in each repeating unit includes a carbonyl functionality;

and, m is an integer selected to match a desired molecular weight of the polymer;

and, a plurality of stabilizer molecules configured to stabilize the first active sulfur radical of the polymer, the plurality of stabilizer molecules being the 1,2-dithiolane monomers having a functional group that forms (i) a first stable bond with the first active sulfur radical; and (ii) a second stable bond with the second active sulfur radical.

wherein, the repeating units and the stabilizer molecules are the same, or substantially the same, chemical moieties following a degradation of the polymer.

The degree of stability of the stable polydisulfide polymers can be adjusted by adjusting the strength of the bonds that stabilize the polymers from depolymerization. In some embodiments, (i) the first stable bond is a first labile bond with the first active sulfur radical, the first labile bond selected from the group consisting of a thioester bond, a thiocarbamate bond, and a thioester bond; and, (ii) the second stable bond is a second labile bond with the second active sulfur radical, the second labile bond selected from the group consisting of a thioester bond, a thiocarbamate bond, and a thioester bond.

The stable polydisulfide polymers created through the technologies taught herein can be used for medical or non-medical applications. In some embodiments, the application is a method of using a stabilized and recyclable polydisulfide homopolymer as a non-medical adhesive. Such a method can include applying the stabilized and recyclable polydisulfide homopolymer to a substrate as an adhesive.

The polymeric compositions taught herein can be biocompatible, biodegradable, and can be adjustably stable in it's environment, so that the degradation time can be designed into the polymeric composition for any desired use by selected a desired stabilizer or stabilizers for the desired use. In some embodiments, the application is a method of using a stabilized and recyclable polydisulfide homopolymer as a medical tissue adhesive in a method of treatment of a subject. Such a method can include applying the stabilized and recyclable polydisulfide homopolymer to a substrate in vivo in the treatment of the subject.

BRIEF DESCRIPTION OF THE DRAWINGS

FIGS. 1A1, 1A2, 1B1, and 1B2. A general comparison of reaction times between ionic polymerization with an electrophilic stabilizer and radical polymerization with an initiator, according to some embodiments.

FIGS. 4A-4J describe biological testing of representative polydisulfide polymers, namely poly(α-lipoic acid) polymers, including biocompatibility profiles with NIH 3T3 mouse fibroblast cells, human amniotic cells, in vitro biocompatibility of a solid adhesive patch with NIH 3T3 mouse fibroblast cells and human amniotic cells, the antioxidant property of in-situ synthesized poly(α-lipoic acid) polymers in the presence of macrophages in an lipopolysaccharide (LPS)-induced oxidative stress model, and the bacterial resistance of the adhesive compositions by illustrating a comparison of a control assay of *E. coli* growth in a culture plate to the *E. coli* growth on a solid adhesive patch and a culture plate coated with the in-situ synthesized poly(α-lipoic acid) polymer.

DETAILED DESCRIPTION

Figure 2A:
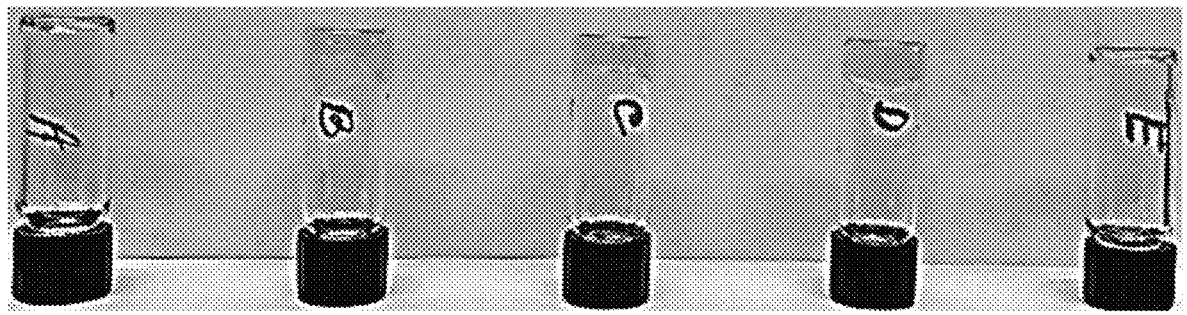
FIGS. 2A-2E compare polymerization of α-lipoic acid under a variety of reaction conditions using a "flip vial test", and the formation of thin films and hydrogels, according to some embodiments.

The teachings provided herein include adjustably stable adhesive compositions for medical and non-medical use, the adhesive compositions made from radical polymerization, or a combination of radical polymerization and ionic polymerization, of cyclic disulfide monomers, oligomers of reactions between the cyclic disulfides, polymers of the cyclic disulfides, and any combination thereof. Methods of making and using the adhesive compositions are also provided, including both medical and non-medical applications, and on any of a variety of substrates that include biological tissue; biomaterials, including synthetics and natural such as bone, wood, and cellulosics; metals and alloys; polymers, plastics, and rubbers; ceramics; composites; and, any combination of these materials. The adhesives can also adhere to substrates in any of a variety of environmental conditions that include ambient atmospheric conditions, wet conditions that include adhering materials underwater, and in a wide variety of temperatures and pressures, such as those temperatures and pressures found in medical environments, including in living tissue, as well as many residential, commercial, industrial, and manufacturing environments.

Many of the adhesive compositions taught herein have been tested using α-lipoic acid monomers which are a preferred monomer for many uses due to the properties of the monomers, as well as the properties of the poly(α-lipoic acid) polymers. Asparagusic acid monomers have many desired properties, as do the poly(asparagusic acid) polymers. Like α-lipoic acid, we developed a method of polymerizing stable forms of poly(asparagusic acid) and found that it had excellent mechanical properties and adhesion strength, some of which are superior to poly(α-lipoic acid) as well as a cost-effective production and closed-loop chemical recycling. An added benefit is that poly(asparagusic acid) (L8) is that, although it also depolymerizes on its own, it depolymerizes more slowly than poly(α-lipoic acid) because it's cyclic ring has more strain and, although it can certainly be stabilized like the poly(α-lipoic acid), the stability of poly(asparagusic acid) without a stabilizer molecular is sufficient for many uses. Like poly(α-lipoic acid), poly(asparagusic acid) also readily depolymerizes into safe monomers and oligomers, the monomers having the therapeutic activities of interest.

Generally speaking, the adhesive compositions include cyclic disulfide monomer components that polymerize into a sticky polydisulfide polymers at the time of use; oligomers of the cyclic disulfide that polymerize into a sticky polydisulfide polymers at the time of use; polydisulfide polymers of the cyclic disulfide components ready for such use; solid adhesive products formed from such sticky polymers; any one or combination of those for additional polymerization before or during such uses; and, any combination thereof.

The polymerization methods can include ultrafast, radical polymerization processes for cyclic 1,2-dithiolane derivatives that can be performed at ambient and physiological conditions, as well as in aqueous alcoholic solutions. Cyclic 1,2-dithiolane derivatives can polymerize instantly in the presence of a radical initiator. Stabilizers are needed in most embodiments and include electrophilic and radical quenching stabilizers, or chemical moieties that can do both. In fact, the stabilizers can be selected to stabilize the polydisulfide polymers, as well as to adjust the rate of degradation in various environments. The stabilizers can also serve as radical inhibitors or terminators to quench any remaining radicals, although the polymerization conditions often do not require inhibitors or terminators due to the presence of oxygen remaining in the reaction mixture and/or due to the use of an aqueous reaction solvent.

In some embodiments, the reactions can include a thermal polymerization step. Thermal polymerization can occur in a dried mixture of monomers, or a mixture of monomers in a reaction solvent. In some embodiments, the reaction solvents can be selected from the group of ethanol, DMSO, methanol, polyethylene glycol, glycerol, ionic liquids, vegetable oils, or any water-miscible organic solvents.

The polymerization can include an ionic polymerization step, in some embodiments. In some embodiments, a stabilizer can be added for stabilizing the polydisulfide polymers and address the problem of depolymerization that happens in polymers created by polymerization of cyclic disulfide monomers. The depolymerization can render some polymers useless in applications that require at least a minimal amount of polymer stability that cannot be obtained without the addition of the stabilizer. In some embodiments, a terminator molecule is added for further stabilizing the polymer.

In some embodiments, a Lewis acid or a Bronsted acid is added to increase the rate of ionic polymerization. In some embodiments, dimethyl sulfoxide (DMSO) is added to increase the rate of the ionic polymerization. In some embodiments, a Lewis acid or a Bronsted acid is addition with a catalytic amount of the DMSO to increase the rate of ionic polymerization.

In some embodiments, the conjugate base of a cyclic disulfide monomer is added to increase the stability of the adhesive compositions as a whole before use of the compositions as intended. And, in some embodiments, a cross-linker is added to strengthen polymeric adhesives formed from the adhesive compositions through covalent bond or non-covalent bonds made between the cross-linker and the adhesive polymers. The cross-linker can include, for example, a monomer, an oligomer, a polymer, and conjugate bases of monomers used in the polymerization; metal ions, such as multivalent metal ions including divalent metal ions such as Ca++; transition and alkali earth metal salts; and, metal salts of cyclic 1,2-dithiolane derivatives; and, combinations thereof; wherein, the cross-linkers are added to further strengthen the compositions.

The stable polydisulfide polymers can take the form of a liquid, a solid powder, and a solid article, or they can be any combinations thereof. The form is chosen for the particular application, including non-medical and medical, such as soft to hard tissue repair. Due to the ultrafast polymerization and curing, there are many practical uses of the adhesive in both liquid and solid forms. And, in the nature of a "superglue", the stable polydisulfide polymers taught herein offer a high cohesion strength and a high adhesion strength with most any substrate, including biological tissue and other non-biological substrates, including biocompatible medical substrates used in vivo, and biomaterials that include synthetics and natural such as bone, wood, and cellulosics; metals and alloys; polymers, plastics, and rubbers; ceramics; composites; and, any combination of these materials. And, the stable polydisulfide polymers can also adhere to substrates in any of a variety of environmental conditions that include ambient atmospheric conditions, wet conditions that include adhering materials underwater, and in a wide variety of temperatures and pressures, such as those temperatures and pressures found in medical environments, including in living tissue, as well as many residential, commercial, industrial, and manufacturing environments.

The polymerizations work well with a variety of monomers and macromolecular precursors, and the stable, polydisulfide polymer can be a heteropolymer or a homopolymer.

Methods of Making Polymers

As such, methods of creating a stable polydisulfide homopolymer from a radical polymerization reaction in an aqueous alcoholic solution are provided. The methods can include
- mixing a plurality of cyclic disulfide monomers with a plurality of stabilizer molecules in an aqueous alcoholic carrier to create a reaction solution at a reaction temperature that one of skill will appreciate can range from 0° C. to 37° C., in some embodiments; wherein the plurality of cyclic disulfide monomers includes a plurality of substituted 1,2-dithiolane monomers, the substituted 1,2-dithiolane monomers functional to polymerize through a ring-opening reaction to form a polydisulfide homopolymer or heteropolymer having a first active radical sulfur end and a second active radical sulfur end; and,
- a plurality of repeating units having a substituted dithioalkyl structure from the ring opening reaction as follows

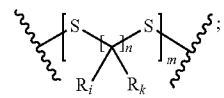

wherein, n is 3;

each Ri and Rk is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; wherein, i and k are integers, and at least one Ri or Rk in each repeating unit includes a carbonyl functionality;

and, m is an integer selected to match a desired molecular weight of the polymer;

initiating the radical polymerization reaction by adding a plurality of initiator molecules to the reaction solution at the reaction temperature ranging from 0° C. to 37° C., in some embodiments;

creating a polydisulfide homopolymer having sulfur radicals through the radical polymerization reaction;

stabilizing the polydisulfide homopolymer, the stabilizing including reacting the plurality of stabilizer molecules with the sulfur radicals;

terminating the polymerization reaction to create the stable polydisulfide homopolymer, the terminating including quenching the plurality of initiator molecules by reaction with the aqueous alcoholic solution, reacting the sulfur radicals with stabilizer, reacting the sulfur radicals with the aqueous alcoholic solution to convert the sulfur radicals to thiols, and/or reacting the thiols with the plurality of stabilizer molecules, in some embodiments.

In some embodiments, the repeating unit can be a substituted 1,3-dithiopropyl structure as follows

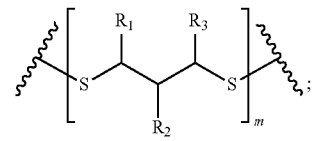

and wherein, m is an integer;

$R_i$ includes $R_1$, $R_2$, and $R_3$; and, each $R_k$ is H;

and, each stabilizer molecule includes the substituted 1,3-dithiopropyl structure.

In some embodiments,
the repeating unit can be a substituted 1,3-dithiopropyl structure as follows

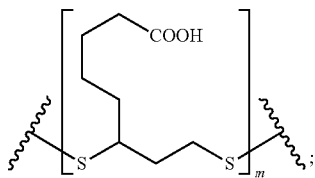

wherein,
m is an integer;
$R_1$ is a pentanoic acid group, and $R_2$ and $R_3$ are each H; and,
each stabilizer molecule includes the substituted 1,3-dithiopropyl structure, wherein $R_1$ is a pentanoic acid group, and $R_2$ and $R_3$ are each H.

In some embodiments,
the repeating unit can have a substituted 1,3-dithiopropyl structure

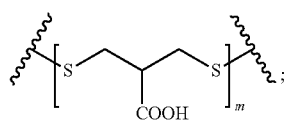

wherein,
m is an integer;
$R_1$ and $R_3$ are H, and $R_2$ is a carboxylic acid group; and,
each stabilizer molecule includes the substituted 1,3-dithiopropyl structure, wherein $R_1$ and $R_3$ are H and $R_2$ is a carboxylic acid group.

Monomers

The monomers can be any polymerizable monomer selected from the group consisting of substituted cyclic disulfide molecules having from 2 to 4 C atoms in a cyclic ring with a disulfide bond, the substituted cyclic disulfide molecules functional to polymerize through a ring-opening reaction.

In some embodiments, the plurality of substituted cyclic disulfide molecules is a substituted 1,2-dithietane, and the repeating unit is a substituted 1,2-dithioethyl structure.

In some embodiments, the plurality of substituted cyclic disulfide molecules is a substituted 1,2-dithiolane, and the repeating unit is a substituted 1,3-dithioethyl structure.

In some embodiments, the plurality of substituted cyclic disulfide molecules is a substituted 1,2-dithiane, and the repeating unit is a substituted 1,4-dithioethyl structure.

In some embodiments, the plurality of cyclic disulfide monomers includes a plurality of substituted 1,2-dithiolane monomers selected from the group consisting of a substituted 1,2-dithietane, a substituted 1,2-dithiolane, a substituted 1,2-dithiane, or any combination thereof.

In some embodiments, the plurality of cyclic disulfide monomers includes a plurality of α-lipoic acid monomers, asparagusic acid monomers, or any combination thereof.

In some embodiments, the plurality of cyclic disulfide monomers includes a plurality of α-lipoic acid monomers, asparagusic acid monomers, a conjugate base of α-lipoic acid, a conjugate base of asparagusic acid, or any combination thereof.

In some embodiments, the plurality of cyclic disulfide monomers includes a plurality of α-lipoic acid monomers, asparagusic acid monomers, a conjugate base of α-lipoic acid, a conjugate base of asparagusic acid, or any combination thereof, wherein the plurality of cyclic disulfide monomers includes a molar ratio or weight ratio of the monomer to it's conjugate base that ranges from 1:99 to 99:1, from 5:95 to 95:5, from 10:90 to 90:10, from 15:85 to 85:15, from 20:80 to 80:20, from 25:75 to 75:25, from 30:70 to 70:30, from 35:65 to 65:35, from 40:60 to 60:40, from 55:45 to 45:55, 50:50, or any ratio therein in component increments of 1% each in the ratios.

In some embodiments, the monomer and its conjugate base can α-lipoic acid:sodium lipoate, α-lipoic acid:calcium lipoate, α-lipoic acid:potassium lipoate, or any combination thereof. And, in some embodiments, the conjugate base can be any one or any combination of the conjugate bases of the monomer. In some embodiments, the conjugate base is a combination of the conjugate bases of α-lipoic acid, including any combination of sodium lipoate, calcium lipoate, or potassium lipoate. And, in some embodiments, the carrier solvent is a ratio of ethanol:water. In some embodiments, the plurality of monomers is a combination of α-lipoic acid: sodium lipoate in a ratio of 20:80 to 80:20, and the carrier is a ratio of 10:90 to 90:10 ethanol:water, with stabilizer in an amount of 1-10% by mole % or weight %, the stabilizer being any stabilizer taught herein.

In some embodiments, the stabilizer is added in an amount of 3-7% by mole or weight to α-lipoic acid:sodium lipoate in a ratio of 20:70 to 80:20, the carrier is a ratio of 10:90 to 90:10 ethanol:water, and the stabilizer is an NHS-derivatized α-lipoic acid (S1), a Gly-OSu-NHS-derivatized α-lipoic acid (S2), or a combination thereof. In some embodiments, the stabilizer is added in an amount of about 5% by mole or weight to α-lipoic acid:sodium lipoate in a ratio of 30:70 to 70:30, and the carrier is a ratio of 10:90 to 90:10 ethanol:water, and the stabilizer is an NHS-derivatized α-lipoic acid (S1), a Gly-OSu-NHS-derivatized α-lipoic acid (S2), or a combination thereof. In some embodiments, the ratio of α-lipoic acid:sodium lipoate is 70:30, and the ratio of ethanol:water is 70:30. In some embodiments, the ratio of α-lipoic acid:sodium lipoate is 80:20, the ratio of ethanol:water is 10:90, and the stabilizer is added at 5% in a mol % or weight %.

Initiators, Inhibitors, Terminators, and Stabilizers

It should be appreciated that radical polymerization is a chain reaction with an initiation step, a propagation step and a termination step. As such, the process taught herein can include initiators, stabilizers, inhibitors, and terminators, and combinations thereof. As such, in many embodiments, the compositions and methods include use of an initiator. In some embodiments, the compositions and methods include use of a terminator. And, in some embodiments, the compositions and methods include use of an initiator and a terminator. In some embodiments, the terminator can be referred to as an inhibitor.

Initiators

Initiation is the first step in a radical polymerization process. A polymer created by radical polymerization grows in size by adding free-radical building blocks, which can be called "radical repeating units". These radical repeating units can be created for use in the polymerization using an initiator molecule or "initiator". The building blocks are the "monomers" used in the reaction, and the polymerization process is a chain reaction where each free radical can create additional free radicals from non-radical monomers. The instant technology uses radical polymerizations in aqueous solutions in most embodiments.

In some embodiments, the initiator is an azo compound selected from the group consisting of 2,2'-azobis(isobutyronitrile) (AIBN), 4,4'-azobis(4-cyano valeric acid), and 2,2'-azobis[2-(2-imidazolin-2-yl)propane]dihydrochloride, and any combination thereof. In some embodiments, the initiator is 4,4'-azobis(4-cyano valeric acid).

In some embodiments, the initiator is a peroxide compound selected from the group consisting of benzoyl peroxide (BPO), cumene hydroperoxide, tert-butyl hydroperoxide (TBHP), di-tert-butyl peroxide (di-TBP), dicumyl peroxide, and any combination thereof.

In some embodiments, the initiator is selected from the group consisting of ammonium persulfate, potassium persulfate, sodium persulfate, and combinations thereof. In some embodiments, the initiator is ammonium persulfate.

In some embodiments, the initiator is selected from the group consisting of dicyandiamide, cyclohexyl tosylate, (4-hydroxyphenyl)-dimethylsulfonium hexafluorophosphate, diphenyl(methyl)sulfonium tetrafluoroborate, benzyl (4-hydroxyphenyl)methylsulfonium hexafluoroantimonate, (4-hydroxyphenyl)methyl(2-methylbenzyl)sulfonium hexafluoroantimonate, triphenylsulfonium nonafluoro-1-butanesulfonate, and any combination thereof.

Inhibitors and Terminators

One of skill will appreciate that, degassing is most often desired in radical polymerization reactions to avoid quenching the initiator. Inhibitors are used in radical polymerizations to help avoid quenching the initiator. In many embodiments, however, a degassing step can be avoided due to the ultrafast reaction. Since the polymerizations taught herein are ultrafast, and can be done at a high monomer concentration, the initiator can react in the polymerization reaction before it gets a chance to reach with the oxygen and be inactivated through quenching. As such, in many embodiments, there can be a presence of residual oxygen due to an absence of degassing. And, since the radical reactions can be designed to occur in aqueous solution as taught herein, a feature of the inventions taught herein, the aqueous solutions also serving to inhibit and/or terminate the radical reactions in the absence of a separate inhibitor or terminator moiety. Although the reactions can be designed to quench radicals with residual oxygen, reaction solvent, or both, inhibitors and/or terminators can be independently selected in the design of the reaction method taught herein in some embodiments.

Stabilizers and Terminators

Stabilizers are added in most embodiments taught herein to control depolymerization, and terminators can be selected to perform the same function. In some embodiments, the stabilizer can be selected to prevent depolymerization through a strong covalent bond that is not designed to release at any time after formation of the polymer under the conditions in which the polymer is designed to be used. In some embodiments, the stabilizer can be selected to inhibit polymerization through a bond that is expected to hold for at least the amount of time needed under the conditions in which the polymer is designed to be used.

Depending on the embodiment, the plurality of stabilizer molecules, and/or plurality of terminator molecules, can include an electrophilic stabilizer, a free radical stabilizer, or a combination thereof. In some embodiments, the plurality of stabilizer molecules includes an electrophilic stabilizer, a free radical stabilizer, or a combination thereof, and the monomers and the stabilizer molecules are the same, or substantially the same, chemical moieties following a depolymerization of the polymer. In some embodiments, the plurality of terminator molecules includes an electrophilic terminator, a free radical terminator, or a combination thereof, and the monomers, the stabilizer molecules, and/or the terminator molecules can be the same, or substantially the same, chemical moieties following a depolymerization of the polymer to facilitate a desired toxicity level in the environment, a desired toxicity level in a patient/subject in a medical treatment, a recyclability efficiency, or any combination thereof.

A terminator can be selected to end the polymerization reaction and/or stabilize the polymer from depolymerization. A stabilizer is used in most embodiments to stabilize the polymers from depolymerization.

The selection of stabilizer can help to facilitate an ionic polymerization or radical polymerization. If you choose a cationic stabilizer, which is an electrophilic stabilizer, you can induce an ionic polymerization, namely a cationic polymerization with a cationic stabilizer. If you choose a radical stabilizer, such as any of the radical stabilizers taught herein, perhaps a maleimide, you can induce an exclusively radical reaction. In some embodiments, the stabilizer can be selected to function as both a cationic stabilizer and a radical stabilizer.

In some embodiments, the stabilizer is selected from the group consisting of maleimide, a maleimide derivative, a quinone, a quinone derivative, a quinone methide, TEMPO or a derivative thereof, TEMPOL or a derivative thereof, p-phenylenediamines, phenothiazine, hydroxylamines including N,N-bis (hydroxypropyl) hydroxylamine (HPHA) and diethylhydroxylamine (DEHA), nitrophenol compounds including dinitro-ortho-cresol and di-nitro-sec-butylphenol (DNBP), and any combination thereof.

In some embodiments, the stabilizer is selected from the group consisting NHS-derivatized lipoic acid (S1), Gly-OSu-NHS derivatized lipoic acid (S2), Sulfo-NHS-derivatized lipoic acid (S3), Gly-OSu-Sulfo-NHS derivatized lipoic acid (S4,S5), Ala-OSu-NHS derivatized lipoic acid (S6), 3-amino-propanoic acid-OSu-NHS derivatized lipoic acid (S7), Ala-OSu-NHS derivatized lipoic acid (S8), 1,4-benzoquinone (S9), N-ethylmaleimide (S10), a C1-C22 alkyl methacrylate (S11), 2-methylenepentanedioic acid (S12), and any combination thereof.

The polymerization reaction and stabilization reactions can be concurrent or in series, with the reactant amounts controlled to drive the reactions and control competing reactions. In some embodiments, the methods include adding an amount of monomer that corresponds to m, and allowing the monomer to react to depletion in a first reaction, and then adding an amount of stabilizer and terminator for stabilizing the polymer, the amount of stabilizer and terminator corresponding to the expected amounts of first active radical or thiol and second active radical or thiol for a second reaction. In some embodiments, the methods include adding an amount of monomer which can correspond to a quantity "m", and allowing the monomer to react to depletion in a first reaction, adding an amount of stabilizer that corresponds to an expected amount of first active radical or thiol for a second reaction which can correspond to a quantity "s", and adding an amount of terminator which can correspond to a quantity "t" that corresponds to an expected amount of second active radical or thiol for a third reaction. It should be appreciated that the stabilizer and terminator can be the same or different chemical moiety, in some embodiments, depending on the process design, intended use, and the like.

The term "stabilizer", "inhibitor", and "terminator" can be used interchangeably in some embodiments, and the term used can be selected based on the experimental design, namely how the chemical moiety is intended to be used. In some embodiments, the radical polymerization reactions are inhibited with oxygen remaining in solution. In some embodiments, inhibitors can be added. It should be appreciated that the following compounds can work as stabilizers, inhibitors, and terminators and, in some embodiments, initiators: (1) free radicals that are stabilized and can react with the type of radicals that are present in the polymerization system, while not reacting with the monomers; (2) compounds that bind with primary or polymer radicals to produce comparatively non-reactive radicals; and (3) compounds that behave as transfer agents. These types of compounds can include, for example, (1) nitro-compounds, (2) compounds that contain sulfur, primarily thiazine, (3) compounds that contain nitrogen, such as nitroso, azo, diazo, etc., (4) aromatic compounds that are based on quinone, or a catechol that may or may not shift, or shuttle back-and-forth, to a quinone, and require oxygen for activation, and (5) a few metal salts and complexes, noting that some can act as initiators. Examples of these compounds that may be used in some embodiments, alone or in combination, include:

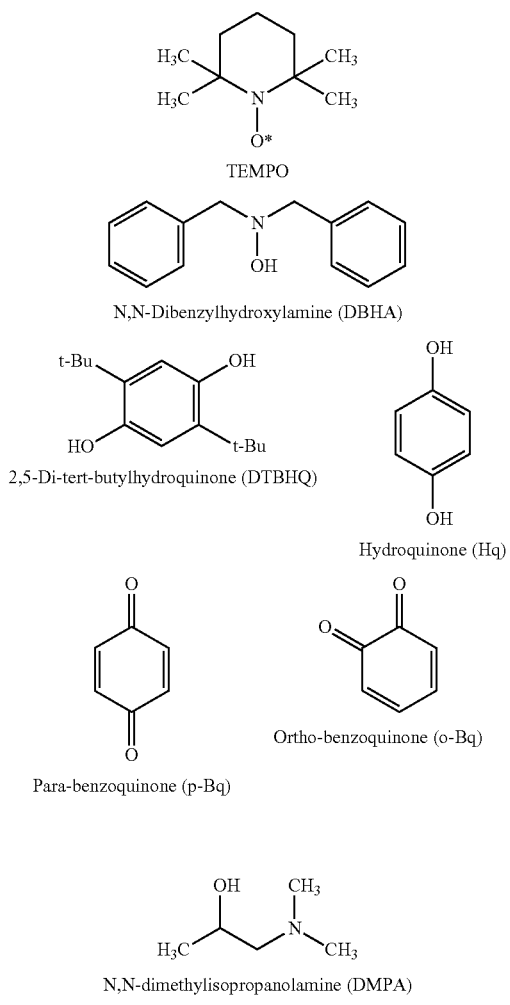

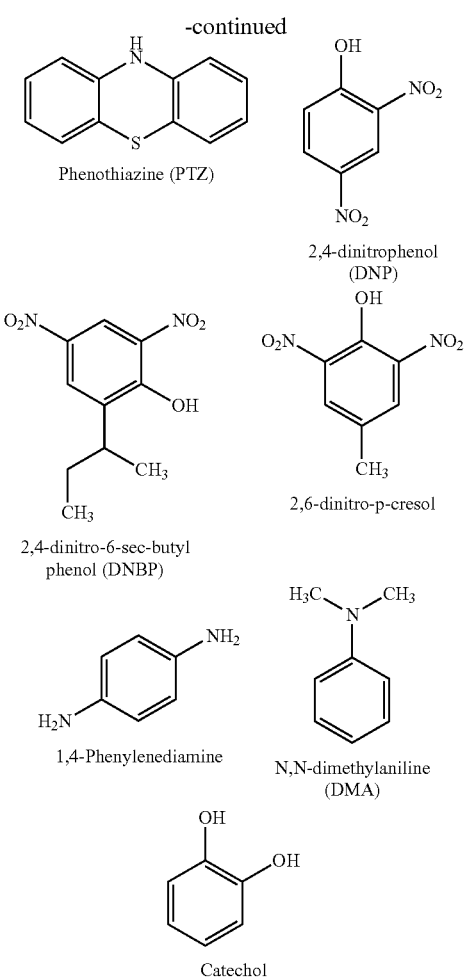

Each of the compounds, of course, can be substituted. For example, Each of the compounds can be substituted with an $R_i$, where i is an integer that is 1 in some embodiments, 2 in some embodiments, 3 in some embodiments, 4 in some embodiments, 5 in some embodiments, 6 in some embodiments 7 in some embodiments, 8 in some embodiments, and any combination of R groups thereof. Each $R_i$ can be is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; and, in some embodiments, at least one Ri includes a carbonyl functionality.

The process of designing a polymerization method herein can include choosing whether a terminator moiety is needed at all, or even desired, for the intended use of the composition. If the terminator moiety is needed at all, or eve desired, for the intended use, the process can further include adjusting the stability of the polymer by choosing a terminator moiety having a desired bond strength between the terminator and polymer. The process can be designed to create an adhesive that is easily degraded and recycled due to the presence of a homogeneous chemistry when depolymerized, for example. Such features are beneficial in any application of the adhesive, whether medical or non-medical. In medical uses, however, it will also be appreciated to have an adhesive that is biocompatible and biodegradable for medical applications, and can provide therapeutic activity through it's monomers upon biodegradation without an unacceptable level of toxicity. And, an adhesive that has barrier properties to block the spread of infections is also desirable. Moreover, a medical grade adhesive that can be used both external to the body and internal to the body would solve that longfelt-but-unsolved need.

Controlling the Rate of Depolymerization Through Selection of a Stabilizer and/or Terminator In some embodiments, the stabilizer can be selected to adjust the rate of depolymerization to a desired amount, such that the polymer is designed through selection of chemical bonds to last for a desired amount of time before depolymerization. The choice of stabilizer moieties further allows to design the stability of the polymer, by choosing whether the stabilizer is needed at all for a desired use, and then adjusting the stability of the polymer for it's desired use by choosing a stabilizer moiety having a desired bond strength between the stabilizer and polymer. The same is true of the choice of terminator moieties by choosing whether to the terminator moiety is needed at all for the desired use, and then further adjusting the stability of the polymer choosing a terminator moiety having a desired bond strength between the terminator and polymer.

As described herein, a stabilizer, terminator, or a combination thereof can be selected to control the depolymerization rate of a polymer taught herein. In some embodiments, a polymeric composition can be designed to depolymerize into monomers in a time ranging from 6 hours to 6 months, from 12 hours to 6 months, from 24 hours to 6 months, from 2 days hours to 6 months, from 3 days hours to 6 months, from 4 days hours to 6 months, from 5 days hours to 6 months, from 6 days hours to 6 months, from 1 week to 6 months, from 2 weeks to 6 months, from 3 weeks to 6 months, from 4 weeks to 6 months, from 5 weeks to 6 months, from 6 weeks to 6 months, or any range or amount of time therein in increments of 1 hour. In some embodiments, a polymeric composition can be designed to depolymerize into monomers in a time ranging from 6 hours to 3 months, from 12 hours to 3 months, from 24 hours to 3 months, from 2 days hours to 3 months, from 3 days hours to 3 months, from 4 days hours to 3 months, from 5 days hours to 3 months, from 6 days hours to 3 months, from 1 week to 3 months, from 2 weeks to 3 months, from 3 weeks to 3 months, from 4 weeks to 3 months, from 5 weeks to 3 months, from 6 weeks to 3 months, or any range or amount of time therein in increments of 1 hour. In some embodiments, a polymeric composition can be designed to depolymerize into monomers in a time ranging from 6 hours to 1 month, from 12 hours to 1 month, from 24 hours to 1 month, from 2 days hours to 1 month, from 3 days hours to 1 month, from 4 days hours to 1 month, from 5 days hours to 1 month, from 6 days hours to 1 month, from 1 week to 1 month, from 2 weeks to 1 month, from 3 weeks to 1 month, or any range or amount of time therein in increments of 1 hour. In some embodiments, a polymeric composition can be designed to depolymerize into monomers in 12 hours, 18 hours, 24 hours, 36 hours, 48 hours, 60 hours, 72 hours, 84 hours, 96 hours, 120 hours, 144 hours, or any range or amount of time therein in increments of 1 hour.

In some embodiments, the polymeric composition is designed to depolymerize to at least a substantial amount over a desired time. In this context, the term "substantial amount", in some embodiments, can refer to a depolymerization that meets the environmental safety definition of a safe amount of degradation, for example, to meet toxicity standards, solution or solid solubility standards, and the like, over the desired time. In some embodiments, a substantial amount of depolymerization can allow for a biological clearance of the polymer from a subject, for example, the polymer can degrade to a molecular weight of no more than 40,000 Daltons, 30,000 Daltons, 20,000 Daltons, 10,000 Daltons, 5,000 Daltons, 2,000 Daltons, or any range or size therein in increments of 100 Daltons. In some embodiments, a substantial amount of depolymerization can allow for recycling, at any desired amount of efficiency, for example a recycle reclamation efficiency of 100%, 90%, 80%, 70%, 60%, 50%, 40%, 30%, 20%, 10%, 5%, or any range or amount therein in increments of 1%, meaning that the monomeric components depolymerize efficiently to their monomeric form to the extent desired to meet the recycle reclamation efficiency by requiring an amount added monomer, and/or the amount stabilizer, targeted to meet the depolymerization efficiency desired in a recycling process.

In some embodiments, a plurality of stabilizer molecules can be configured to stabilize the first active radical or thiol end of the polymer. The plurality of stabilizer molecules can include the substituted cyclic disulfide molecules derivatized to have a functional group that forms a first labile bond with the first active radical or thiol end of the polymer. In some embodiments, the first labile bond selected from the group consisting of a thioester bond, a thiocarbamate bond, and a thioether bond.

In some embodiments, a plurality of stabilizer molecules can be configured to stabilize the second active radical or thiol end of the polymer. The plurality of stabilizer molecules can include the substituted cyclic disulfide molecules derivatized to have a functional group that forms a second labile bond with the second active radical or thiol end of the polymer. In some embodiments, second first labile bond selected from the group consisting of a thioester bond, a thiocarbamate bond, and a thioether bond.

In some embodiments, a plurality of stabilizer molecules can be configured to stabilize the first and second active radical or thiol end of the polymer. The plurality of stabilizer molecules can include the substituted cyclic disulfide molecules derivatized to have a functional group that forms a first labile bond with the first active radical or thiol end of the polymer and a second labile bond with the second active radical or thiol end of the polymer. In some embodiments, first and/or second first labile bond is each selected from the group consisting of a thioester bond, a thiocarbamate bond, and a thioether bond.

It should be appreciated that term "labile" is a term in the art of chemistry that can refer to a bond that is cleavable by a biological mechanism inside the human body, such that a labile bond is one that adds to the biodegradable characteristic of an adhesive composition, or polymer, taught herein. In some embodiments, "labile" can refer to a bond that is cleavable by any chemical means that one of skill may use in a recycling process, such that the cleavage of the labile bond results in monomers that are the same or similar to, or substantially similar to, the original monomers reacted to form an original or regenerated adhesive composition or polymer taught herein, where "regenerated" can be used to refer to a polymer or material made from recycled monomers, and the term "substantially" and "substantially similar" can refer to a term of degree, where something that is "substantially the same" would be the same for all practical purposes to the ordinary skilled artisan upon a first consideration without further any further consideration needed. A molecule or material that appears "similar" to an ordinary skilled artisan may be considered to possibly have the desired function or activity but may need a second consideration or testing. A "substantially similar" molecule, on the other hand, would obviously have the desired function or activity in the view of the skilled artisan upon the first consideration. In some embodiments, the term "labile" can refer to a degradation of the adhesive composition or monomer from ambient environment conditions present in nature including the presence of water, heat, UV energy, bacteria, fungi, molds, enzymes, acids, bases, and the like, and any combination thereof. In some embodiments, the labile nature of bonds is a desired feature of biodegradation. In some embodiments, the labile nature of bonds is a desired feature of environmental hygiene and/or safety. In some embodiments, the labile nature of bonds is a desired feature for bioelimination from a subject through ordinary filtration and excretion by the body. In some embodiments, the labile nature of bonds is a desired feature for recycling.

The monomers used in the polymerization form the repeating units of the polymer. In some embodiments, the monomers and the stabilizer molecules are the same or substantially the same chemical moieties following a depolymerization of the polymer. This can be beneficial in a recycling process of the polymeric material because the monomer and the stabilizer are the same or similar molecules following depolymerization of the polymer. It should be appreciated that to be "the same" can be construed to mean identical, and so the terms "substantially" or "similar" are used to reflect the understanding that the skilled artisan would see a significant difference between the chemical moieties in a mixture. To substantially the same, or similar, for example, the chemical moieties (i) may only differ in structure in a way that is easily converted to be identical to the original monomer used in the reaction; (ii) may only differ in structure in a way that does not appreciably affect the repolymerization of the monomers to a regenerated material to have a desired function; (iii) may only differ in structure in a way that does not appreciably affect the repolymerization of the monomers to a regenerated material to have a desired biocompatibility; (iv) may only differ in structure in a way that does not appreciably affect the repolymerization of the monomers to a regenerated material to have a desired toxicity level; and/or (v) may have a desired yield in a repolymerization, regardless of whether a desired function is obtained in every repolymerization.

In some embodiments, the stabilizers include R—OH, R—NH, R—SH, R-carbonyls, R-thiocarbonyls, R-carboxyls, R-thiocarboxyls, R-esters, R-anhydrides, R-quinones, R-thioquinones, R-isocyanates, R-diisocyanates, R-imidazoles, and the like, where R can be any alkyl, cycloalkyl, alkenyl, alkynyl, and aryl groups having from 1-14 carbons; hydroxylated alkyl, cycloalkyl, alkenyl, alkynyl, and aryl groups having from 1-14 carbons; and, carboxylated alkyl, cycloalkyl, alkenyl, alkynyl, and aryl groups having from 1-14 carbons. In these embodiments, the stabilizers can include carbonyl imidazoles, N-hydroxy succinimide (NHS) esters, N-hydroxysulfosuccinimide esters, N-hydroxy phthalimide esters, N-hydroxy succinimide (NHS) esters of lipoic acid, and N-hydroxy succinimide (NHS) esters of asparagusic acid. The stabilizers can be configured for shape, size, and chemical activity, to control reactivity and function as desired, for example, to alter the strength of the labile bond with the active thiol end group, the strength of the stabilizer as a nucleophile, the strength of the stabilizer as an electrophile, steric hindrance, rate of reactivity, rate of polymerization, and the like. It should be appreciated that, in some embodiments, the number of carbons in any of the stabilizers can be configured by the skilled artisan to range from 1-14, 1-12, 1-10, 1-8, 1-7, 1-6, 1-5, 1-4, 1-3, 1-2, 1, or any amount or range of carbons therein.

In some embodiments, the stabilizers can be selected from the group consisting of

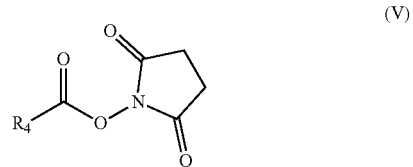

(V)

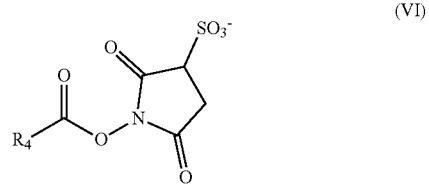

(VI)

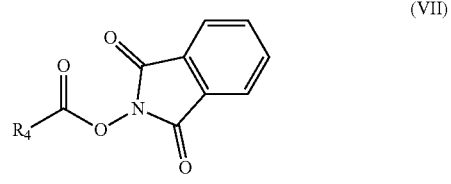

(VII)

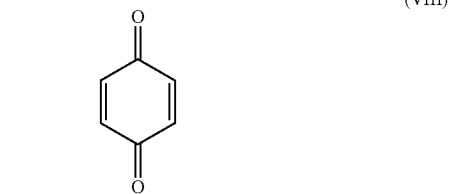

(VIII)

(IX)

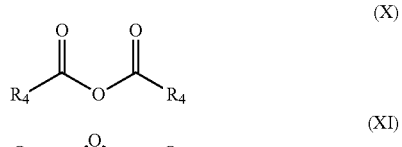

(X)

(XI)

(XII)

Namely, N-hydroxy succinimide (NHS) esters (V), N-hydroxysulfosuccinimide esters (VI), N-hydroxy phthalimide esters (VII), oxidized polyphenols, quinones (VIII), isocyanates (IX), linear or cyclic or poly anhydrides (X, XI), and carbonyl imidazoles (XII);

wherein, $R_4$ can be selected from the group consisting of an alkyl dithiolane; a poly dithiolane, OH; a linear, branched or cyclic saturated or unsaturated C1-C8 group, including smaller versions thereof that include a C1-C6 alkyl group, a C1-C4 alkyl group, a C1-C3 alkyl group, a C2 alkyl group, or a C1 alkyl group; a linear, branched or cyclic saturated or unsaturated macromolecules; an aromatic or heterocyclic aromatic group; and alpha or beta amino acid; an alpha or beta peptide; dopamine; a monosaccharide, disaccharide, oligosaccharide or polysaccharide; 1,4-dihydrophenonthrolin-4-one-3-carboxylic acid; polyethylene glycol; and, a therapeutic molecule having a molecular weight of no more than 40,000 Daltons, 30,000 Daltons, 20,000 Daltons, 10,000 Daltons, 5000 Daltons, 3000 Daltons, 2000 Daltons, 1000 Daltons, 500 Daltons, or any range therein in increments of 100 Daltons. Any therapeutic molecule can be used, and in some embodiments, the therapeutic molecule can be selected from the group consisting of an antioxidant, an anti-inflammatory, an analgesic, an antiproliferant, an immunomodulator, an antimicrobial, an antibacterial, an antifungal, an antiviral, or any combination thereof.

It should be appreciated that the terminators can be selected in the same way as the stabilizers, as taught above. In some embodiments, for example, the terminators are designed to attach and release as desired from the polymer in the same or similar manner as the stabilizers, for the same or similar reasons.

Reaction and Carrier Solvents

The polymerization of the cyclic disulfide monomer can occur in an aqueous solution with water and a water-miscible solvent. In some embodiments, a polar, protic solvent can be used. For purposes of efficiency, all of the solvents taught herein as a carrier solvent or reaction solvent can be referred to as either "carrier solvent" or "reaction solvent". Ethanol, water, a combination of ethanol and water, any aqueous media such as saline or a buffer solution, and the like, are examples of polar, protic solvents. DMSO and DMF are examples of solvents miscible in water, and both are polar, aprotic solvents.

The polar, protic solvents used can be any solvent considered suitable by a skilled artisan. Several suitable polar, protic solvents are taught herein, and each can be used at the discretion of the skilled artisan in view of the desired use. In some embodiments, for example, the polar, protic solvent can be pure ethanol, pure water, a combination of ethanol and water, or any aqueous solution suitable for the particular environment. In some embodiments the environment is a medical environment, and the polar, protic solvent includes a saline solution, or a buffer solution that can be used in a living organism.

Any aqueous solvent can be used, in some embodiments, and so water can be combined with any water miscible solvent. However, green solvents can be preferred in some embodiments, and solvents that are considered "green" to those of skill can be used. In some embodiments, the aqueous alcohol carrier can be a combination of ethanol:water. In such embodiments, the ratio of ethanol:water can range, for example, from 10:90 to 90:10, and either a weight ratio or a mole ratio can be used as a basis to select a desired carrier. In some embodiments, the range of 10:90 to 90:10 ethanol:water is a weight ratio used to select the desired aqueous alcohol carrier.

In some embodiments, a reaction solvent can include the fluids in the reaction environment. In some embodiments, the reaction environment is a biological fluid. Examples of biological fluids include but are not limited to blood, urine, sweat, amniotic fluid, spinal fluid, serum, plasma, isotonic saline, and cell culture media. Any aqueous media used as a reaction solvent or carrier may be buffered using PBS, DPBS, HEPES, MOPS, MES, BES, MOPSO, Tricine, Bicine, and TAPS or other buffers.

Component Concentrations and Reaction Conditions

It should be appreciated that an increase in the reactant concentration causes a decrease in polymerization time. As such, the reactant concentration can be selected to drive the reaction as desired and decrease reaction time. In some embodiments, the reactants are monomers, or monomers and stabilizers, and the concentration of each reactant, a plurality of the reactants, or the total reactant, ranges from 100 mg/ml to 1000 mg/ml, from 100 mg/ml to 900 mg/ml, from 100 mg/ml to 800 mg/ml, from 100 mg/ml to 700 mg/ml, from 100 mg/ml to 600 mg/ml, from 100 mg/ml to 500 mg/ml, from 100 mg/ml to 400 mg/ml, from 100 mg/ml to 300 mg/ml, from 100 mg/ml to 200 mg/ml, 200 mg/ml to 1000 mg/ml, from 200 mg/ml to 900 mg/ml, from 200 mg/ml to 800 mg/ml, from 200 mg/ml to 700 mg/ml, from 200 mg/ml to 600 mg/ml, from 200 mg/ml to 500 mg/ml, from 200 mg/ml to 400 mg/ml, from 200 mg/ml to 300 mg/ml, 300 mg/ml to 1000 mg/ml, from 300 mg/ml to 900 mg/ml, from 300 mg/ml to 800 mg/ml, from 300 mg/ml to 700 mg/ml, from 300 mg/ml to 600 mg/ml, from 300 mg/ml to 500 mg/ml, from 300 mg/ml to 400 mg/ml, 400 mg/ml to 1000 mg/ml, from 400 mg/ml to 900 mg/ml, from 400 mg/ml to 800 mg/ml, from 400 mg/ml to 700 mg/ml, from 400 mg/ml to 600 mg/ml, from 400 mg/ml to 500 mg/ml, 500 mg/ml to 1000 mg/ml, from 500 mg/ml to 900 mg/ml, from 500 mg/ml to 800 mg/ml, from 500 mg/ml to 700 mg/ml, from 500 mg/ml to 600 mg/ml, or any amount or range therein in increments of 10 mg/ml. In some embodiments, the reactants are monomers, or monomers and stabilizers, and the concentration of each reactant, a plurality of the reactants, or the total reactant is about 100 mg/ml, 200 mg/ml, 300 mg/ml, 400 mg/ml, 500 mg/ml, 600 mg/ml, 700 mg/ml, 800 mg/ml, 900 mg/ml, 1000 mg/ml, 1100 mg/ml, 1200 mg/ml, 1300 mg/ml, 1400 mg/ml, 1500 mg/ml, 1600 mg/mi, 1700 mg/ml, 1800 mg/ml, 1900 mg/ml, 2000 mg/ml, or any amount or range therein in increments of 10 mg/ml.

In some embodiments, the term "about" can be used to refer to a range of amounts that surround the quantity that is modified by the term. It should be appreciated that one amount is "about" the same as another amount when the effects of the change of the amount do not make an appreciable change in the yield, function, activity, toxicity, or any other significant characteristic of a process or product produced by the process. An appreciable change, in some embodiments, can refer to a change that is not acceptable from a cost standpoint, manufacturing standpoint, product standpoint, utility standpoint, or a combination thereof. The term "about" is often used to cover such ranges, and it is intended herein to be construed to include amounts that do not have such a range at all; and, therefore, the term "about" is intended to be in amending patent claims to resolve, for example, any concerns presented about indefiniteness of such an amount, or written description, or perhaps even enablement. In some embodiments, when removing the term "about", the remaining limitation is to be construed as the exact amount or range of the quantity or effect described. In some embodiments, when removing the term "about", the doctrine of equivalents can be assumed when construing the claims.

In some embodiments, the reactants are monomers, or monomers and stabilizers, and the concentration in solution is maximized by evaporating solvent to only a residual amount by evaporating, reducing pressure, or heating the reaction mixture to an observable minimal amount of solvent. In some embodiments, the minimal amount of solvent is sufficient to allow the monomers to remain soluble until polymerization. In some embodiments, the minimal amount of solvent is only that which allows the solvent to be observed within a polymerized monomer in the reaction mixture. In some embodiments, the minimal amount of solvent is that in which the solvent appears entirely removed but shows a substantial presence within a polymerized monomer in a chemical analysis of the reaction mixture.

The amounts of the reaction components can be expressed in mol % or weight % based on the amount of reactants and disregarding the carrier. As noted, the composition of the reaction mixtures can be all monomer; monomer and stabilizer; monomer, stabilizer, and terminator; or, monomer, stabilizer, and terminator. DMSO, an acid taught herein, or a combination of DMSO and an acid can be added to increase the rate of ionic polymerization, namely cationic polymerization in the reaction mixtures in some embodiments. Cross-linkers can be added to increase the strength of the adhesive compositions.

In some embodiments, the mol % of a monomer (or combination of the monomer and it's conjugate base) can range from 80 mol % to 100 mol %, from 80 mol % to 95 mol %, from 80 mol % to 90 mol %, from 80 mol % to 85 mol %, or any range or mol % therein in increments of 1 mol %, such as about 80 mol %, about 81 mol %, about 82 mol %, about 83 mol %, about 84 mol %, about 85 mol %, about 86 mol %, about 87 mol %, about 88 mol %, about 89 mol %, about 90 mol %, about 91 mol %, about 92 mol %, about 93 mol %, about 94 mol %, about 95 mol %, about 96 mol %, about 97 mol %, about 98 mol %, about 99 mol %, about 100 mol %. In embodiments that combine the monomer with it's conjugate base, the combination of the monomer to the conjugate base can be at a ratio that ranges from 5:1 to 1:5, such as 1:1, 2:1, 3:1, 4:1, or 5:1, 1:5, 1:4, 1:3, or 1:2 in the total mol % of that component. These percent amounts can also be used to represent weight %, in some embodiments, and are not repeated to avoid redundancy. This measure can be used to refer to each reactant alone, defined independently within a reaction, a plurality of the reactants, or the total reactant (or combination of the reactants and any conjugate bases).

In some embodiments, the mol % of the stabilizer can range from 0 mol % to 20 mol %, 0 mol % to 15 mol %, 0 mol % to 10 mol %, 0 mol % to 5 mol %, or any range or mol % therein in increments of 1 mol %, such as about 0 mol %, about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, about 15 mol %, about 16 mol %, about 17 mol %, about 18 mol %, about 19 mol %, and about 20 mol %, or any amount or range therein in increments of 0.5 mol %. This same amount of mol % can be used for the terminator, as the ratio of first active radical or thiol to second active radical or thiol can reasonably be assumed to be the same or similar in embodiments taught herein. However, it should be appreciated that, since alkanols work well for the terminator, and since ethanol is a convenient reaction solvent or component of a reaction solvent in some embodiments, the reaction solvent can serve as a source of excess terminator in such embodiments. These percent amounts can also be used to represent weight %, in some embodiments, and are not repeated to avoid redundancy. This measure can be used to refer to each stabilizer alone, defined independently within a reaction, a plurality of the stabilizers, or the total stabilizer (e.g. combinations of stabilizers).

The stabilizer can be added in excess to drive the reaction and, in some embodiments, to allow the excess stabilizer to serve as terminator in addition to the stabilizer. Excess stabilizer can create different mechanical and physical properties, particularly where the stabilizer is the same as, as or similar to, the monomer. In some embodiments, the excess stabilizer can cause branching and physical entanglement between polymer chains to enhance, for example, cohesive strength within the adhesive. In some embodiments, the excess stabilizer can cause cross-linking between polymers. In some embodiments, the excess stabilizer can control chain length, where an increase in stabilizer concentration can short the chain length. In some embodiments, the stabilizer is added in an amount in excess of the stoichiometrically required amount of stabilizer needed for the reaction. In some embodiments, the stabilizer is added in an amount that is a 1%, 2%, 3%, 4%, 5%, 10%, 15%, 20%, 25%, 30%, 35%, 40%, 45%, 50%, or any range or amount therein in increments of 0.1%, excess of the stoichiometrically required amount of stabilizer needed for the reaction. It should be understood that "the amount needed for the reaction" will vary according to the design of the polymerization process and, namely, the function to be served by the stabilizer including whether the stabilizer terminates the polymerization reaction. In some embodiments, the stabilizer does not terminate the polymerization reaction. In some embodiments, the stabilizer does termination the polymerization reaction.

In some embodiments, the monomer is the stabilizer and, as the monomer concentration depletes, the radical sulfur endgroup converts to a thiol, at which time the remaining monomer functions as the stabilizer and electrophilically terminates the reaction and stabilizes the polymer.

In some embodiments, DMSO is not used to catalyze the reactions, and in embodiments in which DMSO is used to help facilitate polymerization, the DMSO can be added in what a skilled artisan would consider "a catalytic amount", which is readily determined by the skilled artisan. In some embodiments, the DMSO is added to a reaction mixture in an amount ranging from 0 mol % to the catalytic amount. In some embodiments, the DMSO is added to a reaction mixture in an amount ranging from 0 ul/ml to 500 ul/ml, from 50 ul/ml to 400 ul/ml, from 75 ul/ml to 300 ul/ml, from 100 ul/ml to 200 ul/ml, or any range or amount therein in increments of 10 ul/ml. In some embodiments, the DMSO is added to a reaction mixture in an amount of about 50 ul/ml, about 75 ul/ml, about 100 ul/ml, about 125 ul/ml, about 150 ul/ml, about 175 ul/ml, about 200 ul/ml, about 225 ul/ml, about 250 ul/ml, about 275 ul/ml, about 300 ul/ml, or any range or amount therein in increments of 5 ul/ml.

In some embodiments, acid is not used to catalyze the reactions but, in other embodiments in which acid is used to help facilitate polymerization, the acid can be added in what a skilled artisan would consider "a catalytic amount", which is readily determined by the skilled artisan. In some embodiments, the acid is added to a reaction mixture in an amount ranging from 0 mol % to the catalytic amount. In some embodiments, the acid is added to a reaction mixture in an amount ranging from 0 mol % to 20 mol %, from 5 mol % to 20 mol %, from 10 mol % to 20 mol %, from 15 mol % to 20 mol %, or any range or amount therein in increments of 1 mol %. In some embodiments, the acid is added in an amount of about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, about 15 mol %, about 16 mol %, about 17 mol %, about 18 mol %, about 19 mol %, about 20 mol %, or any range or amount therein in increments of 0.5 mol %.

As noted herein, a cross-linker can be added to increase the strength of the adhesions compositions. It should be appreciated that any cross-linker known to those of skill in the art of polymer chemistry and materials can be used where suitable and appropriate to the intended use and the chemical structure and functionality of the adhesive composition. In some embodiments, the process includes adding a cross-linker taught herein. The type of cross-linker selected can affect the amount of cross-linker needed, as can the type of cross-linker selected, and the amount added, can be chosen for a particular desired use of the adhesive composition. For example, a cross-linker can be added to create a desired mechanical response of the adhesive composition and/or, perhaps, a desired thermal response of the adhesive composition and/or, perhaps a desired thermomechanical response of the adhesive composition. In some embodiments, a mechanical response may be the "softness" of the composition, and the cross-linker may be added to modulate the polymer to have a lower modulus and higher fracture strain where a more "stretchable" adhesive composition may be desired. In another example, strength and hardness may be more desirable where the environment can be more punishing, such as in thin-film solar cells integrated with rooftops, roads, sidewalks, parking lots, and vehicle and aeronautic surfaces; heads-up displays in eyeglasses, windshields, and cockpits; and, perhaps integration with textiles, especially in physically demanding contexts (military, rescue, and medical workers). One of skill will appreciate that any of a variety of cross-linkers, including those taught herein, can be added to obtain any of a variety of mechanical responses in the adhesive compositions, with the desired mechanical response depends on the desired use for the adhesive composition.

In some embodiments, a cross-linker can be added in an amount of 1 mol % to 40 mol %, 1 mol % to 35 mol %, 1 mol % to 30 mol %, 1 mol % to 25 mol %, 1 mol % to 20 mol %, 1 mol % to 15 mol %, 1 mol % to 10 mol %, 1 mol % to 5 mol %, 5 mol % to 40 mol %, 5 mol % to 35 mol %, 5 mol % to 30 mol %, 5 mol % to 25 mol %, 5 mol % to 20 mol %, 5 mol % to 15 mol %, 5 mol % to 10 mol %, 10 mol % to 40 mol %, 10 mol % to 35 mol %, 10 mol % to 30 mol %, 10 mol % to 25 mol %, 10 mol % to 20 mol %, 10 mol % to 15 mol %, or any amount or range therein in increments of 1 mol %. In some embodiments, the cross-linker can be added in an amount of about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, about 15 mol %, about 16 mol %, about 17 mol %, about 18 mol %, about 19 mol %, about 20 mol %, about 21 mol %, about 22 mol %, about 23 mol %, about 24 mol %, about 25 mol %, about 26 mol %, about 27 mol %, about 28 mol %, about 29 mol %, about 30 mol %, about 31 mol %, about 32 mol %, about 33 mol %, about 34 mol %, about 35 mol %, about 36 mol %, about 37 mol %, about 38 mol %, about 39 mol %, about 40 mol %, or any amount, range, or combination of these amounts. These amounts can also be expressed weight percents, in some embodiments. More than one cross-linker can be used in combination. This measure can be used to refer to each cross-linker alone, defined independently within a reaction, a plurality of cross-linkers, or the total cross-linker (or combination of cross-linkers)

The process provided herein are directed to operating under ambient environmental and biological conditions, including ambient and biological pH. However, in some embodiments, the pH of the reactions can also be varied to achieve desired chemical activity in the reaction, namely reaction kinetics and products. In the polymerization reactions taught herein, for example, it was found that a lower pH can be expected to enhance polymerization. The pH that works the best for a set of reaction conditions will depend on the monomeric components being polymerized, the presence and type of reaction solvent, and the pressure of the reaction. In some embodiments, for example, the pH can range from a pH of 1 to a pH of 9, from a pH of 1 to a pH of 8, from a pH of 1 to a pH of 7, from a pH of 1 to a pH of 6, from a pH of 1 to a pH of 5, from a pH of 1 to a pH of 4, from a pH of 1 to a pH of 3, from a pH of 1 to a pH of 2, from a pH of 2 to a pH of 9, from a pH of 2 to a pH of 8, from a pH of 2 to a pH of 7, from a pH of 2 to a pH of 6, from a pH of 2 to a pH of 5, from a pH of 2 to a pH of 4, from a pH of 2 to a pH of 3, from a pH of 3 to a pH of 9, from a pH of 3 to a pH of 8, from a pH of 3 to a pH of 7, from a pH of 3 to a pH of 6, from a pH of 3 to a pH of 5, from a pH of 3 to a pH of 4, from a pH of 4 to a pH of 9, from a pH of 4 to a pH of 8, from a pH of 4 to a pH of 7, from a pH of 4 to a pH of 6, from a pH of 4 to a pH of 5, from a pH of 5 to a pH of 9, from a pH of 5 to a pH of 8, from a pH of 5 to a pH of 7, from a pH of 5 to a pH of 6, from a pH of 6 to a pH of 9, from a pH of 6 to a pH of 8, from a pH of 6 to a pH of 7, from a pH of 6 to a pH of 8, from a pH of 6 to a pH of 7, from a pH of 7 to a pH of 8, or any pH or pH range therein in increments of 0.1 pH. In some embodiments, the pH can be a pH of about 1, a pH of about 2, a pH of about 3, a pH of about 4, a pH of about 5, a pH of about 6, a pH of about 7, a pH of about 8, a pH of about 9, or any pH or pH range therein in increments of 0.1 pH. The pH can also vary during the course of a reaction, in some embodiments. The effect can be to increase the kinetics of the reaction, decrease the kinetics of the reaction, quell the reaction, or convert the reaction products. In some embodiments, the pH can be increased during the course of such a process. In some embodiments, the pH can be decreased during the course of such a process. And, in some embodiments the pH can oscillate during the course of such a process.

The process provided herein are directed to operating under ambient environmental and biological conditions, including ambient and biological temperatures. However, in some embodiments, the temperature of the reactions can also be varied to achieve desired chemical activity in the reaction, namely reaction kinetics and products. In the polymerization reactions taught herein, for example, a lower temperature can be expected to at least reduce the rate of polymerization, and a higher temperature can be expected to at least increase the rate of polymerization. Likewise, the rate of depolymerization will also decrease at a lower temperature and increase at a higher temperature. It should be appreciated that, if we increase the temperature, then we have more product and the reaction shifts towards the reactants; and, if we decrease the temperature, then have less product and so the reaction shifts towards the products. The temperature that works the best for a set of reaction conditions will depend on the monomeric components being polymerized, the presence and type of reaction solvent, and the pressure of the reaction.

In some embodiments, for example, the temperature of a desired reaction can be selected as any temperature at which the desired reaction will occur, taking into account the desired kinetics, the desired products of the reaction, and other factors of consideration, such as the design of the reaction into the methods and systems, the costs of production, and the like. In some embodiments, the temperature of a desired reaction can range from 0° C. to 120° C., from 0° C. to 110° C., from 0° C. to 100° C., from 0° C. to 95° C., from 0° C. to 90° C., from 0° C. to 85° C., from 0° C. to 80° C., from 0° C. to 75° C., from 0° C. to 70° C., from 0° C. to 65° C., from 0° C. to 60° C., from 0° C. to 55° C., from 0° C. to 50° C., from 0° C. to 45° C., from 0° C. to 40° C., from 0° C. to 39° C., from 0° C. to 38° C., from 0° C. to 37° C., from 0° C. to 36° C., from 0° C. to 35° C., from 0° C. to 34° C., from 0° C. to 33° C., from 0° C. to 32° C., from 0° C. to 31° C., from 0° C. to 30° C., from 0° C. to 29° C., from 0° C. to 28° C., from 0° C. to 27° C., from 0° C. to 26° C., from 0° C. to 25° C., from 0° C. to 24° C., from 0° C. to 23° C., from 0° C. to 22° C., from 0° C. to 21° C., from 0° C. to 20° C., from 0° C. to 19° C., from 0° C. to 18° C., from 0° C. to 17° C., from 0° C. to 16° C., from 0° C. to 15° C., or any amount or range therein in increments of 0.1° C.

In some embodiments, the temperature of a desired reaction can range from 5° C. to 120° C., from 10° C. to 120° C., from 15° C. to 120° C., from 20° C. to 120° C., from 25° C. to 120° C., from 30° C. to 120° C., from 35° C. to 120° C., from 40° C. to 120° C., from 45° C. to 120° C., from 50° C. to 120° C., from 55° C. to 120° C., from 60° C. to 120° C., from 65° C. to 120° C., from 70° C. to 120° C., from 75° C. to 120° C., from 80° C. to 120° C., from 85° C. to 120° C., from 90° C. to 120° C., from 95° C. to 120° C., from 100° C. to 120° C., from 105° C. to 120° C., from 110° C. to 120° C., from 115° C. to 120° C., or any amount or range therein in increments of 1° C. In some embodiments, for example, the temperature of a desired reaction can range from 10° C. to 100° C., from 15° C. to 100° C., from 20° C. to 100° C., from 25° C. to 100° C., from 30° C. to 100° C., from 35° C. to 100° C., from 40° C. to 100° C., from 45° C. to 100° C., from 50° C. to 100° C., from 55° C. to 100° C., from 60° C. to 100° C., from 65° C. to 100° C., from 70° C. to 100° C., from 75° C. to 100° C., from 80° C. to 100° C., from 85° C. to 100° C., from 90° C. to 100° C., from 95° C. to 100° C., or any amount or range therein in increments of 1° C. In some embodiments, for example, the temperature of a desired reaction can range from 20° C. to 100° C., from 25° C. to 100° C., from 30° C. to 100° C., from 35° C. to 100° C., from 40° C. to 100° C., from 45° C. to 100° C., from 50° C. to 100° C., from 55° C. to 100° C., from 60° C. to 100° C., from 65° C. to 100° C., from 70° C. to 100° C., from 75° C. to 100° C., from 80° C. to 100° C., from 85° C. to 100° C., from 90° C. to 100° C., from 95° C. to 100° C., or any amount or range therein in increments of 1° C. In some embodiments, for example, the temperature of a desired reaction can range from 20° C. to 80° C., from 25° C. to 80° C., from 30° C. to 80° C., from 35° C. to 80° C., from 40° C. to 80° C., from 45° C. to 80° C., from 50° C. to 80° C., from 55° C. to 80° C., from 60° C. to 80° C., from 65° C. to 80° C., from 70° C. to 80° C., from 75° C. to 80° C., or any amount or range therein in increments of 1° C. In some embodiments, for example, the temperature of a desired reaction can range from 20° C. to 60° C., from 25° C. to 60° C., from 30° C. to 60° C., from 35° C. to 60° C., from 40° C. to 60° C., from 45° C. to 60° C., from 50° C. to 60° C., from 55° C. to 60° C., from 60° C. to 60° C., or any amount or range therein in increments of 1° C. In some embodiments, for example, the temperature of a desired reaction can range from 20° C. to 40° C., from 25° C. to 40° C., from 30° C. to 40° C., from 35° C. to 40° C., or any amount or range therein in increments of 1° C.

In some embodiments, for example, the temperature of a desired reaction can be about 0° C., about 1° C., about 2° C., about 3° C., about 4° C., about 5° C., about 6° C., about 7° C., about 8° C., about 9° C., about 10° C., about 11° C., about 12° C., about 13° C., about 14° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., 52° C., about 53° C., 54° C., about 55° C., about 56° C., about 57° C., about 58° C., about 59° C., about 60° C., about 61° C., about 62° C., about 63° C., about 64° C., about 65° C., about 66° C., about 67° C., about 68° C., about 69° C., about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., about 90° C., about 91° C., about 92° C., about 93° C., about 94° C., about 95° C., about 96° C., about 97° C., about 98° C., about 99° C., about 100° C., about 101° C., about 102° C., about 103° C., about 104° C., about 105° C., about 106° C., about 107° C., about 108° C., about 109° C., about 110° C., about 111° C., about 112° C., about 113° C., about 114° C., about 115° C., about 116° C., about 117° C., about 118° C., about 119° C., about 120° C., or any amount or range therein in increments of 0.1° C.

The temperature used during the sequence of events in a system, method, or process, or in a desired single reaction, can also vary during the course of a reaction, in some embodiments. The effect can be to increase the kinetics of the reaction, decrease the kinetics of the reaction, quell the reaction, or convert the reaction product percent conversion or percent conversion ratios. In some embodiments, the temperature of a single desired reaction can be increased during the course of such a process, while the temperature of other desired reactions can be reduced, sustained, or increased. In some embodiments, the temperature differences between a first desired reaction and a second desired reaction in a polymerization process taught herein can be, for example, about 0° C., about 1° C., about 2° C., about 3° C., about 4° C., about 5° C., about 6° C., about 7° C., about 8° C., about 9° C., about 10° C., about 11° C., about 12° C., about 13° C., about 14° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., or any amount or range therein in increments of 0.1° C. In some embodiments, the temperature can be decreased during the course of such a process. And, in some embodiments the temperature can oscillate during the course of such a process for any one or more desired reactions in the polymerization process.

The process provided herein are directed to operating under ambient environmental and biological conditions, including ambient and biological pressures. However, the pressure of the reactions can also be varied. The reactions can be in solution, suspension, or a solid, in a reaction solvent that can include any reaction solvent taught herein, for example, polar, protic solvents, polar, aprotic solvents, alcohol solvents, aqueous solvents, water, any combination of those, and the like. The amount of pressure desired can vary according to the reaction solvent, or solvent combination, selected for the reaction. In some embodiments, the pressure can vary from 1 bar to a pressure reduced as low as 0 bar. In some embodiments, the pressure is limited to the limits of vacuum source used including, for example, about $10^{-1}$ torr, about $10^{-2}$ torr, about $10^{-3}$ torr, about $10^{-4}$ torr, about $10^{-5}$ torr, about $10^{-6}$ torr, about $10^{-4}$ torr, about $10^{-8}$ torr, about $10^{-9}$ torr, about $10^{-10}$ torr, about $10^{-11}$ torr, or any amount or range therein. In some embodiments, high pressures can be used for reactions during the formation of a desired solid product from polymeric materials in a compression process, and the pressure used can depend on the temperature used, where the pressure increases as the temperature decreases, and the pressure decreases and the temperature increases. In some embodiments, the pressure used can range from 14.7 psi to 10,000 psi, or any amount or range therein in increments of 1 psi. In some embodiments, the pressure used can range from 100 psi to 10,000 psi, 200 psi to 10,000 psi, from 300 psi to 10,000 psi, from 400 psi to 10,000 psi, from 500 psi to 10,000 psi, from 600 psi to 10,000 psi, from 700 psi to 10,000 psi, from 800 psi to 10,000 psi, from 900 psi to 10,000 psi, from 1000 psi to 10,000 psi, from 2000 psi to 10,000 psi, from 3000 psi to 10,000 psi, from 4000 psi to 10,000 psi, from 5000 psi to 10,000 psi, from 6000 psi to 10,000 psi, from 7000 psi to 10,000 psi, from 8000 psi to 10,000 psi, from 9000 psi to 10,000 psi, from 2000 psi to 5,000 psi, from 5000 psi to 10,000 psi, or any amount or range therein in increments of 10 psi. In some embodiments, the pressure used can be about 100 psi, about 500 psi, about 1000 psi, about 1500 psi, about 2000 psi, about 2500 psi, about 3000 psi, about 3500 psi, about 4000 psi, about 4500 psi, about 5000 psi, about 5500 psi, about 6000 psi, about 6500 psi, about 7000 psi, about 7500 psi, about 8000 psi, about 8500 psi, about 9000 psi, about 9500 psi, 10,000 psi, or any amount or range therein in increments of 10 psi. Pressure can also vary during the course of a reaction, in some embodiments. The effect can be to increase the kinetics of the reaction, decrease the kinetics of the reaction, quell the reaction, or convert the reaction products. In some embodiments, the pressure can be increased during the course of such a process. In some embodiments, the pressure can be decreased during the course of such a process. And, in some embodiments the pressure can oscillate during the course of such a process.

Any combination of reaction conditions set-forth herein can be selected to obtain the process and products desired, and it should be appreciated that these conditions, excepting the occurrence of conditions that produce surprisingly desirable results, can be readily determined by the skilled artisan without undue experimentation. Several examples of actual reaction conditions and results have been provided herein to enable the skilled artisan in the practice of the invention.

Moreover, any of the adhesive compositions, or solid adhesive articles formed from the compositions, can be sterilized using any sterilization method known to those of skill. In some embodiments, the articles can be sterilized in a method that includes use of pure ethanol, a water-ethanol mixture, UV light, gamma irradiation, ethylene oxide or a combination thereof.

Kits

The methods can be performed using a prepared kit of reactants which may, or may not, include an aqueous alcoholic carrier that is designed for use with that particular polymerization reaction. In some embodiments, a precursor kit for a radical polymerization in an aqueous alcoholic solution that results in a stable polydisulfide homopolymer is provided. The kit can include
- a plurality of cyclic disulfide monomers;
- a plurality of stabilizer molecules;
- an initiator; and,
- an aqueous alcoholic carrier;
    wherein the plurality of cyclic disulfide monomers includes a plurality of substituted 1,2-dithiolane monomers, the substituted 1,2-dithiolane monomers functional to polymerize through a ring-opening reaction to form a polydisulfide homopolymer having
    a first active radical sulfur end and a second radical sulfur end; and,
    a plurality of repeating units having a substituted dithioalkyl structure from the ring opening reaction as follows

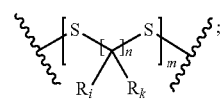

wherein,
n is 3;
each Ri and Rk is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; wherein, i and k are integers, and at least one Ri or Rk in each repeating unit includes a carbonyl functionality; and,
m is an integer selected to match a desired molecular weight of the polymer;
and,
the kit is used to create the stabilized polydisulfide homopolymer in the aqueous alcohol carrier to create a reaction solution at a reaction temperature ranging from 0° C. to 37° C., in some embodiments.

Likewise, the methods can be performed using a system for a radical polymerization of a stabilized polydisulfide homopolymer in aqueous alcoholic solution. In some embodiments, the system can include
- a plurality of cyclic disulfide monomers;
- a plurality of stabilizer molecules;
- an initiator;
- an aqueous alcoholic carrier; and,
- a reaction vessel for creating the stabilized polydisulfide homopolymer through the radical polymerization in the aqueous alcohol carrier at a reaction temperature ranging from 0° C. to 37° C., in some embodiments;
wherein the plurality of cyclic disulfide monomers includes a plurality of substituted 1,2-dithiolane monomers, the substituted 1,2-dithiolane monomers functional to polymerize through a ring-opening reaction to form a polydisulfide homopolymer having
    a first active radical sulfur end and a second radical sulfur end; and,
    a plurality of repeating units having a substituted dithioalkyl structure from the ring opening reaction as follows

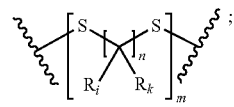

wherein, n is 3;

each Ri and Rk is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; wherein, i and k are integers, and at least one Ri or Rk in each repeating unit includes a carbonyl functionality; and, m is an integer selected to match a desired molecular weight of the polymer.

The system can have several configurations, depending on the polymerization process desired: In some embodiments, the cyclic disulfide monomer and the stabilizer are in a first reactant vessel in the aqueous carrier;

the initiator is in a second reactant vessel;

an aqueous reaction solution is formed by adding the initiator to the cyclic disulfide monomer and the stabilizer in the reaction vessel; and, the reaction vessel contains the radical polymerization of the aqueous reaction solution at the temperature ranging from 0° C. to 37° C., in some embodiments.

In some embodiments, the cyclic disulfide monomer and the stabilizer are in a first reactant vessel in the aqueous carrier, the first reactant vessel configured to release the cyclic disulfide monomer, the stabilizer, and the aqueous carrier into the reaction vessel at a first desired time to create a first aqueous reaction solution for a cationic polymerization in the first aqueous reaction solution to create a first stable polydisulfide polymer at the temperature ranging from 0° C. to 37° C., in some embodiments;

the initiator is in a second reactant vessel, the second reactant vessel configured to release the initiator into the reaction vessel at a second desired time to create a second aqueous reaction solution with the first stable polydisulfide polymer for the radical polymerization in the second aqueous reaction solution to create a second stable polydisulfide polymer from a combination of the cationic polymerization and the radical polymerization at the temperature ranging from 0° C. to 37° C., in some embodiments.

In some embodiments, the cyclic disulfide monomer and the stabilizer are in a first reactant vessel in the aqueous carrier, the first reactant vessel configured to release the cyclic disulfide monomer, the stabilizer, and the aqueous carrier into the reaction vessel at a first desired time to create a first aqueous reaction solution for a cationic polymerization in the first aqueous reaction solution to create a first stable polydisulfide polymer at the temperature ranging from 0° C. to 37° C., in some embodiments;

the initiator is in a second reactant vessel, the second reactant vessel configured to release the initiator into the reaction vessel at a second desired time to create a second aqueous reaction solution with the first stable polydisulfide polymer for the radical polymerization in the second aqueous reaction solution to create a second stable polydisulfide polymer from a combination of the cationic polymerization and the radical polymerization at the temperature ranging from 0° C. to 37° C., in some embodiments;

wherein the system is configured for the cationic polymerization to occur for a first reaction duration to create a desired amount of branching in the first stable polydisulfide polymer before the initiator is released into the reaction vessel to start the radical polymerization to create the desired amount of branching in the second stable polydisulfide polymer which results from the combination of the cationic polymerization and the radical polymerization at the temperature ranging from 0° C. to 37° C., in some embodiments.

The methods, kits, and systems can create a wide variety of stable polydisulfide polymers. In some embodiments, a stabilized and recyclable polydisulfide homopolymer is provided and can include:

a plurality of substituted 1,2-dithiolane monomers, the substituted 1,2-dithiolane monomers functional to polymerize through a ring-opening reaction to form a polydisulfide polymer having a first active sulfur radical and a second active sulfur radical; and, a plurality of repeating units having a substituted dithioalkyl structure from the ring opening reaction as follows

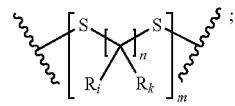

wherein, n is 3;

each $R_i$ and $R_k$ is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; wherein, i and k are integers, and at least one $R_i$ or $R_k$ in each repeating unit includes a carbonyl functionality;

and, m is an integer selected to match a desired molecular weight of the polymer;

and, a plurality of stabilizer molecules configured to stabilize the first active sulfur radical of the polymer, the plurality of stabilizer molecules being the 1,2-dithiolane monomers having a functional group that forms (i) a first stable bond with the first active sulfur radical; and (ii) a second stable bond with the second active sulfur radical.

wherein, the repeating units and the stabilizer molecules are the same, or substantially the same, chemical moieties following a degradation of the polymer.

The degree of stability of the stable polydisulfide polymers can be adjusted by adjusting the strength of the bonds that stabilize the polymers from depolymerization. In some embodiments, (i) the first stable bond is a first labile bond with the first active sulfur radical, the first labile bond selected from the group consisting of a thioester bond, a thiocarbamate bond, and a thioester bond; and, (ii) the second stable bond is a second labile bond with the second active sulfur radical, the second labile bond selected from the group consisting of a thioester bond, a thiocarbamate bond, and a thioester bond.

The stable polydisulfide polymers created through the technologies taught herein can be used for medical or non-medical applications. In some embodiments, the application is a method of using a stabilized and recyclable polydisulfide homopolymer as a non-medical adhesive. Such a method can include applying the stabilized and recyclable polydisulfide homopolymer to a substrate as an adhesive.

In some embodiments, the application is a method of using a stabilized and recyclable polydisulfide homopolymer as a medical tissue adhesive in a method of treatment of a subject. Such a method can include applying the stabilized and recyclable polydisulfide homopolymer to a substrate in vivo in the treatment of the subject.

The Polymers

The adhesive compositions taught above include a teachings of the polymers that are created, and it should be appreciated that the instant technology includes at least (i) the adhesive compositions that are used to make the polymers; (ii) the monomers, oligomers, and polymers in those compositions; (iii) the products of those compositions, including liquids, sprays, solid formed articles, and free-flowing powders; and, the methods of (iv) making and (v) using the adhesive compositions, the polymers, the liquids, the sprays, the powders, and the solid formed articles.

The polymers include medical and non-medical polymers, both recyclable and non-recyclable. In some embodiments, the polymers include the polymers taught above. In some embodiments, the polymer is stabilized with a stabilizer as taught above. In some embodiments, the polymer is stabilized with both a stabilizer and terminator as taught above. In some embodiments, the polymer is recyclable. In some embodiments, the polymer is recyclable with fewer process steps because the stabilizer is the same as, or substantially similar to, the monomer used in the polymerization. In some embodiments, the polymer is recyclable with fewer process steps because the stabilizer is the same as, or substantially similar to, the monomer used in the polymerization, and the terminator is a solvent molecule used in the polymerization process. In some embodiments, the polymer is recyclable with fewer process steps because the stabilizer is the same as, or substantially similar to, the monomer used in the polymerization, and the terminator is a non-toxic, or relatively non-toxic solvent molecule used in the polymerization process. As such, the instant technology includes the stabilized and recyclable polydisulfide polymers as taught herein.

In some embodiments, the polymer is stable and recyclable and has the following structure:

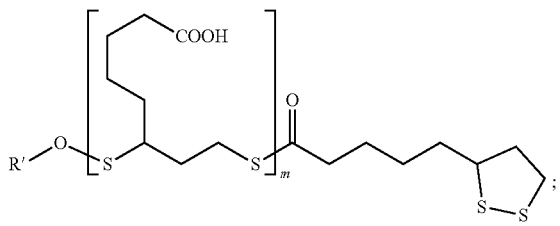

wherein, m is an integer selected to match the desired molecular weight of the polymer; and, R' is an alkyl, cycloalkyl, alkenyl, cycloalkenyl, alkynyl, cycloalkynyl, or aryl group having from 1-8 carbons, 1-6 carbons, 1-4 carbons, 1-3 carbons, 2 carbons, or 1 carbon. In some embodiments R' and R" have the same structure as the cyclic disulfide monomer used to form the polymer. In some embodiments, R' can be an alkyl group, such as an ethyl group.

In some embodiments, the polymer is stable and recyclable and has the following structure:

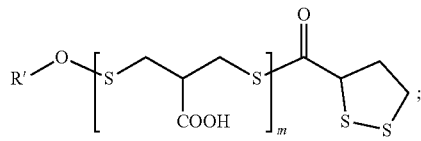

wherein, m is an integer selected to match the desired molecular weight of the polymer; and, R' is an alkyl, cycloalkyl, alkenyl, cycloalkenyl, alkynyl, cycloalkynyl, or aryl group having from 1-8 carbons, 1-6 carbons, 1-4 carbons, 1-3 carbons, 2 carbons, or 1 carbon. In some embodiments R' and R" have the same structure as the cyclic disulfide monomer used to form the polymer. In some embodiments, R' can be an alkyl group, such as an ethyl group.

Enhancing Cohesive Strength of a Polymeric Composition Taught Herein

The radical polymerization process can sometimes lack in a desired cohesive strength, because the radical polymerization can be expected to be linear. As such, it may be desirable to start with a slower cationic polymerization for a first reaction duration to create a desired amount of branching in the polymer to obtain a desired amount of cohesive strength, and then switch to a radical polymerization to speed the completion of process. As such, in some embodiments, the polymerization methods can further include a step of creating a substantial amount of a first stable homopolymer through a cationic polymerization for a first reaction time before adding an initiator to the reaction solution. As described, this first step can create the desired amount of branching, and the adding of the initiator starts the radical polymerization to create a second stable homopolymer that includes the first stable homopolymer. The combination of the first stable homopolymer with the second stable homopolymer creates the stable polydisulfide homopolymer from the radical polymerization reaction in the aqueous alcoholic solution.

The "substantial amount" refers to an amount that achieves the desired branching which can be identified by the physical characteristics of the polymer obtained. In some embodiments, the physical characteristic can be measured by cohesive strength of the polymer, adhesive strength of the polymer, or a combination of cohesive strength and adhesive strength. In some embodiments, the physical characteristic can be measured in terms of viscosity or flowability of the polymer. In some embodiments, a substantial amount of a polymerization can range from 1% to 99%, using your choice of weight percent or mole percent as a basis of comparison, of the total polymer obtained from a polymerization method used. In some embodiments, a substantial amount of a polymerization can range from 2% to 90%, from 3% to 85%, from 4% to 80%, from 5% to 75%, from 6% to 70%, from 7% to 65%, from 8% to 60%, from 9% to 55%, from 10% to 50%, or any amount or range therein in increments of 0.1%, of the total polymer obtained from a polymerization method used. In some embodiments, a substantial amount of a polymerization can range from 5% to 95%, from 10% to 90%, from 15% to 85%, from 20% to 80%, from 25% to 75%, from 30% to 70%, or any amount or range therein in increments of 0.1%, of the total polymer obtained from a polymerization method used. In some embodiments, a substantial amount of the homopolymer can be 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 100%, or any amount or range therein in increments of 0.1-1%, depending on the resolution of the results desired, of the total polymer obtained from a polymerization method used.

In some embodiments, a cross-linker is added to strengthen polymeric adhesives formed from the adhesive compositions through covalent bond or non-covalent bonds made between the cross-linker and the adhesive polymers. The cross-linker can include, for example, a monomer, an oligomer, a polymer, and conjugate bases of monomers used in the polymerization; metal ions, such as multivalent metal ions including divalent metal ions such as Ca++; transition and alkali earth metal salts; and, metal salts of cyclic 1,2-dithiolane derivatives; and, combinations thereof; wherein, the cross-linkers are added to further strengthen the compositions.

Branched Polymers

The mechanical properties of the polymers taught herein can be increased through branching of the polymers. As such, the polymers taught herein include branched forms. For example, in some embodiments, the polymer is a stabilized and recyclable polydisulfide polymer. In these embodiments, the polymer can have a repeating unit with a substituted dithioalkyl structure as follows:

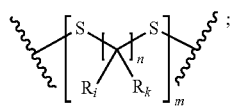

wherein, n is an integer ranging from 2 to 4;

each $R_i$ and $R_k$ is independently selected from the group consisting of H; alkyl, cycloalkyl, alkenyl, alkynyl, and aryl groups having from 1-8 carbons, 1-6 carbons, 1-4 carbons, 1-3 carbons, 2 carbons, or 1 carbon; hydroxylated alkyl, cycloalkyl, alkenyl, alkynyl, and aryl groups having from 1-8 carbons, 1-6 carbons, 1-4 carbons, 1-3 carbons, 2 carbons, or 1 carbon; and, carboxylated alkyl, cycloalkyl, alkenyl, alkynyl, and aryl groups having from 1-8 carbons, 1-6 carbons, 1-4 carbons, 1-3 carbons, 2 carbons, or 1 carbon; wherein, i and k are integers and at least one $R_i$ or $R_k$ in each repeating unit includes a carbonyl functionality;

m is an integer selected to match the desired molecular weight of the polymer;

In these embodiments, the stabilized and recyclable polydisulfide polymer can further have a first active thiol end and a second active thiol end; and, a plurality of stabilizer molecules. The plurality of stabilizer molecules are configured to stabilize the first active thiol end of the polymer, the plurality of stabilizer molecules being the substituted cyclic disulfide molecules derivatized to include a functional group that forms a first labile bond with the first active end, the first labile bond selected from the group consisting of a thioester bond, a thiocarbamate bond, and a thioester bond. And, in these embodiments, the repeating units and the stabilizer molecules can be the same, or substantially the same, chemical moieties following a degradation of the polymer during a recycling of the polymer. When the repeating units and the stabilizer molecules are the same, or substantially the same, chemical moieties following a degradation of the polymer during a recycling of the polymer, the recycling is an easier and more cost-effective commercial process.

Also, such a polymer can be branched to increase its mechanical strength through added features that can include, perhaps, the addition of physical entanglement. In such embodiments, for example, the polymer can be branched from at least one of $R_i$ or $R_k$ in a first dithioalkyl repeating unit, the at least one $R_i$ or $R_k$ including a carbonyl functionality in a thioester bond with a second dithioalkyl repeating unit. And, in these embodiments, the terminator molecules taught above can be added to further stabilize the polymer from depolymerization.

In some embodiments, the stabilized and recyclable polydisulfide polymer can include the following branched structure

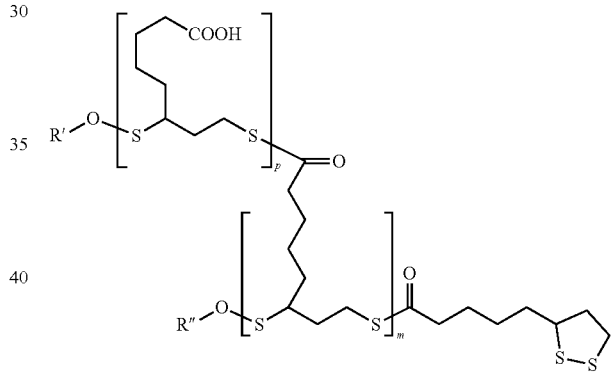

wherein, m is an integer selected to match the desired molecular weight of the polymer;

p is an integer; and,

R' and R" are each independently selected from a group consisting of an alkyl, cycloalkyl, alkenyl, cycloalkenyl, alkynyl, cycloalkynyl, or aryl group having from 1-8 carbons, 1-6 carbons, 1-4 carbons, 1-3 carbons, 2 carbons, or 1 carbon. In some embodiments R' and R" have the same structure as the cyclic disulfide monomer used to form the polymer. In some embodiments, R' and R" are alkyl groups, such as ethyl groups.

In some embodiments, the stabilized and recyclable polydisulfide polymer can include the following branched structure

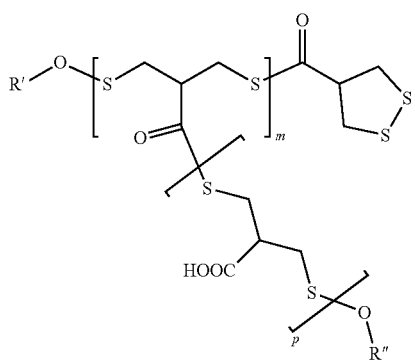

wherein, m is an integer selected to match the desired molecular weight of the polymer;

p is an integer; and,

R' and R" are each independently selected from a group consisting of an alkyl, cycloalkyl, alkenyl, cycloalkenyl, alkynyl, cycloalkynyl, or aryl group having from 1-8 carbons, 1-6 carbons, 1-4 carbons, 1-3 carbons, 2 carbons, or 1 carbon. In some embodiments R' and R" have the same structure as the cyclic disulfide monomer used to form the polymer. In some embodiments, R' and R" are alkyl groups, such as ethyl groups.

Prepolymerization and Cross-Linking

Furthermore, since release of monomer into surrounding tissue can produce adverse consequences on biocompatibility, prepolymerization and cross-linking can be used to increase biocompatibility. Pre-polymerization of cyclic 1,2-dithiolane derivatives before exposure of adhesive to wet tissue can be a desired design feature from a toxicity perspective, in some embodiments. Additionally, it should be appreciated that the pre-polymerization and cross-linking can also significantly improve the bulk mechanical strength of the adhesives irrespective of medical and non-medical applications.

Articles of Manufacture and Products

A solid adhesive article can be formed with the adhesive compositions and used as an adhesive in itself. In some embodiments, the solid adhesive article can be an adhesive patch formed from the adhesive compositions. The solid adhesive article can be formed using molding, casting, or extrusion, for example. In some embodiments, the solid adhesive article can be an adhesive film. In some embodiments, the solid adhesive article can be an adhesive membrane. Any liquid, spray, or concentrated adhesive composition taught herein can be used in the formation of the solid adhesive article.

In some embodiments, the adhesive composition functions as an adhesive alone. In some embodiments, the adhesive composition functions as a sealant. In some embodiments, the adhesive composition functions as a hemostat. In some embodiments, the adhesive composition functions as a therapeutic agent. In some embodiments, the adhesive composition functions as any combination of adhesive, sealant, hemostat, and therapeutic agent.

In some embodiments, the solid adhesive article may be self-supporting or supported on a temporary backing material. The article can then be adhered to a surface. A modest hand or finger pressure can be used as with the pressure sensitive adhesives to form an adhesion between the article and the surface. In some embodiments, a liquid or spray form of the adhesive compositions can be applied to the surface of the solid adhesive article before adhering the solid adhesive article to the surface.

Any adhesive composition taught herein can be reacted with initiator, in the case of a radically polymerized composition, or concentrated in aqueous solution, in the case of a cationically polymerized composition, to create a sticky polymer in solution, and then the polymer can be dried for later use. The liquid adhesive composition can be referred to as a "liquid precursor" comprising monomer, monomer and stabilizer, or monomer and stabilizer and terminator, and the concentrated and polymerized composition can be referred to as a "polymer precursor", or "macromolecular precursor". The concentrated and polymerized composition can be made by allowing solvent to evaporate, using reduced pressure, or by heating, for example. The polymer precursor can be dried for later use as a dry polymer used as an adhesive composition, or prediluted as a polymer precursor solution and used as the adhesive composition. The adhesive composition having the polymer precursor can be used to bond surfaces together, or for further polymerization to strengthen an adhesion or cohesion. In some embodiments, the dried polymer can be formed into a solid adhesive article.

The adhesive compositions can be used to form solid adhesive articles, including a solid adhesive patch, film, or membrane, and the solid adhesive article can be delivered to the site of adhesion with or without including a liquid, spray, or powder form of the adhesive composition for reaction with water at the target site of the desired adhesion.

The adhesives and sealants taught herein can be used in the form of a spray, brush, a solid patch for various applications, or combinations thereof, in some embodiments.

The excellent biocompatibility and biodegradability unlock the possibility of internal and topical application of the developed adhesive. Besides, the high bacterial barrier property makes the adhesive superior to other hydrogel-based adhesives approved for internal applications. Moreover, non-medical PSA can also be synthesized using the same polymerization condition. The obtained PSA shows excellent underwater adhesion and can be recycled to monomeric species in a cost-effective manner.

Medical Applications

It will be appreciated that the disclosed technology serves as a platform to provide rapid-curing medical adhesives and sealants. For this purpose, the material is capable of taking the form of either a liquid or a solid for use. Combined liquid and solid use is also envisioned. More specifically, the adhesive can be used as:

1. Topical skin tissue adhesive: The developed adhesives can be used as a stand-alone liquid or solid material for wound closure of topical wounds created by surgical incisions or traumatic injuries.
2. Internal tissue adhesive or sealant: The developed adhesives can be used for adhesion during a variety of surgical procedures. Examples include cartilage repair, anastomosis of blood vessels or intestines, vascular graft attachment, sealing of intestine or stomach or lung or bladder punctures, general hemostasis, spinal dural sealant, ocular sealant, dural sealant, lung parenchymal sealant, gastric perforation sealant, fetal membrane sealant, circumcision, implant grafting, plastic surgeries etc.
3. The adhesive can be used as an adjunct to other wound closure devices. For example, as an adjunct to wound closure devices such as sutures, staples, tacks, etc. Furthermore, the adhesive can be used for securing the anchorage of medical devices onto tissues. Examples of medical devices that can be attached using the adhesive include wound dressings, skin grafts, collagen membranes, decellularized tissues, ostomy devices and other synthetic medical devices etc.

4. The adhesive has the potential to be used as an external or internal hemostatic agent.

Nonmedical Consumer/Industrial Applications

The material is capable of taking the form of either a liquid or solid adhesive used for bonding two surfaces together in a permanent or temporary fashion. For example, the material can be used as a pressure sensitive adhesive (PSA), i.e., a thin film applied to a backing material to obtain sticky notes, scotch tape, food packaging, consumer product labels, etc. Alternatively, the materials can serve as a structural adhesive for bonding two similar or dissimilar materials together.

Generally speaking, the terms "approximately", "approximate", "substantially", "essentially", and "about", or any other version thereof, can be used to describe small variations that a person of ordinary skill would find it reasonable to fall within structural and/or functional parameters of a particular embodiment. In some embodiments, the terms can refer to a range of variation of a numerical value, for example, of less than or equal to ±10% of a numerical value, such as less than or equal to ±5%, less than or equal to ±4%, less than or equal to ±3%, less than or equal to +2%, less than or equal to ±1%, less than or equal to ±0.5%, less than or equal to ±0.1%, or less than or equal to ±0.05%, or any range or amount therein in increments of 0.01%.

EXAMPLES

Example 1. Thermal, Radical Polymerization of Sodium Lipoate

Considering the high radical reactivity of the disulfide group, we anticipated that in the presence of an appropriate radical initiator, the disulfide bond could undergo either homolytic or heterolytic cleavage to form an active radical chain end, which can initiate a chain growth-like polymerization at a high enough monomer concentration.

Experimental: To test the feasibility of initiator to induce radical homopolymerization of cyclic 1,2-dithiolane derivatives, a degassed aqueous solution of sodium lipoate and 3 mol % 4,4'-azobis(4-cyano valeric acid) was heated at 70° C. for 3 h at 200 mg/mL. The initiator is the 4,4'-azobis(4-cyano valeric acid):

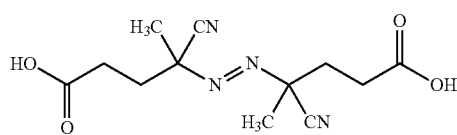 [SMILES: CC(C#N)(CCC(=O)O)/N=N/C(C)(C#N)CCC(=O)O]

Results: $^1$H NMR analyses of the crude reaction mixture show 56% monomer conversion, indicating a radical homopolymerization of cyclic 1,2-dithiolane derivatives can be achieved in solution.

Example 2. Radical Polymerization of Sodium Lipoate Under Ambient Conditions Reaches Equilibrium with No Change with Polymerization Time or Addition of Fresh Initiator Next, we hypothesized that in the presence of appropriate initiators, the polymerization can be performed at ambient conditions.

Persulfate salts were initially considered due to their ability to generate radicals at ambient temperature under redox conditions. Besides, due to the higher oxidation potential of persulfate salt, the disulfide can act as a reducing agent and initiate radicals at ambient conditions without additional reducing agents.

Experimental: Sodium lipoate was polymerized at room temperature at 200 mg/mL with 1 mol % ammonium persulfate (APS).

The radical initiator is the ammonium persulfate:

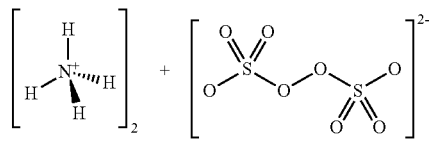

Results: $^1$H NMR analysis of the crude reaction mixture showed over 60% monomer conversion within a few minutes. However, no change in monomer conversion was observed even at extended polymerization time. Furthermore, the addition of a fresh initiator did not improve the monomer conversion either. These results indicated an equilibrium between monomer and polymer is reached.

Example 3. An Increase in Monomer Concentration Increases Conversion of Monomer to Polymer in the Radical Polymerization of Sodium Lipoate Under Ambient Conditions Although conversion to polymer was not increased at extended polymerization time, or with the addition of fresh initiator, we found that monomer conversion to polymer was increased at higher monomer concentrations.

Experimental: Sodium lipoate was polymerized at room temperature at concentrations that are higher than 200 mg/mL using 1 mol % ammonium persulfate as a radical initiator.

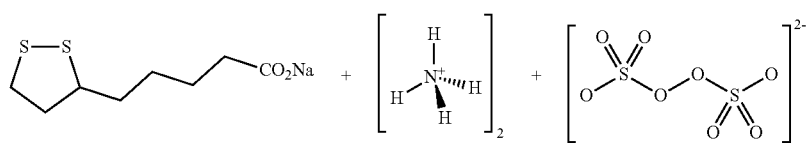

Results: Table 1 compares the polymerization of the sodium lipoate at concentrations of 300 mg/mL and 500 mg/mL to the polymerization at the concentration of 200 mg/mL:

TABLE 1

| Concentration (mg/mL) | Temperature (° C.) | Conversion (%) |
| --- | --- | --- |
| 200 | 70 | 38 |
| 200 | 25 | 61 |
| 200 | 5 | 63 |
| 300 | 25 | 70 |
| 500 | 25 | 76 |
| 500* | 25 | 74 |

*with 1 mol % APS and 1 mol % TMEDA

Table 1 shows that monomer conversion to polymer under these conditions increased as monomer concentration increased. Conversion increased to 70% at 300 mg/mL, and 76% monomer conversion at 500 mg/mL. The polymerization was found to be insensitive to air, as a comparable conversion was achieved when polymerization was performed in an open vial vs. inert conditions.

Example 4. The Radical Polymerization Efficacy of Sodium Lipoate can be Affected by the Choice of the Radical Initiator The radical polymerization efficacy of sodium lipoate was tested through the use of other radical initiators.

Experimental: Sodium lipoate was polymerized at room temperature at 500 mg/mL, varying the radical initiator between ammonium persulfate, potassium persulfate, sodium persulfate, benzoyl peroxide, and hydrogen peroxide.

Results: There was no significant difference in polymerization efficacy observed, measured in % conversion, between the use of ammonium persulfate, potassium persulfate, sodium persulfate, or benzoyl peroxide as the initiator. Hydrogen peroxide, however, showed a much lower % conversion. Moreover, monomer conversion was not enhanced through the addition of an external reducing agent. TMEDA, for example, was used as the external reducing agent and did not enhance monomer conversion, as shown in Table 1.

Example 5. The Radical Polymerization of α-Lipoic Acid Under Ambient Conditions

This example is a radical polymerization of α-lipoic acid rather than sodium lipoate.

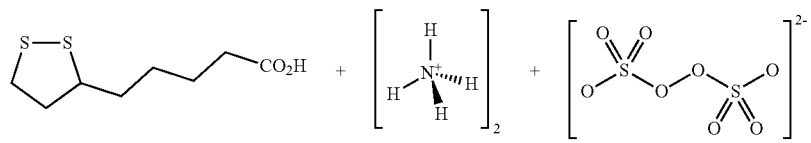

Experimental: an aqueous ammonium persulfate solution was added to 400 mg/mL of an ethanolic α-lipoic acid (ethanol/H2O 4 v/v %) solution.

FIGS. 1A1, 1A2, 1B1, and 1B2 are a comparison of reaction times between ionic polymerization with an electrophilic stabilizer and radical polymerization with an initiator, according to some embodiments. FIG. 1A1 illustrates the ionic polymerization general reaction scheme with a stabilizer, and FIG. 1A2 shows a gelation time of 30 minutes for a reaction mixture of ethanolic α-lipoic acid and stabilizer (S2) solution. This is the stabilizer (S2):

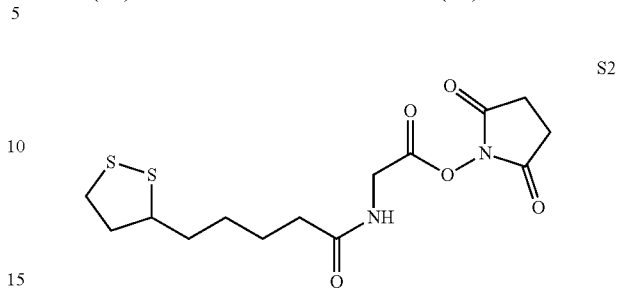

FIG. 1B1 illustrates the general radical polymerization reaction scheme, and FIG. 1B2 shows a gelation time of 30 seconds for a reaction mixture of ethanolic α-lipoic acid and initiator ammonium persulfate. This is a surprising 60× decrease in polymerization time.

The following examples test radical polymerization processes designed under a variety of reaction conditions using a "flip vial test", as well as the formation of thin films and hydrogels, analyzing the role of the components of the radical reactions.

FIGS. 2A-2E compare polymerization of α-lipoic acid under a variety of reaction conditions using a "flip vial test", and the formation of thin films and hydrogels, according to some embodiments.

Example 6. Polymerization with and without Initiator

The role of the various reaction components on the radical polymerization reactions have been studied to facilitate the design of the polymerization reactions. This example looks at polymerization with and without initiator.

Experimental: solution polymerization was performed using α-lipoic acid as the monomer, both with and without a stabilizer, Gly-OSu-NHS derivatized lipoic acid (S2), and both with and without ammonium persulfate as the initiator.

Results: FIG. 2A shows photographs of flip vial test taken 2 min after solution polymerization of α-lipoic acid, with and without the stabilizer Gly-OSu-NHS derivatized lipoic acid (S2), and with and without the initiator ammonium persulfate. Vials B-D in FIG. 2A show that an immediate formation of gel was observed when an aqueous ammonium persulfate solution was added as an initiator to 400 mg/mL ethanolic α-lipoic acid (ethanol/H2O 4 v/v %) solution, whereas vial A of FIG. 2A, was reacted at 400 mg/ml without stabilizer and without initiator, shows no polymerization reaction at all, even over a period of days at the same α-lipoic acid concentration. Vial E is a photograph of a flip vial-test taken 2 minutes after solution polymerization of α-lipoic acid (monomer) and the stabilizer Gly-OSu-NHS derivatized lipoic acid (S2), again at 400 mg/ml but without the initiator ammonium persulfate (APS)

Example 7. Polymerization with and without Stabilizer, and the Effect of a Variety of Stabilizers on α-Lipoic Acid Polymers that are a Product of Radical Polymerization Using Ammonium Persulfate as the Initiator The polymerization experiments showed depolymerization of α-lipoic acid polymers occurred when the polymers are a product of radical polymerization using ammonium persulfate as the initiator.

When a thin film was fabricated from poly(α-lipoic acid) obtained from radical polymerization of α-lipoic acid with 1 mol % ammonium persulfate, the crystalline domain formation was observed within three days, indicating backbone depolymerization. This directed us to test a variety of stabilizers to control the depolymerization and obtain add stability to the polymers. The following stabilizers were considered in the study:

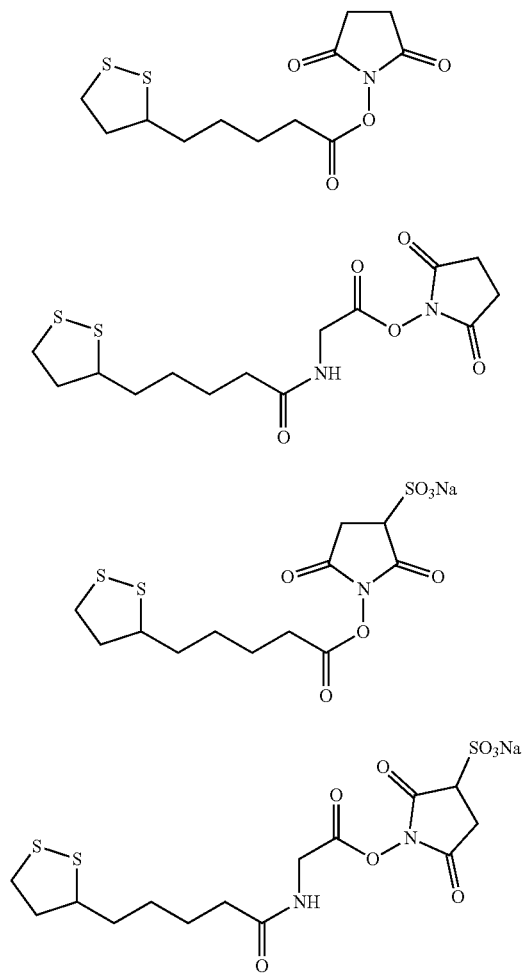

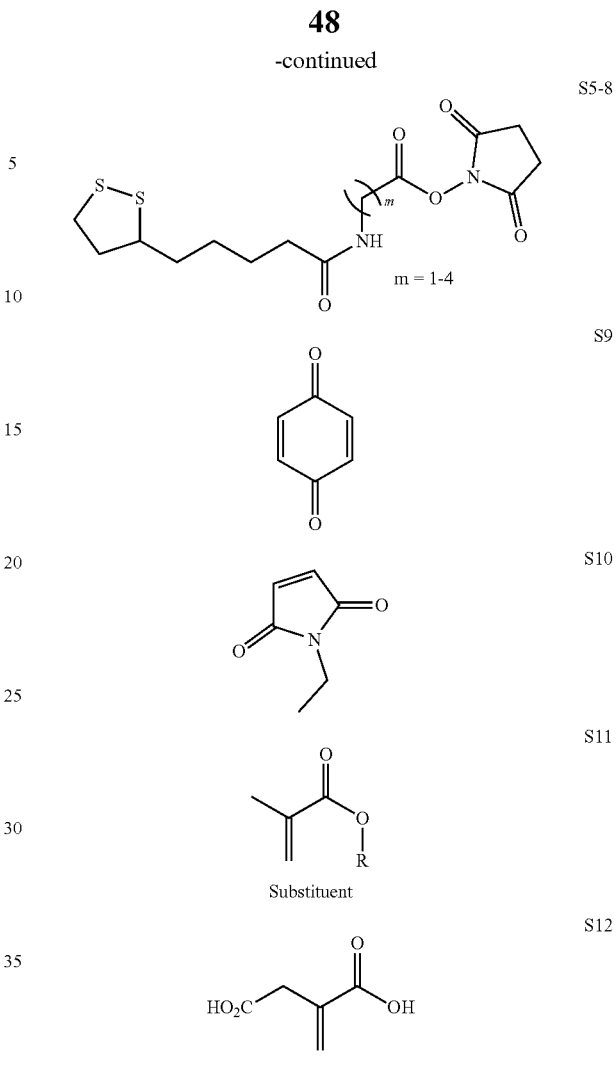

Figure 2B:
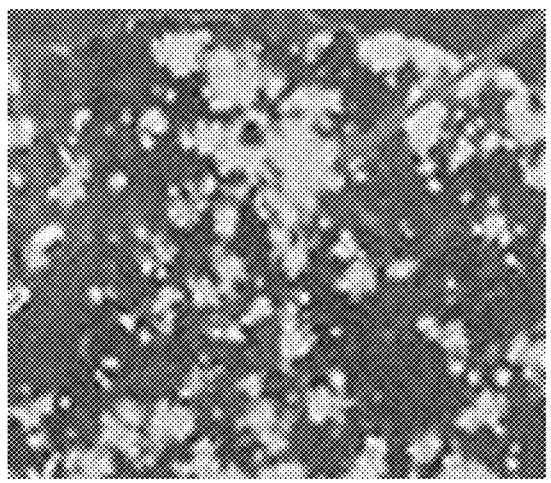

FIG. 2B is a photograph of a poly(α-lipoic acid) thin film obtained from α-lipoic acid polymerization with ammonium persulfate, without stabilizer. The arrow shows the formation of a crystalline domain that arose within 3 days after compression molding.

Figure 2C:
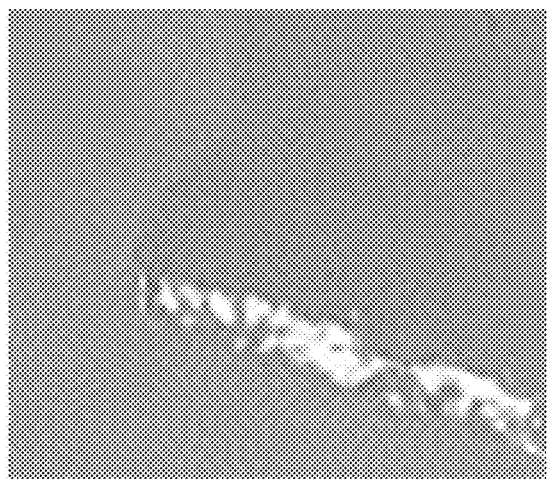
Figure 2D:
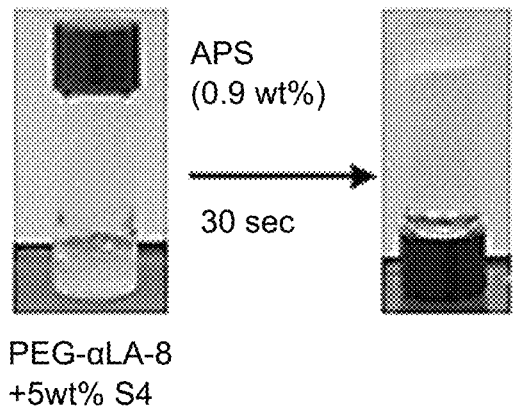

FIG. 2C is a photograph of a poly(α-lipoic acid) thin film obtained from a reaction mixture that includes α-lipoic acid and the stabilizer Gly-OSu-NHS derivatized lipoic acid (S2) with ammonium persulfate. No crystal domain formed even 1 month after compression molding.

Two different chain-end stabilization strategies were investigated. First, we used electrophilic stabilizers capable of forming thioester bonds at the thiol end groups originating after polymerization, and this was followed by neutralization of the radical. Second, we used a less reactive acrylic molecule to end cap the thiol radicals after depletion of dithiolane monomer in the polymerization reaction.

Experimental:

α-lipoic acid was copolymerized with the following activated ester-containing α-lipoic acid derivatives as the stabilizer:

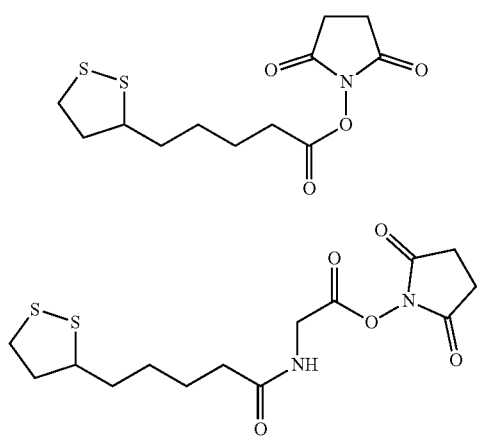

S1

S2

Polymer thin films were fabricated from the poly(α-lipoic acid) either by solution casting of the crude polymer mixture or compression molding of the purified dry polymer.

Differential scanning calorimetry (DSC) analyses of the thin films obtained from solution casting or compression molding was used to confirm the presence or absence of monomeric crystalline domains.

A variety of stabilizers was tested to determine percent conversion and stability against depolymerization, namely (i) no stabilizer; (ii) Gly-OSu-NHS derivatized lipoic acid (S2), benzoquinone (S9), tannic acid, N-ethyl maleimide (S10), and itaconic acid (S12).

Results: It was found that the polymer depolymerizes, and is thus unstable, in the absence of a stabilizer. As such, a stabilizer is needed in most embodiments taught herein.

In one example, a stable poly(α-lipoic acid) was obtained when polymerized with ammonium persulfate in the presence of 5 mol % N-ethylmaleimide as a stabilizer.

In another example, as shown in FIG. 2A, an instant gel formation was observed once 1 mol % ammonium persulfate was added to the monomer mixture of the α-lipoic acid and stabilizer. As shown in FIG. 2C, the poly(α-lipoic acid) films formed by radical polymerization to include the stabilizer Gly-OSu-NHS derivatized lipoic acid (S2) appeared stable with no visible changes to the stability over several months.

A variety of stabilizers were tested to determine relative percent conversion and stability against depolymerization. Table 2 compares the variety of stabilizers, including acrylate monomers, on ammonium persulfate initiated radical polymerization of α-lipoic acid.

TABLE 2

| Stabilizer | Conversion (%) | Stability |
|---|---|---|
| — | 60 | No |
| S2 | 65 | Yes |
| Benzoquinone (S9) | 75 | Yes |
| Tannic acid | 60 | Yes |
| N-ethyl maleimide (S10) | 68 | Yes |
| Itaconic acid (S12) | 70 | Partial |

Interestingly, a slow depolymerization (after one month) was observed when α-lipoic acid was polymerized in the presence of itaconic acid. Without intending to be bound by any theory or mechanism of action, we believe the depolymerization was due to steric hindrance and lower reactivity of itaconic acid toward radical species, resulting in only partial chain end stabilization and leading to slow depolymerization. As such, the stability provided by the stabilizer can vary due to a variety of factors, both chemical and physical, for example, due to factors which can include the lability of the bonds, the steric hindrance, or a combination thereof. As such, the polymerization can be designed by selecting a desired stabilizer that can provide the desired stability. This allows for an adjustment of the stability for biodegradation, recyclability, and the like.

Interestingly, we also found that polyphenols, known to quench reactive radical species, also effectively stabilized poly(α-lipoic acid), regardless of whether the polyphenols were oxidized or unoxidized. As such, polyphenols are effective as stabilizers and should be considered when designing a composition taught herein, in some embodiments.

Example 8. The Effects of Different Monomers and Solvents on the Efficacy of Polymerization To establish the scope of the polymerization, the polymerization efficacy of different monomers was investigated.

Experimental: The following α-lipoic acid monomers and macromonomers were considered in the study:

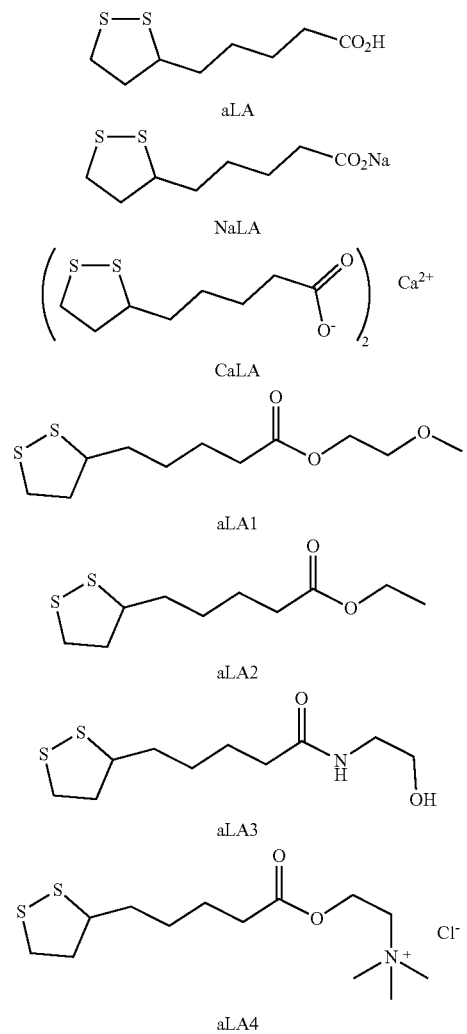

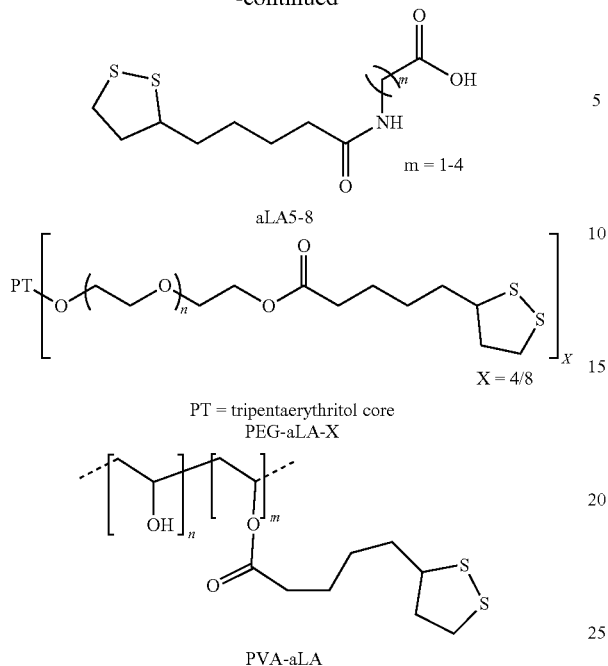

PT = tripentaerythritol core
PEG-aLA-X

PVA-aLA

A high degree of polymerization was achieved in the studied monomer, including asparagusic acid, hydroxy, and amide functional alipoic acid derivatives, etc. The polymerization appears to tolerate different solvents well, like dioxane, toluene, dichloromethane, acetone, and other alcoholic solvents. Furthermore, alipoic acid functional 4- and 8-arm polyethylene glycol (PEG-aLA-8/PEG-aLA-4) was also synthesized to study the efficacy of radical polymerization. Interestingly, α-lipoic acid functional 4- and 8-arm PEG formed a gel within 60 seconds of the addition of ammonium persulfate.

Figure 2E:
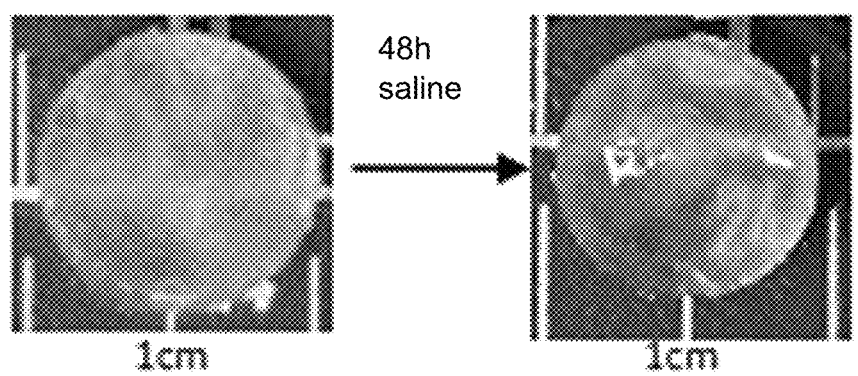

Moreover, as shown in FIG. 2E, a swelling study of gel obtained from the PEG-aLA-8, S4, and ammonium persulfate shows no swelling, even after 48 h of incubation in saline solution at 37° C., indicating a high degree of crosslinking.

The Following Examples Test Adhesives on Bovine Pericardium for Soft Tissue and Porcine Bone for Hard Tissue We've shown that our poly(α-lipoic acid) polymers obtained from ionic polymerization demonstrated exceptional adhesive properties which can fulfill the demand of medical and nonmedical fields by slight changes in compositions. The following examples test the adhesive properties our poly(α-lipoic acid) polymers obtained from radical polymerization of various compositions on bovine pericardium for soft tissue and on porcine bone for hard tissue. FIGS. 3A-3F show the adhesive properties of poly(α-lipoic acid) produced from radical polymerization, as measured on bovine pericardium and porcine bone, according to some embodiments.

Example 9. Soft Tissue Adhesives: Comparing Adhesive and Cohesive Strength of Sprayable Liquid Precursors Using Different Stabilizers on Bovine Pericardium This example compares adhesive and cohesive strengths of sprayable precursors using different stabilizers on bovine pericardium. Comparing the shear strength obtained using S1 to the shear strength obtained using S2:

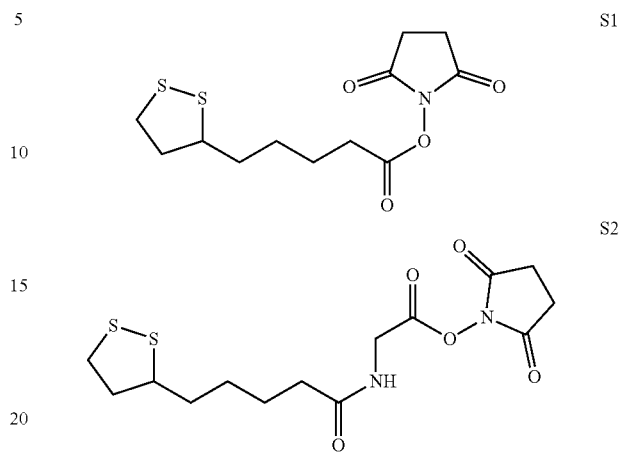

Experimental: The adhesive properties of a sprayable formulation of α-lipoic acid and NHS-derivatized lipoic acid (S1) (mol ratio 93:7) with 1 mol % ammonium persulfate was investigated on wet bovine pericardium. A poly(α-lipoic acid) polymer obtained from radical polymerization on bovine pericardium using α-lipoic acid as the monomer, NHS-derivatized lipoic acid (S1) as the stabilizer, and ammonium persulfate as the initiator. In this precursor embodiment, the monomer and stabilizer are injected from a first syringe and combined with the initiator from a second syringe as a mixture before contacting the tissue surface as an adhesive. Then, the use of NHS-derivatized lipoic acid (S1) as the stabilizer was compared to the use of Gly-OSu-NHS derivatized lipoic acid (S2) as the stabilizer under the same ratios with the same monomer, and the same reaction conditions.

To form a lap joint, an aqueous ethanolic (40:60 v/v) solution of (i) α-lipoic acid and S1, and (ii) α-lipoic acid and S2, was sprayed with ammonium persulfate on wet bovine pericardium with the help of a double barrel syringe to compare the effects of the stabilizer on the adhesive property of shear strength.

Figure 3A:
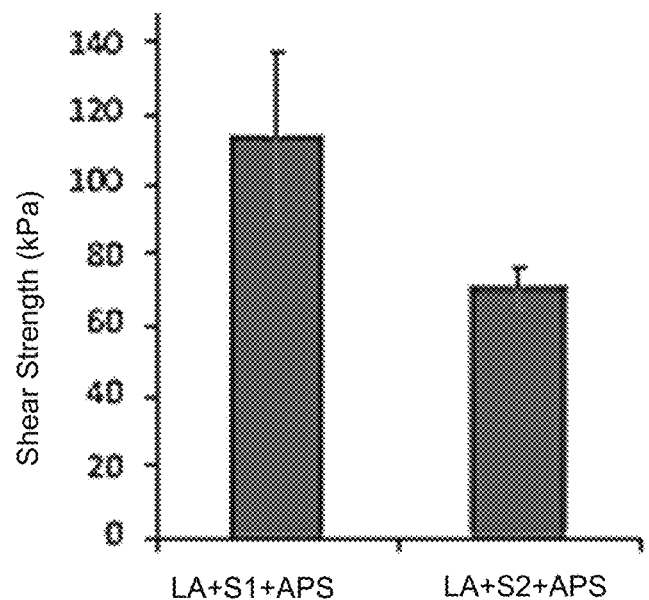
FIGS. 3A-3F illustrate adhesive properties of poly(α-lipoic acid) produced from radical polymerization, according to some embodiments.

Results: Interestingly, FIG. 3A shows that a high shear strength of 114±22 kPa was obtained with S1 after 2 min of incubation in phosphate buffer at 37° C. with the radical polymerization precursor formulation. Comparatively, S2 provided a significantly lower shear strength with only a seemingly minor change in stabilizer functionality from S1 to S2. Without intending to be bound by any theory or mechanism of action, we believe the higher reactivity of Gly-OSu-NHS derivatized lipoic acid (S2) results in a cascade radical and ionic polymerization that cures the network faster and decreases the wettability of the adhesive, resulting in a lower shear strength on the bovine pericardium.

Example 10. Soft Tissue Adhesives: Comparing Adhesive and Cohesive Strengths of Sprayable Precursors Under Radical and Ionic Polymerization on Bovine Pericardium It was found that the sprayable precursor of α-lipoic acid (monomer) and Gly-OSu-NHS derivatized lipoic acid (S2) (stabilizer) (at a mol ratio 93:7), initiated with 0.3 mol % ammonium persulfate (initiator) results in a radical polymerization (polymerization with the initiator) that provides the shear strength shown in FIG. 3A. These results are a lower shear strength than what is provided through an ionic polymerization (polymerization without the initiator). The same compositions of monomer and stabilizer were polymerized with and without the initiator under similar conditions to compare the adhesive properties of the radical polymerization to those of the ionic polymerization.

Results: We found that the polymer formed by radical polymerization (polymerization with an initiator) showed adhesive failure in the sprayable precursor, whereas the polymer formed by ionic polymerization (polymerization without initiator) showed cohesive failure. Without intending to be bound by any theory or mechanism of action, we believe that this difference in failure mode may be due to decreased wettability of the adhesive from the radical polymerization over the adhesive from the ionic polymerization. Without intending to be bound by any theory or mechanism of action, the radical polymerization cures the polymer network faster, which may decrease the wettability of the adhesive, resulting in a lower shear strength on the bovine pericardium when compared to the slower cure of the ionic polymerization.

Example 11. Hard Tissue Adhesives: Testing a Variety of Adhesives on Porcine Bone This example is designed for comparing different composition mixtures that are some combination of α-lipoic acid as a monomer, sodium lipoate as a monomer, calcium lipoate as a monomer, NHS derivatized lipoic acid (S1) or Gly-OSu-NHS derivatized lipoic acid (S2) as a stabilizer, $CaCl_2$, PEG-α-lipoic acid-8, and ammonium persulfate as an initiator. In this example, the ultrafast radical polymerization and eutectic mixture of α-lipoic acid and sodium lipoate was exploited and assessed for it's suitability as a hard tissue adhesive, namely a bone adhesive using porcine bone as an example.

Experimental: A library of powder mixtures at different ratios of α-lipoic acid as a monomer, sodium lipoate as a monomer, calcium lipoate as a monomer, NHS derivatized lipoic acid (S1) or Gly-OSu-NHS derivatized lipoic acid (S2) as a stabilizer, $CaCl_2$, PEG-α-lipoic acid-8, and ammonium persulfate as an initiator were prepared. The adhesive strength of each mixture was measured as applied to wet porcine bone.

Results: The results can be seen by comparing the mixtures listed in Table 3 to the results shown FIG. 3E. FIG. 3E shows the lap shear strength of different powder adhesives on porcine bone after 10 min incubation in phosphate buffer at 37° C. The compositions of B1, B2, B3, B4 for powder adhesives are listed in Table 3, with component amounts shown in mg.

TABLE 3

The powder compositions used to test adhesive strength on bone tissue, with component amounts shown in mg.

| Entry | αLA | NaLA | S1 | S2 | CaCl2 | CaLA | PEG-αLA-8 | APS |
|---|---|---|---|---|---|---|---|---|
| B1 | 100 | 80 | 20 | | 19.4 | | | |
| B2 | 100 | 80 | | 20 | 19.4 | | | 2 |
| B3 | 100 | 100 | | 20 | 36 | | 15 | 3 |
| B4 | 100 | 80 | | 20 | 6 | 54 | 60 | 6 |

These are examples of powder compositions used to test the adhesives for bone repair. B1 is an ionic polymerization that uses no initiator, and it's used as a performance comparison for compositions B1-B4 that use ammonium persulfate (APS) in increasing amounts as the initiator for a radical polymerization. 81 is the only composition that uses NHS derivatized lipoic acid (S1) as the stabilizer. Each of 82-84 use Gly-OSu-NHS derivatized lipoic acid (S2) as the stabilizer. B3 and B4 add an 8 arm PEGylized α-lipoic acid, referred to as "PEG-α-lipoic acid-8" in increasing amounts. B4 adds calcium lipoate to the mixture. Each of 81-84 include an amount of $CaCl_2$.

B1 from the ionic polymerization has the lowest shear strength, and B2 has a shear strength that is over double that of B1. The shear strength of B3 is dramatically higher than the shear strength of B2, and B4 has the highest shear strength of all the compositions. A significant benefit of each of these compositions is its ability to work in physiological conditions, and each would have a desirable shear strength for a variety of applications.

Interestingly, when a powder mixture (B4 in Table 3) of α-lipoic acid, calcium lipoate, an 8-arm PEG, S2, and ammonium persulfate was applied to porcine bone, a shear strength of 320 kPa was achieved after 10 min of incubation in saline at 37° C., thereby establishing the ability of this high strength composition of radically polymerized cyclic 1,2-dithiolane derivatives to work in physiological conditions.

Example 12. Exploring the Use of a Powder Adhesive in Aqueous Physiological Conditions Comparing the Effects of Varying Initiators, Stabilizers, and Ratios of α-Lipoic Acid:Sodium Lipoate This example is directed to exploring the abilities of powder adhesives that can be cured at aqueous physiological temperatures. We create eutectic mixtures of a powder adhesive in aqueous physiological conditions and compare the effects of varying initiators, stabilizers, and ratios of α-lipoic acid:sodium lipoate.

Experimental:
A powder compositions of α-lipoic acid, sodium lipoate, NHS derivatized lipoic acid (S1) as the stabilizer, and ammonium persulfate were mixed together at a mol ratio of 63:29:7:1. The powder mixture was applied to a wet surface for instant polymerization and measurement of adhesive strength.
The initiator was then varied to compare the different aqueous solubilities of persulfate salt initiator and the adhesion strength. The powder adhesives were prepared by varying from ammonium persulfate (APS), sodium persulfate (NaPS), to potassium persulfate (KPS) as the initiator.
The stabilizer was then varied from a more reactive to a more water-soluble analog to understand the effect of stabilizer on adhesion strength, varying from NHS-derivatized lipoic acid (S1) to Gly-OSu-NHS derivatized lipoic acid (S2) to sulfo-NHS-derivatized lipoic acid (S3) as the stabilizer.
The ratio of α-lipoic acid:sodium lipoate was varied by changing the sodium lipoate from 29 mol % to 42 mol % to determine the effect of the α-lipoic acid:sodium lipoate ratio on the performance of the powder adhesive.

Results: When the powder mixture was applied to a wet surface, an instant polymerization was observed. FIGS.

Figure 3B:
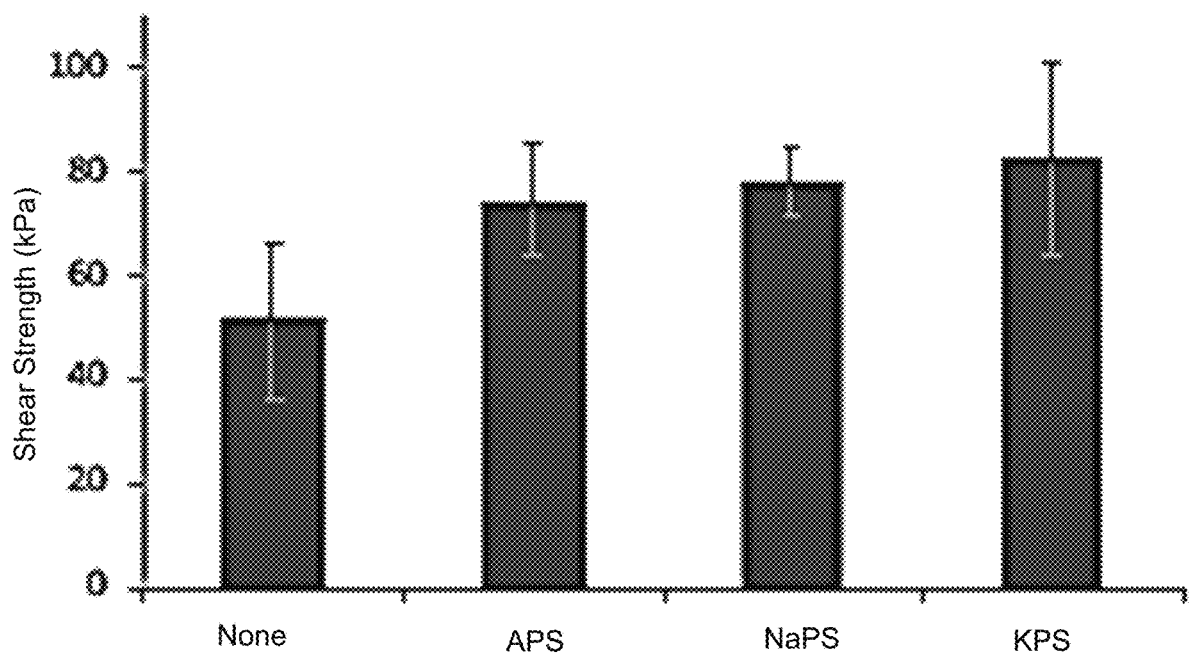

3B-3D show how varying initiators, stabilizers, and ratios of α-lipoic acid:sodium lipoate affect the performance of the powder mixture. There was no effect of varying the initiator on shear strength, but there was a significant effect seen from both (i) varying the stabilizer; and (ii) varying the α-lipoic acid:sodium lipoate ratio, as discussed below:

FIG. 3B shows the lap shear strength of a powder adhesive formulation with different initiators (no initiator, ammonium persulfate (APS), sodium persulfate (NaPS), and potassium persulfate (KPS)), the powder adhesive formulation having a mol ratio of aLA, NaLA, NHS-derivatized lipoic acid (S1), and initiator 63:29:7:1. The lap shear strength of each was tested on bovine pericardium after 2 min incubation in phosphate buffer at 37° C. As shown in FIG. 3B, the lap shear strength measurement of the above powder formulation on the wet bovine pericardium showed a shear strength of 74±10 kPa after 2 min of incubation in a phosphate buffer at 37° C. Here, we conclude that varying the salts of the persulfate as the initiator had no effect on shear strength when applied to the bovine pericardium.

Figure 3C:
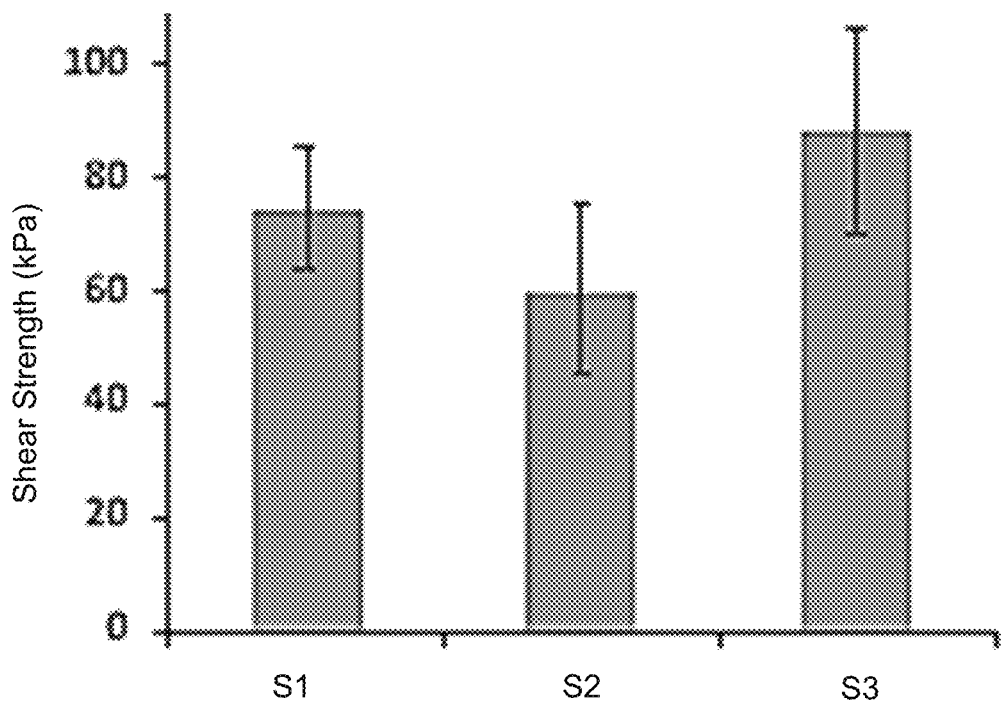

FIG. 3C shows the lap shear strength of a powder adhesive formulation with different stabilizers: NHS-derivatized lipoic acid (S1), Gly-OSu-NHS derivatized lipoic acid (S2), and sulfo-NHS-derivatized lipoic acid (S3). The formulations were applied to bovine pericardium to measure performance after 2 min incubation in phosphate buffer at 37° C. As shown in FIG. 3C, the more reactive stabilizer S2 leads to lower shear strength than stabilizer S1. However, S3, a sulfonated derivative of S1, led to a higher shear strength than both S1 and S2 and, without intending to be bound by any theory or mechanism of action, we believe the increased shear strength from the S3 formulation may have been due to a higher wettability of the adhesive from the polar sulfonic functional group in S3. Here, we conclude that varying the stabilizer had an effect on shear strength and, without intending to be bound by any theory or mechanism of action, it appears that the choice of stabilizer may affect the ability of the adhesive to spread on the tissue which may be the reason for the effect of the choice of stabilizer on shear strength.

Figure 3D:
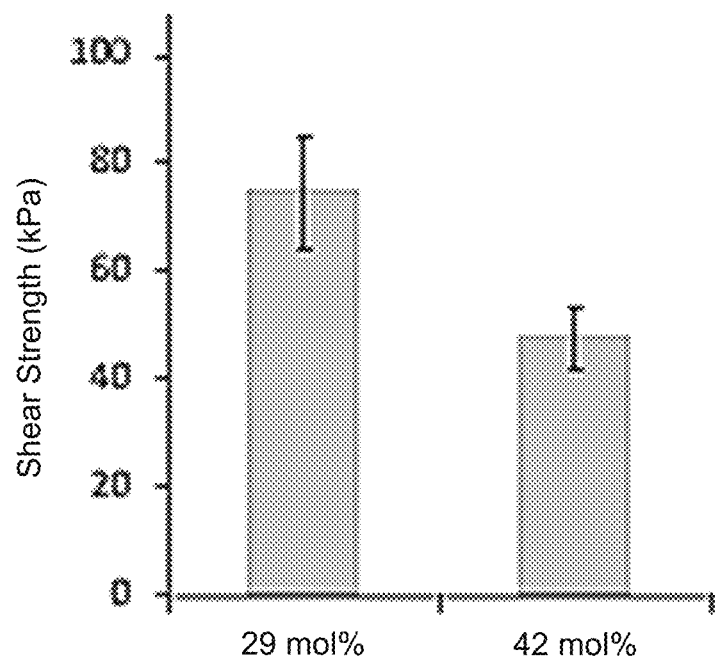
Figure 3E:
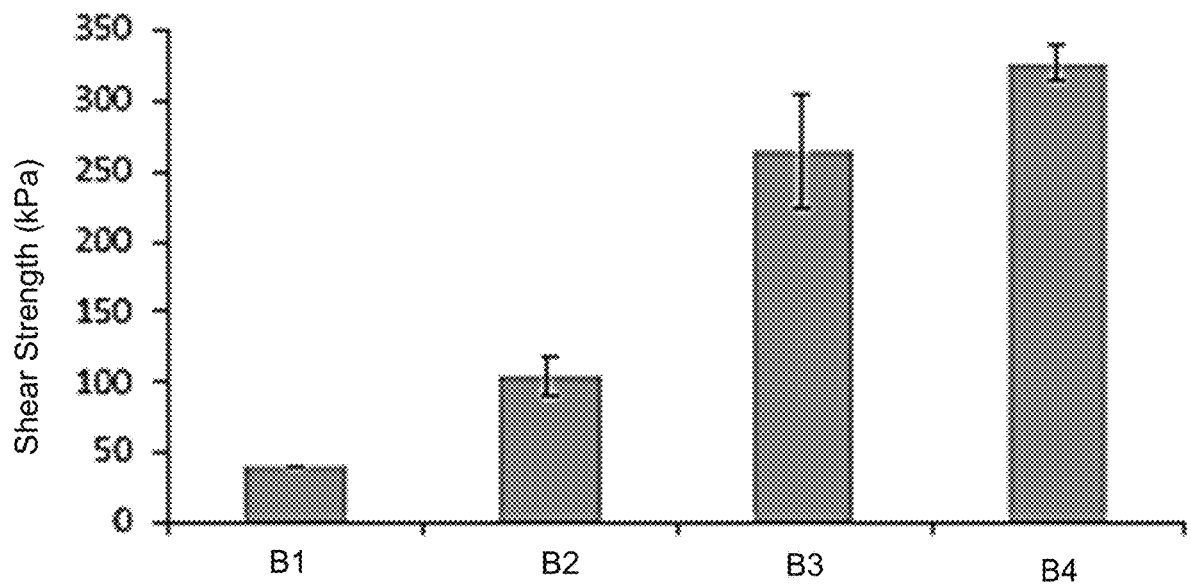

FIG. 3D shows the lap shear strength of powder adhesive with varying sodium lipoate ratios by varying the α-lipoic acid:sodium lipoate, by varying the amount of sodium lipoate from 29 mol % to 42 mol % to measure the effect of that variation on strength of the powder adhesive on bovine pericardium after 2 min incubation in phosphate buffer at 37° C. As shown in FIG. 3D, the shear strength of the powder adhesive was also found to be sensitive to the ratio of α-lipoic acid:sodium lipoate. The results showed that an increase in the amount of sodium lipoate resulted in a decrease in shear strength. Without intending to be bound by any theory or mechanism of action, this suggests that a reduction in the number of non-covalent interactions as the ratio of α-lipoic acid:sodium lipoate decreases. Here, we conclude that the functionality of the monomer, as evidenced by the α-lipoic acid:sodium lipoate ratio, affects the shear strength. Without intending to be bound by any theory or mechanism of action, it appears that by altering the α-lipoic acid:sodium lipoate ratio, we alter the amount of non-covalent interactions between the adhesive and the tissue, thus affecting shear strength. Moreover, we found that a eutectic mixture forms when α-lipoic acid and sodium lipoate are mixed. Surprisingly, we also found that by adjusting the ratio of α-lipoic acid:sodium lipoate, the melting temperature of the eutectic mixture can be reduced to as low as 35° C.

Example 13. Radical Polymerization can Produce Stronger Thin Film Adhesives for Wet Tissue than Thin Films Produced Using Ionic Polymerization This example tests the hypothesis that improved thin films can be made for use on wet tissue by inducing polymerization of the polymer when the components come into contact with wet surfaces, to mimic a superglue-like mechanism.

Although liquid and powder forms of α-lipoic acid-based adhesive show excellent adhesion properties on wet tissue surfaces, the corresponding thin film shows weak adhesive strength on wet tissue. Due to the higher hydrophobicity of pre-polymerized α-lipoic acid, the surface wettability of poly(α-lipoic acid) reduces significantly, especially on polar surfaces like wet tissue, resulting in weak adhesive strength. Our hypothesis is that, if thin films were fabricated with monomeric precursors, and polymerization is induced once the films come in contact with wet surfaces, our systems could mimic superglue-like mechanisms to avoid weakening of the adhesive strength.

Figure 3F:
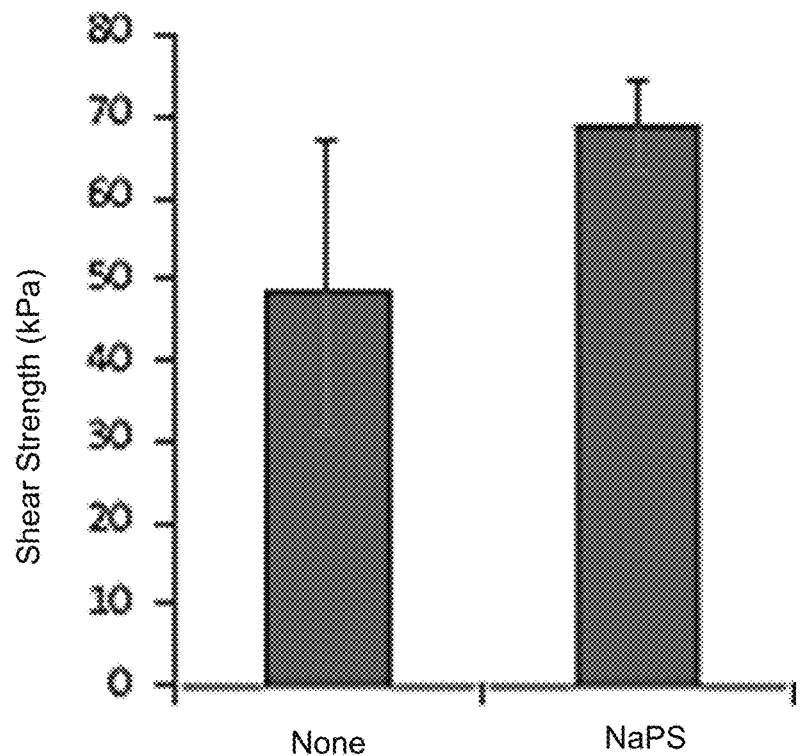

Experimental: α-lipoic acid, sodium lipoate, S1, and sodium persulfate powder were mixed at a mol ratio of 52:41.7:6:0.3 and compression molded at 55° C. for 2 min. Results:

FIG. 3F shows the lap shear strength for a thin film made from a mixture of α-lipoic acid, sodium lipoate, and sodium persulfate at a mol ratio of 52:41.7:6:0.3 on bovine pericardium after 2 min incubation in phosphate buffer at 37° C. As shown in FIG. 3F, when the thin film was applied to the wet bovine pericardium, an instant adhesion was observed, and 69±6 kPa of shear strength was achieved when subjected to lap shear measurement after 2 min of incubation at 37° C. in saline solution.

A visible inspection of failure mode shows cohesive failure of the lap joints and inefficient water penetration within the thin film. Without intending to be bound by any theory or mechanism of action, we believe the lower cohesive strength is due to inefficient polymerization, a consequence of a lack of water penetration, which induces the polymerization. This suggests that further improvements in cohesive strength can be achieved by designing an adhesive composition that can be penetrated quickly by water, the composition providing a "fast water-penetrable network".

A lap shear measurement of the thin film adhered to wet tissue shows that a thin film fabricated by ionic polymerization (not using an initiator), absent a radically polymerized interior, shows lower shear strength than a thin film fabricated using radical polymerization (including an initiator), highlighting the importance of the initiator in the making of a high-performing α-lipoic acid-based adhesive.

For purposes of enablement, the following is an example of how a thin film has been prepared from α-lipoic acid using ionic polymerization, in some embodiments:

α-Lipoic acid (900 mg, 4.4 mmol) was dissolved in 2.3 mL absolute ethanol. Separately, L2 (100 mg, 0.3 mmol) was dissolved in 200 uL DMSO and added to the lipoic acid solution. The resulting solution was rested for 1 hour before adding excess 1×PBS (pH 7.4, temperature 37° C.) under vigorous stirring. The sticky resulting polymer was washed with fresh PBS, followed by miliQ water. The obtained pale-yellow polymer was freeze-dried to obtain dry polymer and then compression molded at 75° C. for 15 min between PDMS backing paper to obtain a homogeneous thin film (thickness 250±50 μm) (FIG. 1). The polymer films were rested overnight before further use.

Example 14. Anti-Adhesive Properties of Hydrogels Obtained from α-Lipoic Acid Functional, Multi-Armed PEG Sometimes there is unwanted adhesion in medical procedures, and a hydrogel can be made and used for its anti-adhesive properties to help avoid realizing an unwanted adhesion.

The radical-induced polymerization of an α-lipoic acid derivative was also exploited to obtain hydrogels to overcome unwanted adhesion after surgical intervention. In this context, polyethylene glycol hydrogels are popular due to their antifouling nature. This example investigates the anti-adhesive property of the hydrogels obtained from α-lipoic acid functional, multi-armed PEG.

Experimental: α-lipoic acid, NHS-derivatized lipoic acid (S1), and ammonium persulfate (APS) were combined as a precursor solution. The precursor was (i) sprayed on a wet bovine pericardium as a first step and (ii) an aqueous solution of PEG-α-lipoic acid-8, S4, and ammonium persulfate solution was applied as an "anti-adhesive" second step. A second fresh tissue was brought in contact with the sprayed joint.

Results: the aqueous solution of PEG-α-lipoic acid-8, S4, and ammonium persulfate solution successfully formed a protective hydrogel layer, and no successful lap joints were achieved even after multiple trials, which confirmed the excellent anti-adhesive nature of the hydrogel.

The Biological Performance of the Polydisulfide Polymers Made from a Cationic Polymerization are Provided Below as Representative Examples of What can be Reasonably Expected from Polydisulfide Polymers Made from a Radical Polymerization Taught Herein.

This is because the polydisulfide polymers made from a radical polymerization taught herein contain the same or similar monomers, the same or similar stabilizers, and are at least substantially the same structurally and functionally. See the following examples for representative biological data that can be recreated for the polydisulfide polymers made from a radical polymerization taught herein.

Example 15. Biological Performance of the Counterpart Polydisulfide Adhesives Made from Cationic Polymerization In order to evaluate the biological performance of the developed adhesives, in-vitro cytotoxicity studies of the cationically polymerized polymers included
- an ethanolic precursor solution mixture of α-lipoic acid and NHS derivatized lipoic acid;
- an ethanolic precursor solution mixture of α-lipoic acid and Gly-OSu-NHS derivatized lipoic acid;
- an ethanol-free liquid precursor of α-lipoic acid, NHS derivatized lipoic acid, and sodium lipoate which is the conjugate base of the α-lipoic acid monomer; and
- a solid polymer mixture of α-lipoic acid and NHS derivatized lipoic acid;
- wherein the studies were performed on NIH 3T3 cells.

Results: A high density of cells, comparable to growth media controls were observed in each case after 24 h co-culture with the cationically polymerized polymers.

Figure 4A:
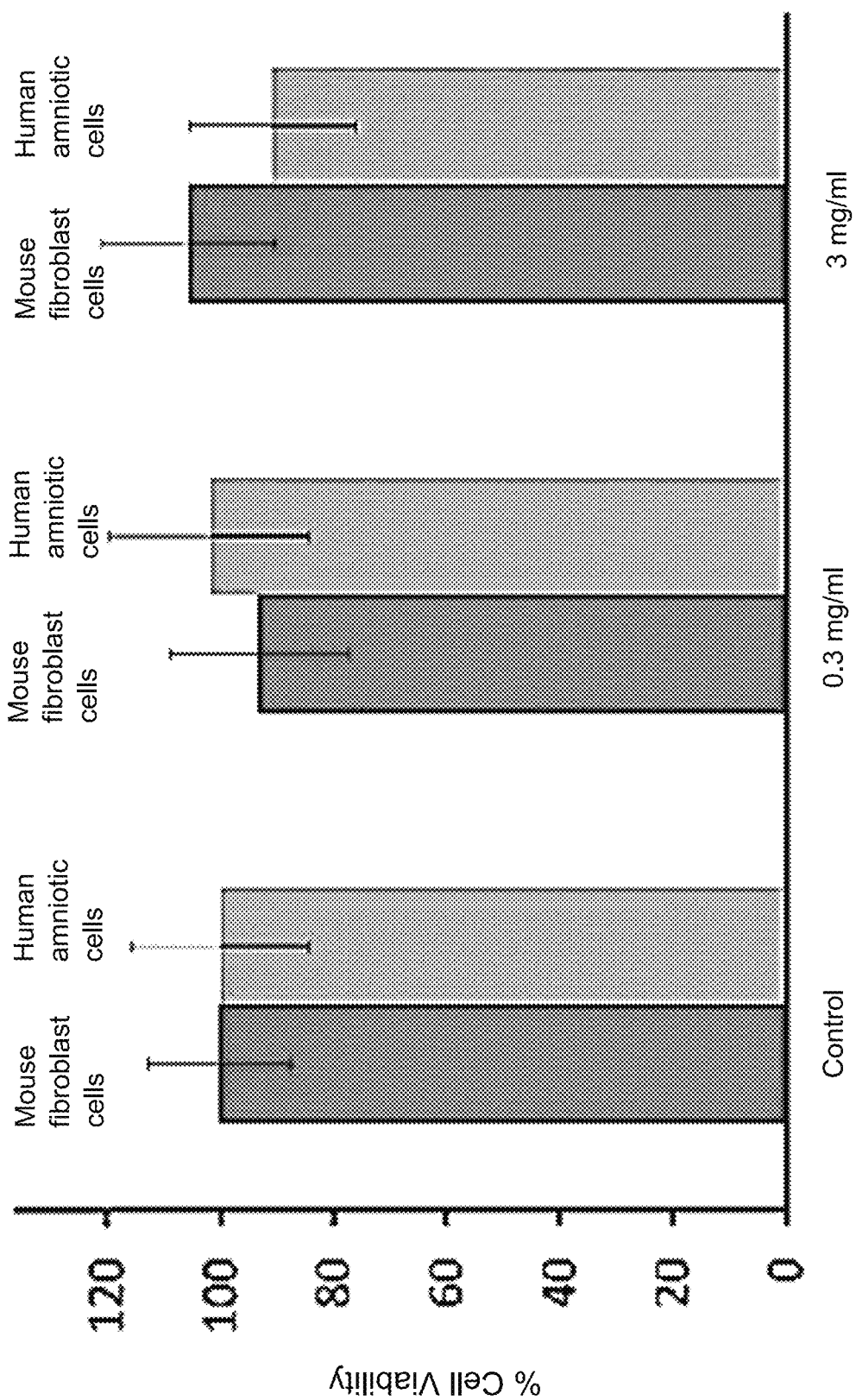

FIG. 4A illustrates an in-vitro biocompatibility profile of in-situ polymerized spray adhesive with mouse fibroblast cells (NIH 3T3) and human amniotic cells after 24 hrs co-culture of the cells with the poly(α-lipoic acid) polymers, in some embodiments. A high density of cells, comparable to growth media controls was observed after the 24 hour co-culture with the synthesized polymers, indicating a high biocompatibility of the polymers with the cells.

Figure 4C:
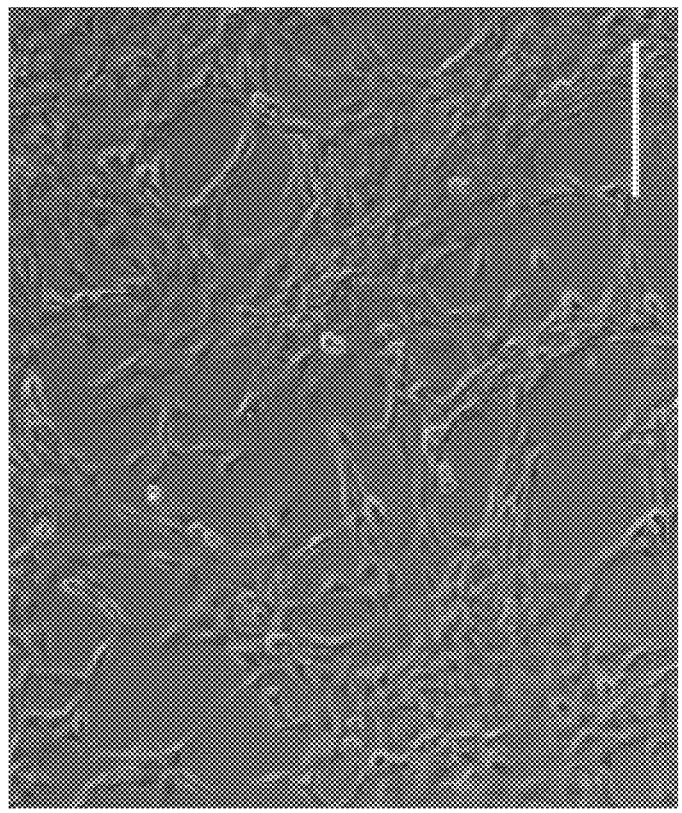
Figure 4B:
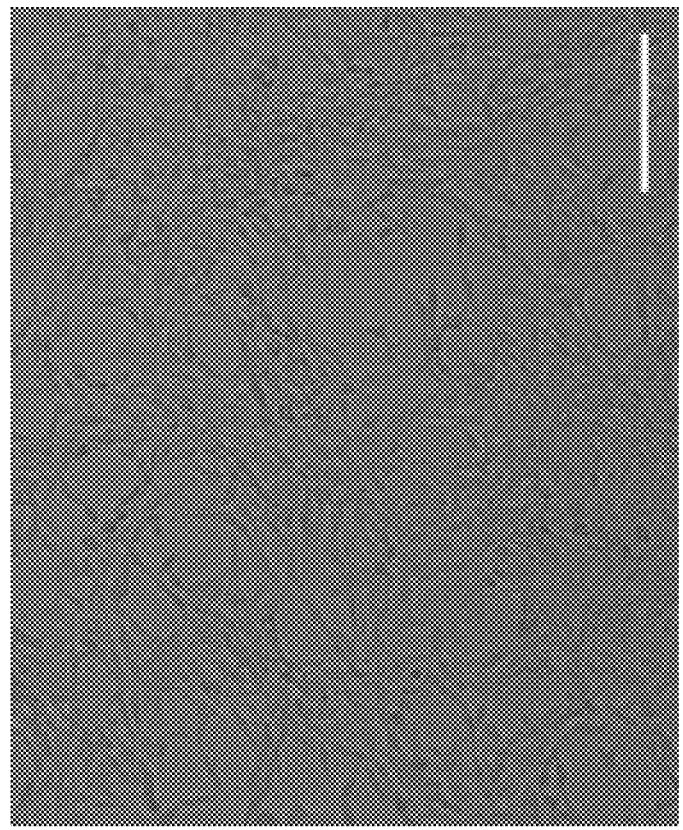

FIGS. 4B and 4C illustrates comparison images of an in-vitro biocompatibility profile of in-situ polymerized spray adhesive with mouse fibroblast cells (NIH 3T3) and human amniotic cells after 24 hrs co-culture of the cells with the 3 mg/ml concentration of poly(α-lipoic acid) polymers, in some embodiments. The images also show a high density of cells, comparable to growth media controls was observed after the 24 hour co-culture with the synthesized polymers, indicating a high biocompatibility of the polymers with the cells. The scale bar is 200 um.

Figure 4D:
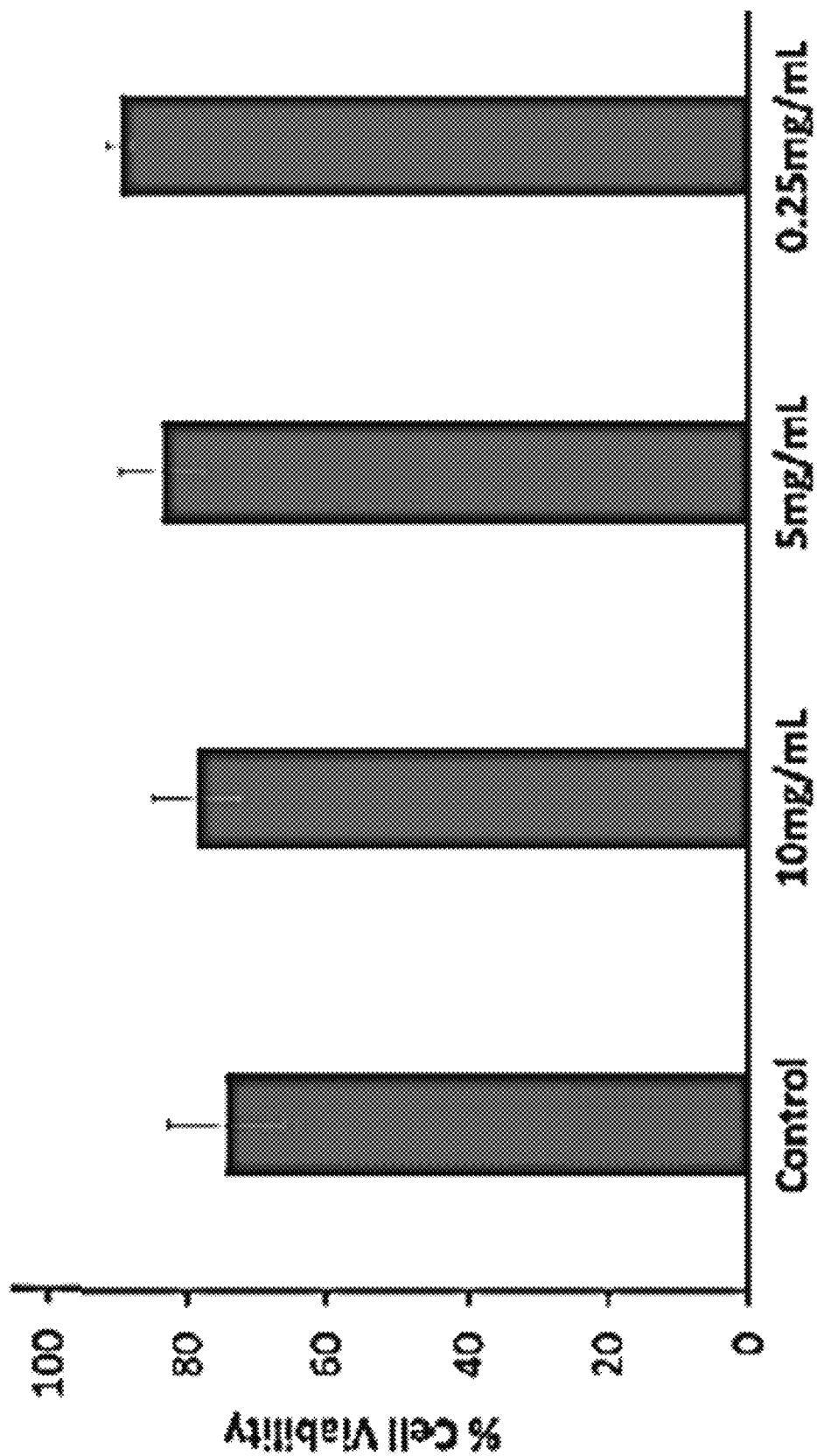

FIG. 4D illustrates a relative cell viability in an in-vitro biocompatibility profile of a solid adhesive patch with mouse fibroblast cells (NIH 3T3) and human amniotic cells after 24 hrs co-culture of the cells with the solid adhesive patch, in some embodiments. A high density of cells, comparable to growth media controls was observed after the 24 hour co-culture with the synthesized polymers, indicating a high biocompatibility of the polymers with the cells.

Moreover, Nile red uptake and live dead assay after 24 hour incubation shows excellent biocompatibility of the solid and in-situ polymerized polymers. Another in-vitro cytotoxicity study of the in-situ polymerized adhesive with human amniotic cells also confirmed the high biocompatibility of the adhesives (see FIG. 4A).

This data was obtained for adhesives made from a cationic polymerization process and is representative of what can be expected for adhesives made from radical polymerizations as taught herein. The same or similar testing method can be used to test the adhesives made from any of the radical polymerization methods taught herein.

Example 16. Antioxidant Property of the Counterpart Adhesives Made from Cationic Polymerization Process The antioxidant property of the in-situ synthesized polymer from the α-lipoic acid and NHS derivatized lipoic acid mixture was also investigated with macrophages and LPS-induced oxidative stress model.

Figure 4F:
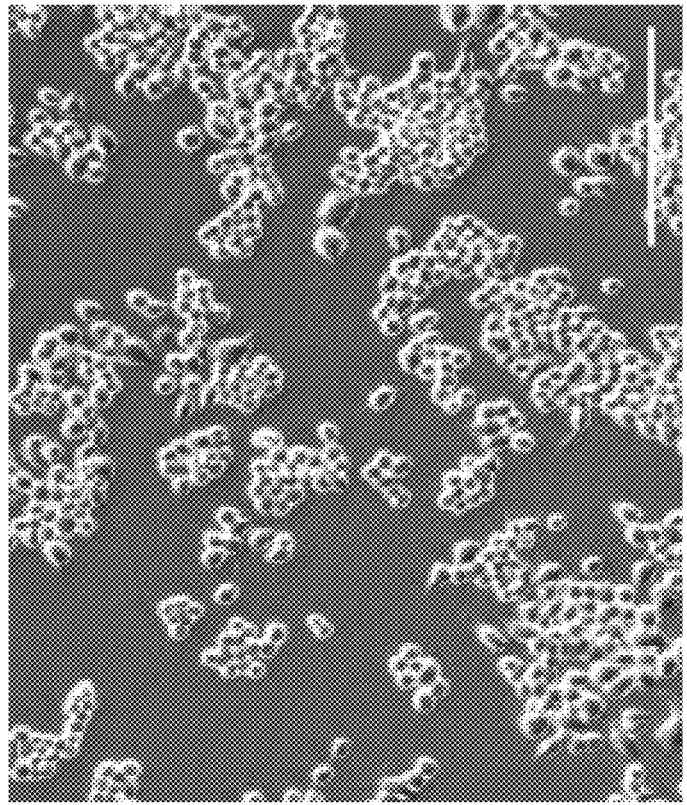
Figure 4E:
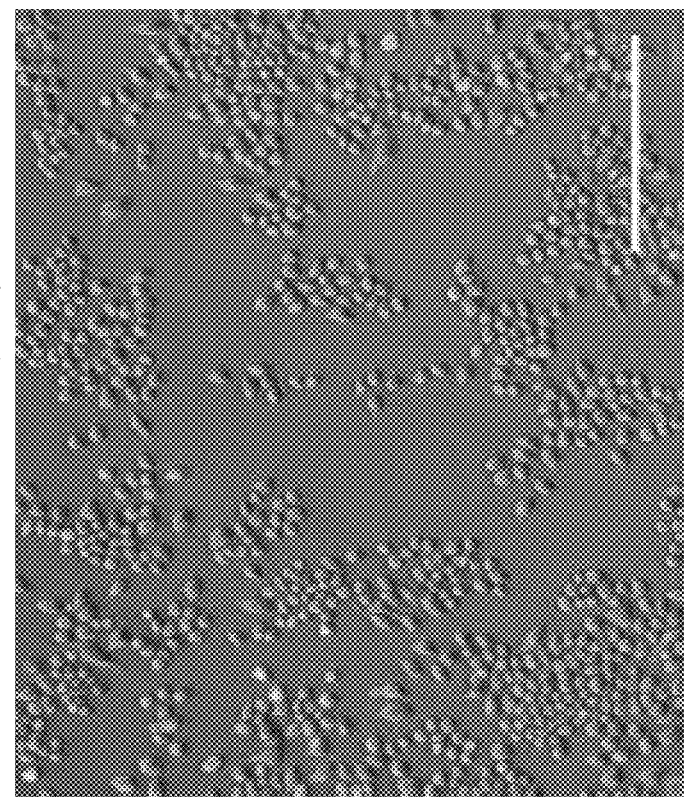

FIGS. 4E and 4F test the antioxidant properties of in-situ synthesized poly(α-lipoic acid) polymers in the presence of macrophages in a lipopolysaccharide (LPS)-induced oxidative stress model, in some embodiments. The macrophages were treated with LPS for 1 hour and imaged for the presence of reactive oxygen species (ROS) as shown FIG. 4E, and that image was compared to an image in FIG. 4F of the macrophages treated with LPS in the presence of the poly(α-lipoic acid) for 1 hour. Green dots are seen in FIG. 4E which is a formation of reactive oxygen species (ROS), whereas the formation of the ROS was completed suppressed in the presence of the poly(α-lipoic acid) as shown by the absence of the green dots in FIG. 4F. The scale bar is 200 um.

The generation of reactive oxygen species (ROS) was observed when the macrophages were treated with LPS for 1 hour, as seen in FIG. 4E. However, the ROS formation was completely suppressed when the macrophages were treated with LPS together with in-situ synthesized polymer, as seen in FIG. 4F. This result indicates the excellent efficacy of the polymer in neutralizing the oxidative stress in cells.

This data was obtained for adhesives made from a cationic polymerization process and is representative of what can be expected for adhesives made from radical polymerizations as taught herein. The same or similar testing method can be used to test the adhesives made from any of the radical polymerization methods taught herein.

Example 17. Bacterial Barrier Performance of the Counterpart Adhesives Made from a Cationic Polymerization Process The bacterial barrier property is another desired feature of a tissue adhesive. Bacterial infection is one of the major concerns after any surgical intervention or traumatic injuries, and is especially critical for external wound closure to prevent infection into a wound, and for certain internal applications like intestinal perforations and anastomoses, where the repair site must constitute an effective bacterial barrier. Such infections can be avoided by tissue adhesives with bacterial barrier properties. In this context, sulfur is historically known for its excellent antibacterial properties. Hence, we investigated the bacteria barrier properties of the synthesized adhesives with *Escherichia coli*.

Figure 4J:
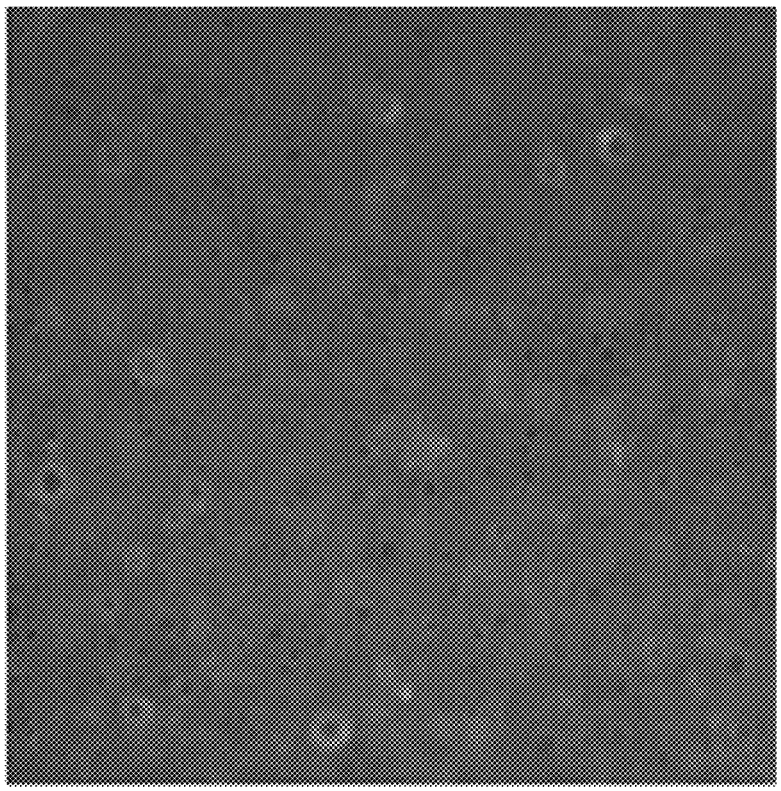
Figure 4I:
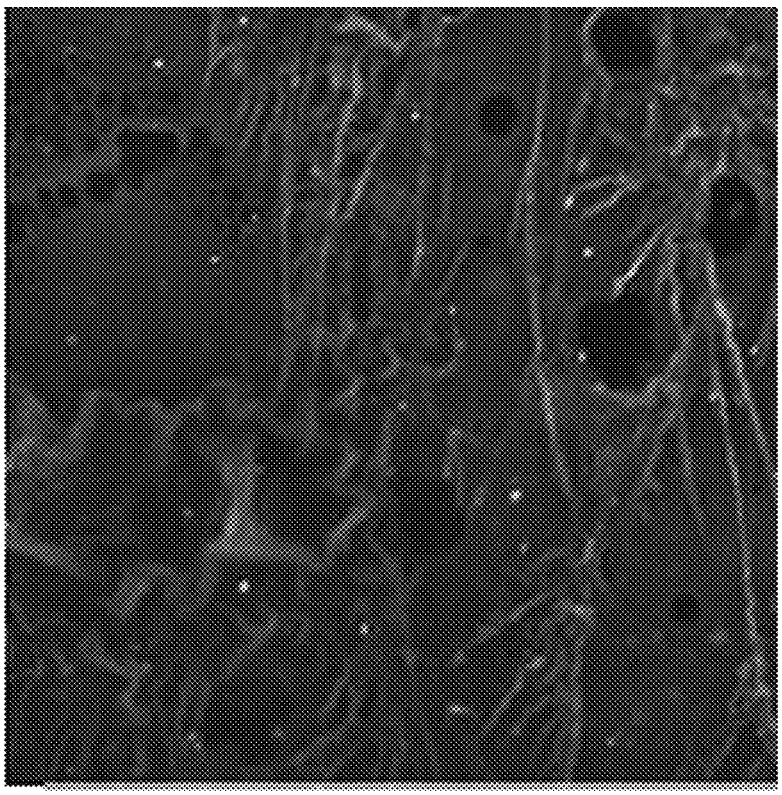

FIGS. 4G-4J test the bacterial resistance of the adhesive compositions by illustrating a comparison of a control assay of *E. coli* growth in a culture plate to the *E. coli* growth on a solid adhesive patch and a culture plate coated with the in-situ synthesized poly(α-lipoic acid) polymer. As shown in FIG. 4G, the adhesive compositions serve very well as a bacterial barrier after 24 hours co-culture. FIG. 4H shows the presence of the cells in the control, whereas FIGS. 4I and 4J show how the presence of the cells is reduced on both the solid adhesive patch and the polymer coated culture plate due to the bacterial resistance properties of the adhesive composition.

Interestingly, the co-culture of *E. coli* with Solid Polymer Patch Synthesized with a mixture of α-lipoic acid and NHS derivatized lipoic acid and in-situ obtained polymer from ethanolic precursor solution of α-lipoic acid and Gly-OSu-NHS-derivatized lipoic acid exhibits a significantly lower density of bacteria on the polymer compared to the control culture plates, as shown in FIGS. 4G, 4H, 4I, and 4J. Furthermore, a bacteria barrier study of the polymer shows excellent barrier efficacy after 24 hour co-culture with *E. Coli*, establishing the potential benefit of the adhesive for wound dressing.

This data was obtained for adhesives made from a cationic polymerization process and is representative of what can be expected for adhesives made from radical polymerizations as taught herein. The same or similar testing method can be used to test the adhesives made from any of the radical polymerization methods taught herein.

Example 18. Swelling Property of the Adhesive Made from a Cationic Polymerization Process The swelling property of the in-situ synthesized polymer from the ethanolic precursor mixture of α-lipoic acid and Gly-OSu-NHS-derivatized lipoic acid, and a mixture of solid polymer from α-lipoic acid and NHS-derivatized lipoic acid was studied, as excessive swelling of tissue adhesives can be problematic for certain procedures and can also lead to reduction of interfacial adhesive strength. To test swelling, an ethanolic precursor solution of L1 and L3 was polymerized in excess 1×PBS and incubated for 24 hours at 37° C.

Then the mass of the wet polymer was recorded, followed by the mass after freeze-drying. A swelling ratio of 0.3 was observed after 24 h incubation in PBS. Another swelling study with the solid patch shows a swelling ratio of 1.1 after 24 h incubation in PBS at 37° C., indicating a favorable swelling profile for biomedical applications. In contrast, many hydrogel based internal medical adhesives exhibit several 100% swelling.

This data was obtained for adhesives made from a cationic polymerization process and is representative of what can be expected for adhesives made from radical polymerizations as taught herein. The same or similar testing method can be used to test the adhesives made from any of the radical polymerization methods taught herein.

Example 19. Biodegradation of an Adhesive Made from a Cationic Polymerization Process One of the crucial features of a tissue adhesive is biodegradation, especially for internal applications. Furthermore, the generation of toxic side products resulting from degradation can also result in acute inflammation and toxicity. Hence, the in-vitro degradation of the synthesized polymer was investigated. Poly(α-lipoic acid) derivatives are known to undergo GSH-mediated degradation to yield monomeric species.

The thiolate of GSH reacts with the disulfide bond in the backbone and generates an active thiol group which initiates the depolymerization in the polymer network. Therefore, in vitro degradation of the synthesized polymer was performed with 0.1 mM GSH.

Figure 5:
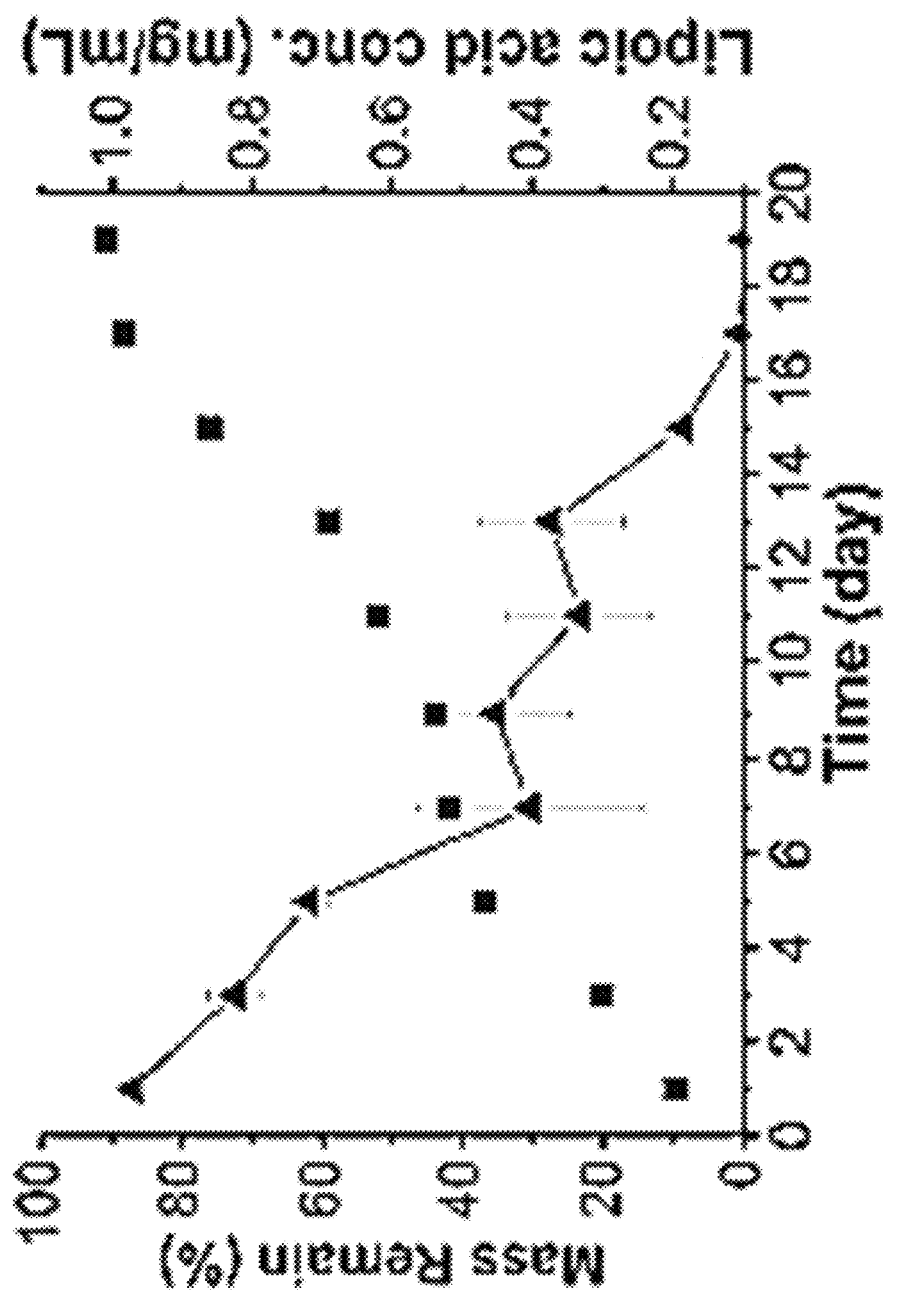
FIG. 5 illustrates the polymerization and depolymerization of poly(α-lipoic acid) using glutathione (GSH)-mediated degradation of the polymer.

FIG. 5 illustrates the polymerization and depolymerization of poly(α-lipoic acid) using glutathione (GSH)-mediated degradation of the polymer, in some embodiments. The p value was calculated with a student's t-test in Microsoft Excel (2 array, 2 tails, 2 type). * p>0.05,  p≤0.05, * p≤0.01. The data shows at least that the polymers are recyclable, and can be recycled efficiently due to the ability to degrade efficiently from the polymer form to the individual monomers.

Results: As expected, gradual degradation of the polymer was observed, as shown in FIG. 5. HPLC analysis of the media also confirmed the formation of monomeric α-lipoic acid over time, as shown in FIG. 5.

This data was obtained for adhesives made from a cationic polymerization process and is representative of what can be expected for adhesives made from radical polymerizations as taught herein. The same or similar testing method can be used to test the adhesives made from any of the radical polymerization methods taught herein.

We claim:

1. A method of creating a stable polydisulfide homopolymer from a radical polymerization reaction in an aqueous alcoholic solution, comprising mixing a plurality of substituted 1,2-dithiolane monomers with a plurality of stabilizer molecules in an aqueous alcoholic carrier to create a reaction solution for a radical polymerization reaction that is initiated when adding a plurality of initiator molecules, wherein, the plurality of substituted 1,2-dithiolane monomers are functional to polymerize through a ring-opening reaction to form a polydisulfide homopolymer having a first active radical sulfur end and a second active radical sulfur end; and, a plurality of repeating units having a substituted dithioalkyl structure from the ring opening reaction as follows

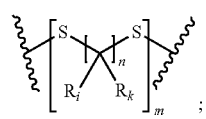

wherein, n is 3;

each Ri and Rk is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; wherein, i and k are integers, and at least one Ri or Rk in each repeating unit includes a carbonyl functionality; and, m is an integer selected to match a desired molecular weight of the polymer;

initiating the radical polymerization reaction by adding the plurality of initiator molecules to the reaction solution at a reaction temperature ranging from 0° C. to 37° C.;

creating the polydisulfide homopolymer having sulfur radicals through the radical polymerization reaction;

stabilizing the polydisulfide homopolymer, the stabilizing including reacting the plurality of stabilizer molecules with the sulfur radicals;

terminating the polymerization reaction to create the stable polydisulfide homopolymer, the terminating including quenching the plurality of initiator molecules by reaction with the aqueous alcoholic solution, reacting the sulfur radicals with stabilizer, reacting the sulfur radicals with the aqueous alcoholic solution to convert the sulfur radicals to thiols, and/or reacting the thiols with the plurality of stabilizer molecules.

2. The method of claim 1, wherein:
the repeating unit is a substituted 1,3-dithiopropyl structure as follows

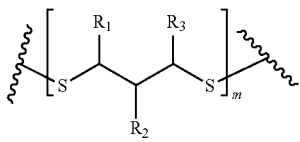

and wherein,
m is an integer;
$R_i$ includes $R_1$, $R_2$, and $R_3$; and,
each $R_k$ is H;
and,
each stabilizer molecule includes the substituted 1,3-dithiopropyl structure.

3. The method of claim 1, wherein:
the repeating unit is a substituted 1,3-dithiopropyl structure as follows

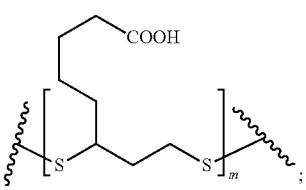

wherein,
m is an integer;
$R_1$ is a pentanoic acid group, and $R_2$ and $R_3$ are each H;

and,
each stabilizer molecule includes the substituted 1,3-dithiopropyl structure, wherein $R_1$ is a pentanoic acid group, and $R_2$ and $R_3$ are each H.

4. The method of claim 1, wherein:
the repeating unit has a substituted 1,3-dithiopropyl structure

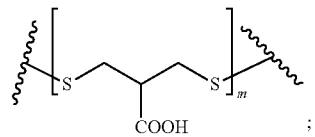

wherein,
m is an integer;
$R_1$ and $R_3$ are H, and $R_2$ is a carboxylic acid group; and,
each stabilizer molecule includes the substituted 1,3-dithiopropyl structure, wherein $R_1$ and $R_3$ are H and $R_2$ is a carboxylic acid group.

5. The method of claim 1, wherein the plurality of stabilizer molecules include an electrophilic stabilizer, a free radical stabilizer, or a combination thereof.

6. The method of claim 1, wherein the plurality of stabilizer molecules includes an electrophilic stabilizer, a free radical stabilizer, or a combination thereof, and the monomers and the stabilizer molecules are the same, or substantially the same, chemical moieties following a depolymerization of the polymer.

7. The method of claim 1, wherein the stabilizer is selected from the group consisting of maleimide, a maleimide derivative, a quinone, a quinone derivative, a quinone methide, TEMPO or a derivative thereof, TEMPOL or a derivative thereof, p-phenylenediamines, phenothiazine, hydroxylamines, N,N-bis(hydroxypropyl) hydroxylamine (HPHA), diethylhydroxylamine (DEHA), nitrophenol compounds, dinitro-ortho-cresol, di-nitro-sec-butylphenol (DNBP), and any combination thereof.

8. The method of claim 1, wherein the stabilizer is selected from the group consisting NHS-derivatized lipoic acid (S1), Gly-OSu-NHS derivatized lipoic acid (S2), Sulfo-NHS-derivatized lipoic acid (S3), Gly-OSu-Sulfo-NHS derivatized lipoic acid (S4,S5), Ala-OSu-NHS derivatized lipoic acid (S6), 3-amino-propanoic acid-OSu-NHS derivatized lipoic acid (S7), Ala-OSu-NHS derivatized lipoic acid (S8), 1,4-benzoquinone (S9), N-ethylmaleimide (S10), a C1-C22 alkyl methacrylate (S11), 2-methylenepentanedioic acid (S12), and any combination thereof.

9. The method of claim 1, wherein the initiator is an azo compound selected from the group consisting of 2,2'-azobis(isobutyronitrile) (AIBN), 4,4'-azobis(4-cyano valeric acid), and 2,2'-azobis[2-(2-imidazolin-2-yl)propane]dihydrochloride, and any combination thereof.

10. The method of claim 1, wherein the initiator is 4,4'-azobis(4-cyano valeric acid).

11. The method of claim 1, wherein the initiator is a peroxide compound selected from the group consisting of benzoyl peroxide (BPO), cumene hydroperoxide, tert-butyl hydroperoxide (TBHP), di-tert-butyl peroxide (di-TBP), dicumyl peroxide, and any combination thereof.

12. The method of claim 1, wherein the initiator is selected from the group consisting of ammonium persulfate, potassium persulfate, sodium persulfate, dicyandiamide, cyclohexyl tosylate, (4-hydroxyphenyl)-dimethylsulfonium hexafluorophosphate, diphenyl(methyl)sulfonium tetrafluoroborate, benzyl(4-hydroxyphenyl)methylsulfonium hexafluoroantimonate, (4-hydroxyphenyl)methyl(2-methylbenzyl)sulfonium hexafluoroantimonate, triphenylsulfonium nonafluoro-1-butanesulfonate, and any combination thereof.

13. The method of claim 1, wherein the initiator is ammonium persulfate.

14. The method of claim 1, further comprising creating a substantial amount of a first stable homopolymer through a cationic polymerization for a first reaction time before adding the plurality of initiator molecules to the reaction solution to initiate the radical polymerization to create a second stable homopolymer that includes the first stable homopolymer, the combination of the first stable homopolymer with the second stable homopolymer creating the stable polydisulfide homopolymer from the radical polymerization reaction in the aqueous alcoholic solution.

15. The method of claim 1, wherein the aqueous alcohol carrier is a combination of ethanol:water in a weight ratio ranging from 10:90 to 90:10.

16. A precursor kit for a radical polymerization in an aqueous alcoholic solution that results in a stable polydisulfide homopolymer, the kit comprising
a plurality of substituted 1,2-dithiolane monomers;
a plurality of stabilizer molecules;
an initiator; and,
an aqueous alcoholic carrier;
wherein the plurality of substituted 1,2-dithiolane monomers are functional to polymerize through a ring-opening reaction to form a polydisulfide homopolymer having
a first active radical sulfur end and a second radical sulfur end; and,
a plurality of repeating units having a substituted dithioalkyl structure from the ring opening reaction as follows

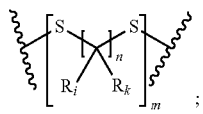

wherein,
n is 3;
each Ri and Rk is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; wherein, i and k are integers, and at least one Ri or Rk in each repeating unit includes a carbonyl functionality; and,
m is an integer selected to match a desired molecular weight of the polymer;
and,
the kit is used to create the stabilized polydisulfide homopolymer in the aqueous alcohol carrier to create a reaction solution at a reaction temperature ranging from 0° C. to 37° C.

17. A system for a radical polymerization of a stabilized polydisulfide homopolymer in aqueous solution, comprising
a plurality of substituted 1,2-dithiolane monomers;
a plurality of stabilizer molecules;
an initiator;
an aqueous alcoholic carrier; and,
a reaction vessel for creating the stabilized polydisulfide homopolymer through the radical polymerization in the aqueous alcohol carrier at a reaction temperature ranging from 0° C. to 37° C.;
wherein the plurality of substituted 1,2-dithiolane monomers are functional to polymerize through a ring-opening reaction to form a polydisulfide homopolymer having
a first active radical sulfur end and a second radical sulfur end; and,
a plurality of repeating units having a substituted dithioalkyl structure from the ring opening reaction as follows

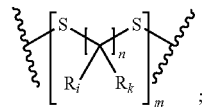

wherein,
n is 3;
each Ri and Rk is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; wherein, i and k are integers, and at least one Ri or Rk in each repeating unit includes a carbonyl functionality; and,
m is an integer selected to match a desired molecular weight of the polymer.

18. The system of claim 17, wherein
the plurality of substituted 1,2-dithiolane monomers and the stabilizer are in a first reactant vessel in the aqueous carrier;
the initiator is in a second reactant vessel;
an aqueous reaction solution is formed by adding the initiator to the plurality of substituted 1,2-dithiolane monomers and the stabilizer in the reaction vessel; and,
the reaction vessel contains the radical polymerization of the aqueous reaction solution at the temperature ranging from 0° C. to 37° C.

19. The system of claim 17, wherein
the plurality of substituted 1,2-dithiolane monomers and the stabilizer are in a first reactant vessel in the aqueous carrier, the first reactant vessel configured to release the plurality of substituted 1,2-dithiolane monomers, the stabilizer, and the aqueous carrier into the reaction vessel at a first desired time to create a first aqueous reaction solution for a cationic polymerization in the first aqueous reaction solution to create a first stable polydisulfide polymer at the temperature ranging from 0° C. to 37° C.;
the initiator is in a second reactant vessel, the second reactant vessel configured to release the initiator into the reaction vessel at a second desired time to create a second aqueous reaction solution with the first stable polydisulfide polymer for the radical polymerization in the second aqueous reaction solution to create a second stable polydisulfide polymer from a combination of the cationic polymerization and the radical polymerization at the temperature ranging from 0° C. to 37° C.

20. The system of claim 17, wherein
the plurality of substituted 1,2-dithiolane monomers and the stabilizer are in a first reactant vessel in the aqueous carrier, the first reactant vessel configured to release the plurality of substituted 1,2-dithiolane monomers, the stabilizer, and the aqueous carrier into the reaction vessel at a first desired time to create a first aqueous reaction solution for a cationic polymerization in the first aqueous reaction solution to create a first stable polydisulfide polymer at the temperature ranging from 0° C. to 37° C.;
the initiator is in a second reactant vessel, the second reactant vessel configured to release the initiator into the reaction vessel at a second desired time to create a second aqueous reaction solution with the first stable polydisulfide polymer for the radical polymerization in the second aqueous reaction solution to create a second stable polydisulfide polymer from a combination of the cationic polymerization and the radical polymerization at the temperature ranging from 0° C. to 37° C.;
wherein the system is configured for the cationic polymerization to occur for a first reaction duration to create a desired amount of branching in the first stable polydisulfide polymer before the initiator is released into the reaction vessel to start the radical polymerization to create the desired amount of branching in the second stable polydisulfide polymer which results from the combination of the cationic polymerization and the radical polymerization at the temperature ranging from 0° C. to 37° C.

21. A stabilized and recyclable polydisulfide homopolymer, comprising:
a plurality of substituted 1,2-dithiolane monomers, the substituted 1,2-dithiolane monomers functional to polymerize through a ring-opening reaction to form a polydisulfide polymer having
a first active sulfur radical and a second active sulfur radical; and,
a plurality of repeating units having a substituted dithioalkyl structure from the ring opening reaction as follows

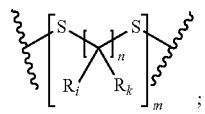

wherein,
n is 3;
each $R_i$ and $R_k$ is independently selected from the group consisting of H; alkyl, cycloalkyl, alkenyl, alkynyl, and aryl groups, each of the groups having from 1-8 carbons; hydroxylated alkyl, cycloalkyl, alkenyl, alkynyl, and aryl groups, each of the groups having from 1-8 carbons; and, carboxylated alkyl, cycloalkyl, alkenyl, alkynyl, and aryl groups, each of the groups having from 1-8 carbons; wherein, i and k are integers, and at least one $R_i$ or $R_k$ in each repeating unit includes a carbonyl functionality;
and,
m is an integer selected to match a desired molecular weight of the polymer;
and,
a plurality of stabilizer molecules configured to stabilize the first active sulfur radical of the polymer, the plurality of stabilizer molecules being the 1,2-dithiolane monomers having a functional group that forms (i) a first stable bond with the first active sulfur radical; and (ii) a second stable bond with the second active sulfur radical;
wherein, the repeating units and the stabilizer molecules are the same, or substantially the same, chemical moieties following a degradation of the polymer.

22. The stabilized and recyclable polydisulfide homopolymer of claim 21, wherein
(i) the first stable bond is a first labile bond with the first active sulfur radical, the first labile bond selected from the group consisting of a thioester bond, a thiocarbamate bond, and a thioester bond; and
(ii) the second stable bond is a second labile bond with the second active sulfur radical, the second labile bond selected from the group consisting of a thioester bond, a thiocarbamate bond, and a thioester bond.

23. A method of using the stabilized and recyclable polydisulfide homopolymer of claim 21 as a non-medical adhesive, the method comprising:
applying the stabilized and recyclable polydisulfide homopolymer of claim 21 to a substrate as an adhesive.

24. A method of using the stabilized and recyclable polydisulfide homopolymer of claim 21 as a medical tissue adhesive in a method of treatment of a subject, the method comprising:
applying the stabilized and recyclable polydisulfide homopolymer of claim 21 to a substrate in vivo in the treatment of the subject.

* * * * *